US012416880B2

(12) United States Patent
Ozaki et al.

(10) Patent No.: US 12,416,880 B2
(45) Date of Patent: Sep. 16, 2025

(54) TONER CONTAINER

(71) Applicant: CANON KABUSHIKI KAISHA, Tokyo (JP)

(72) Inventors: Goshi Ozaki, Kanagawa (JP); Shinichi Nishida, Kanagawa (JP); Hiroyuki Munetsugu, Kanagawa (JP); Sohta Sugimoto, Kanagawa (JP); Mitsuhiro Sato, Tokyo (JP); Masahiro Suetsugu, Kanagawa (JP); Seiya Ishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/755,550

(22) Filed: Jun. 26, 2024

(65) Prior Publication Data

US 2025/0004399 A1 Jan. 2, 2025

(30) Foreign Application Priority Data

Jun. 29, 2023 (JP) ................................ 2023-106710

(51) Int. Cl.
*G03G 15/08* (2006.01)

(52) U.S. Cl.
CPC ..... *G03G 15/0889* (2013.01); *G03G 15/0874* (2013.01); *G03G 15/0886* (2013.01)

(58) Field of Classification Search
CPC .......... G03G 15/0874; G03G 15/0886; G03G 15/0889
USPC ........................................ 399/252, 258, 260
See application file for complete search history.

(56) References Cited

FOREIGN PATENT DOCUMENTS

| | | | |
|---|---|---|---|
| CN | 216485993 | U | 5/2022 |
| JP | H05249825 | A | 9/1993 |
| JP | H08190260 | A | 7/1996 |
| JP | H10288882 | A | 10/1998 |
| JP | 2005017787 | * | 1/2005 |

* cited by examiner

*Primary Examiner* — Hoan H Tran
(74) *Attorney, Agent, or Firm* — Canon U.S.A., Inc. IP Division

(57) ABSTRACT

Provided a toner container having: a storage portion configured to store toner; a nozzle portion having a discharging port configured to discharge, outside the toner container, toner stored in the storage portion, the nozzle portion being fixed to the storage portion such that the nozzle portion and the storage portion are aligned in a first direction; and a loosening member configured to loose toner, the loosening member including at least a portion provided in the storage portion, wherein the loosening member is swingable relative to the storage portion about a swing axis extending in a second direction crossing the first direction.

26 Claims, 40 Drawing Sheets

TONER CONTAINER

BACKGROUND OF THE DISCLOSURE

Field of the Disclosure

The present disclosure relates to a toner container used for an image forming apparatus that forms an image on a recording material.

Description of the Related Art

As a method of supplying toner to an electrophotographic-type image forming apparatus, a method of supplying toner, with a toner container being mounted in a supply port that is exposed outside an image forming apparatus, has been known. CN216485993U discloses a toner container that includes a toner bottle including a stirring member inside and enables toner supply while the stirring member loosens the toner.

SUMMARY OF THE DISCLOSURE

The present disclosure provides a toner container with improved performance of discharging toner.

An aspect of the present disclosure provides a toner container comprising: a storage portion configured to store toner; a nozzle portion having a discharging port configured to discharge, outside the toner container, toner stored in the storage portion, the nozzle portion being fixed to the storage portion such that the nozzle portion and the storage portion are aligned in a first direction; and a loosening member configured to loose toner, the loosening member including at least a portion provided in the storage portion, wherein the loosening member is swingable relative to the storage portion about a swing axis extending in a second direction crossing the first direction.

Further features of the present disclosure will become apparent from the following description of exemplary embodiments with reference to the attached drawings.

DESCRIPTION OF THE EMBODIMENTS

First Embodiment

Hereinafter, an embodiment of the present disclosure will be described in detail based on the drawings.

Image Forming System

Figure 2A:
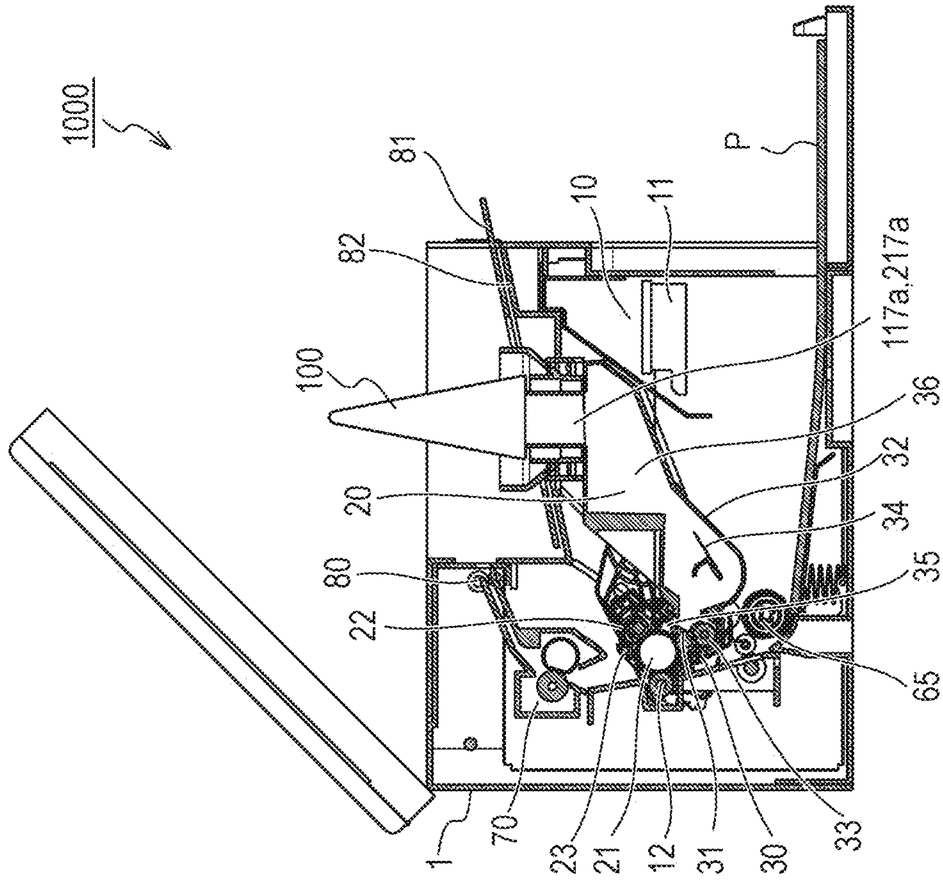
FIGS. 2A and 2B include a schematic sectional view of an image forming system according to the first embodiment.
Figure 2B:
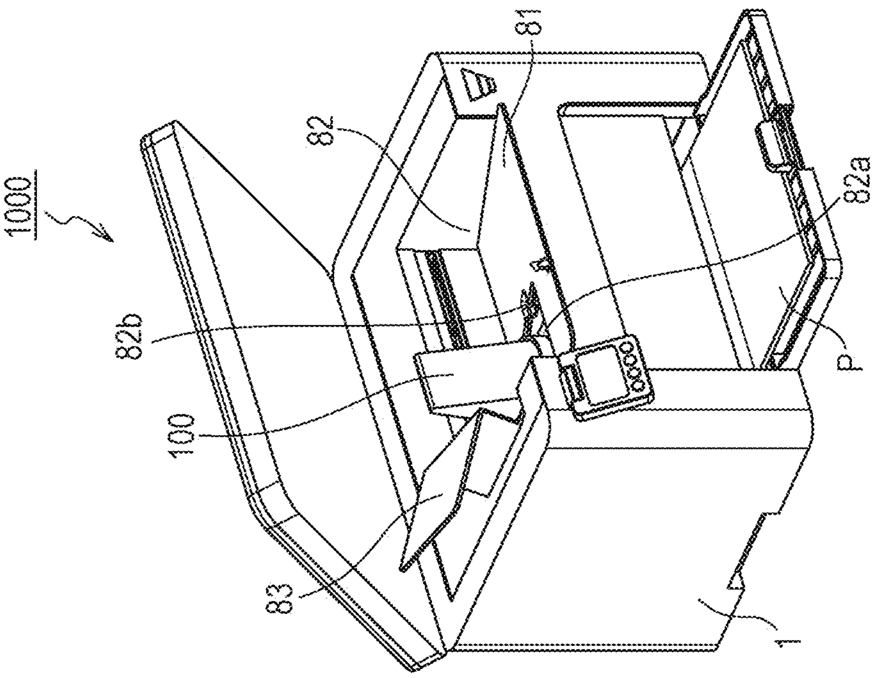

FIG. 2A is a schematic sectional view of the configuration of an image forming system 1000 according to a first embodiment. FIG. 2B is a perspective view of the image forming system 1000.

Figure 3:
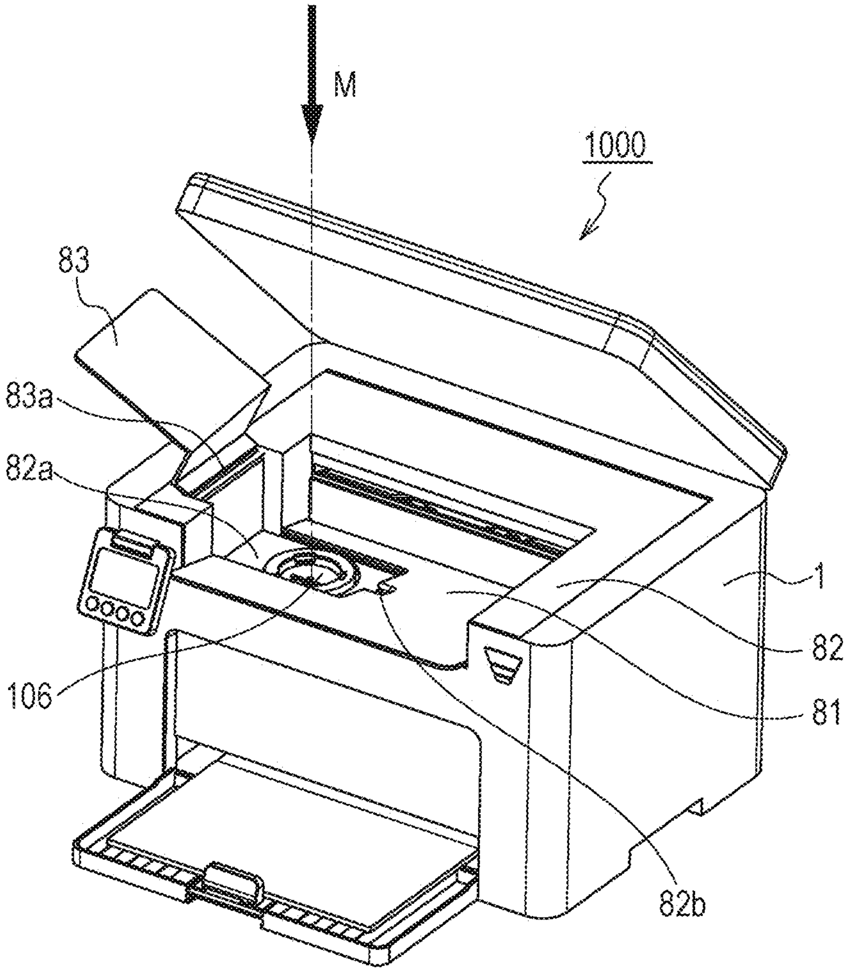
FIG. 3 is a perspective view of an image forming apparatus according to the first embodiment.

The image forming system 1000 includes an image forming apparatus 1, and a toner pack 100 (toner container, toner cartridge) mountable on the image forming apparatus 1. FIG. 3 is a perspective view of the image forming apparatus 1 on which no toner pack 100 is mounted.

The toner pack 100 stores the toner that is to be supplied to the image forming apparatus 1 with the toner pack 100 being mounted on an installation portion 106 of the image forming apparatus 1 illustrated in FIG. 3. The detailed configuration of the toner pack 100 will be described later. The toner pack 100 is moved in a mounting direction M illustrated in FIG. 3 to be mounted. The mounting direction M of the toner pack 100 is the gravitational direction in the present embodiment but may be a direction inclined relative to the gravitational direction.

Image Forming Apparatus

The image forming apparatus 1 is a monochrome printer that forms an image on a recording material P based on the image information input from an external device. Examples of the recording material P include papers such as a plain paper and a thick paper, a plastic film such as an overhead projector sheet, sheets having special shapes such as an envelope and an index paper, and sheet materials varying in material such as fabrics.

As FIGS. 2A and 2B illustrate, the image forming apparatus 1 includes the following constituents. The constituents are an image forming device 10 that forms a toner image on the recording material P, a pickup roller 65 that feeds the recording material P to the image forming device 10, a fixing portion 70 that fixes the toner image formed at the image forming device 10 to the recording material P, and a discharge roller pair 80.

The image forming device 10 includes a scanner unit 11, a process unit 20 of electrophotographic type, and a transfer roller 12 that transfers the toner image, as a developer image formed on a photoconductor drum 21 of the process unit 20, onto the recording material P. The process unit 20 includes the photoconductor drum 21, a charging roller 22, a pre-exposure portion 23, and a developing device 30 (developing unit, developing portion) including a development roller 31.

The photoconductor drum 21 (image carrying member) is a photosensitive member formed into a circular cylindrical shape. The photoconductor drum 21 in the present embodiment includes a drum-shaped base body formed by using aluminum, and a photosensitive layer, on the base body, formed by a negatively charged organic photosensitive member. In addition, the photoconductor drum 21 is rotationally driven by a motor in a predetermined rotational direction (the clockwise direction in the figure) at a predetermined process speed.

The charging roller 22 contacts the photoconductor drum 21 with a predetermined pressure contact force and forms a charging part. In addition, by applying a desired charging voltage by using a charging high-voltage power source, a surface of the photoconductor drum 21 is uniformly charged to a predetermined potential. In the present embodiment, the photoconductor drum 21 is charged to negative polarity by the charging roller 22. A surface potential of the photoconductor drum 21 before reaching the charging part is eliminated by the pre-exposure portion 23 for stable discharge at the charging part.

The scanner unit 11 serving as an exposure unit scans and exposes the surface of the photoconductor drum 21 by irradiating, using a polygon mirror, the photoconductor drum 21 with a laser light corresponding to the image information input from an external device. With this exposure, an electrostatic latent image corresponding to the image information is formed on the surface of the photoconductor drum 21. Note that the scanner unit 11 is not limited to a laser scanner device, and, for example, an LED exposure device including an LED array including plural LEDs aligned in the longitudinal direction of the photoconductor drum 21 may be employed.

The developing device 30 includes the development roller 31 serving as a developer carrying member that carries a developer, a developing container 32 (development frame) serving as a frame of the developing device 30, and a supply roller 33 that can supply the development roller 31 with the developer. The development roller 31 and the supply roller 33 are supported by the developing container 32 so as to be rotatable. In addition, the development roller 31 is disposed in an opening portion of the developing container 32 so as to face the photoconductor drum 21. The supply roller 33 is in contact with the development roller 31 so as to be rotatable, and the supply roller 33 supplies toner serving as the developer stored in the developing container 32, onto a surface of the development roller 31. Note that the supply roller 33 is not necessarily required as long as the toner can be supplied sufficiently to the development roller 31.

The developing device 30 in the present embodiment employs a contact developing method as a developing method. That is, a toner layer carried by the development roller 31 contacts the photoconductor drum 21 in a developing part (developing region) where the photoconductor drum 21 and the development roller 31 face each other. The development roller 31 is applied with a developing voltage by a developing high-voltage power source. Under the developing voltage, the toner carried by the development roller 31 is moved from the development roller 31 onto the drum surface according to the potential distribution of the surface of the photoconductor drum 21, and the electrostatic latent image is developed into a toner image. Note that the present embodiment employs a reversal developing method. That is, the toner adheres to a surface region, of the photoconductor drum 21, whose charge amount has been attenuated by being exposed in an exposing process after charged in a charging process, thereby forming the toner image.

In addition, in the present embodiment, there is used a toner, with a particle size of 6 μm, whose normal charge polarity is negative polarity. A polymerized toner produced by a polymerization method is employed as an example of the toner of the present embodiment. In addition, the toner in the present embodiment does not contain a magnetic component and is a so-called non-magnetic single component developer in which the toner is carried by the development roller 31 mainly by an intermolecular force or an electrostatic force (image force). However, a single component developer containing a magnetic component may also be used. In addition, there may be a case where a single component developer contains, in addition to toner particles, additives (examples of which include wax and silica fine particles) in order to adjust the fluidity and charging performance of the toner. In addition, a two-component developer constituted by a non-magnetic toner and a magnetic carrier may also be used as the developer. When a magnetic developer is used, for example, a developing sleeve having a circular cylindrical shape and provided with a magnet on the inner side thereof is used as the developer carrying member.

The developing container 32 includes a toner storage chamber 36 (second storage portion, storage portion of main body) storing the toner. A stirring member 34 (toner conveyance member) is provided inside the toner storage chamber 36. The stirring member 34 stirs the toner in the developing container 32 by rotating as driven by a motor, which is not illustrated, and conveys the toner toward the development roller 31 and the supply roller 33. The stirring member 34 also functions to make the toner in the developing container uniform by circulating, in the developing container, the toner that has not been used for the development and has been scraped out of the development roller 31. Note that the stirring member 34 is not limited to the rotating form. For example, a stirring member in a swinging form may also be employed.

In addition, at the opening portion of the developing container 32 where the development roller 31 is disposed, a developing blade 35 regulating the amount of the toner carried by the development roller 31 is disposed. The toner supplied onto the surface of the development roller 31 is uniformly thinned in a layer by passing through, with the rotation of the development roller 31, a facing part where the development roller 31 and the developing blade 35 face each other and is again charged to negative polarity by triboelectric charging.

Next, an image forming operation of the image forming apparatus 1 will be described. When a command for forming an image is input to the image forming apparatus 1, an image forming process performed by the image forming device 10 is started based on the image information input from an external computer connected to the image forming apparatus 1. The scanner unit 11 emits a laser light toward the photoconductor drum 21 based on the input image information. At this time, the photoconductor drum 21 has been charged by the charging roller 22 in advance, and an electrostatic latent image is formed on the photoconductor drum 21 by irradiating the photoconductor drum 21 with a laser light. The electrostatic latent image is then developed by the development roller 31 into a toner image on the photoconductor drum 21.

Alongside the image forming process described above, a recording material P is fed by the pickup roller 65 and is conveyed toward a transfer nip formed by the transfer roller 12 and the photoconductor drum 21.

The transfer roller 12 is applied with a transfer voltage from a transfer high-voltage power source, and the toner image carried by the photoconductor drum 21 is transferred onto the recording material P. When the recording material P, onto which the toner image has been transferred, passes through the fixing portion 70, the toner image is heated and applied with pressure. Thus, the toner particles are melted and subsequently adhered, and the toner image is thereby fixed on the recording material P. The recording material P that has passed through the fixing portion 70 is discharged to an outside region of the image forming apparatus 1 (outside the apparatus) by the discharge roller pair 80 serving as a discharge unit and is stacked on a discharge tray 81 serving as a stack portion formed in an upper portion of the image forming apparatus 1.

A top cover 82 serving as a loading tray is provided in the upper portion of the image forming apparatus 1, and the discharge tray 81 serving as a stack surface is formed on an upper surface of the top cover 82. As FIGS. 2B and 3 illustrate, the top cover 82 is provided with an opening and closing member 83 supported so as to be openable and closable about a rotating shaft 83*a* extending in a front-back direction. An opening portion 82*a* that is open upward is formed in the discharge tray 81 of the top cover 82. As FIG. 3 illustrates, the installation portion 106 provided for the mounting of the toner pack 100 is exposed through the opening portion 82*a*.

The opening and closing member 83 is movable between a closing position where the opening and closing member 83 covers the installation portion 106 so as to prevent the toner pack 100 from being mounted on the image forming apparatus 1 and an opening position where the opening and closing member 83 causes the installation portion 106 to be exposed so as to allow the toner pack 100 to be mounted on the image forming apparatus 1. The opening and closing member 83 functions as a part of the discharge tray 81 when at the closing position. The opening and closing member 83 and the opening portion 82*a* are formed on the left side of the discharge tray 81 when the image forming apparatus 1 is viewed from the front side. The front side of the image forming apparatus 1 described here is the upstream side of the image forming apparatus 1 in a direction where the recording material P is fed by the pickup roller 65. In addition, a user hooks a finger into a groove portion 82*b* provided in the top cover 82 and opens the opening and closing member 83 leftward.

The opening portion 82*a* of the discharge tray 81 is open such that the installation portion 106 formed in the upper portion of the image forming apparatus 1 is exposed, and the opening and closing member 83 is opened to allow a user to access the installation portion 106. Note that the present embodiment employs a direct supply method where a user supplies the toner from the toner pack 100 mounted on the installation portion 106 to the developing device 30 with the developing device 30 being mounted in the image forming apparatus 1. At least a portion of the toner pack 100 is exposed outside the image forming apparatus 1, with the toner pack 100 being mounted on the installation portion 106 of the image forming apparatus 1.

Usability can be improved because it is not required to remove the process unit 20 from the image forming apparatus 1 and replace a new process unit when the remaining amount of the toner in the process unit 20 becomes small. In addition, the toner can be supplied into the developing container 32 at lower cost than when the entire process unit 20 is replaced. Note that, even compared with when only the developing device 30 of the process unit 20 is replaced, the direct supply method enables cost reduction because the various rollers, gears, and other parts are not required to be replaced.

Installation Portion for Toner Pack

First, the configuration of the installation portion 106 will be described using FIGS. 4 to 9. In the present embodiment, the installation portion 106 is a unit provided for the mounting of the toner pack 100.

Figure 4A:
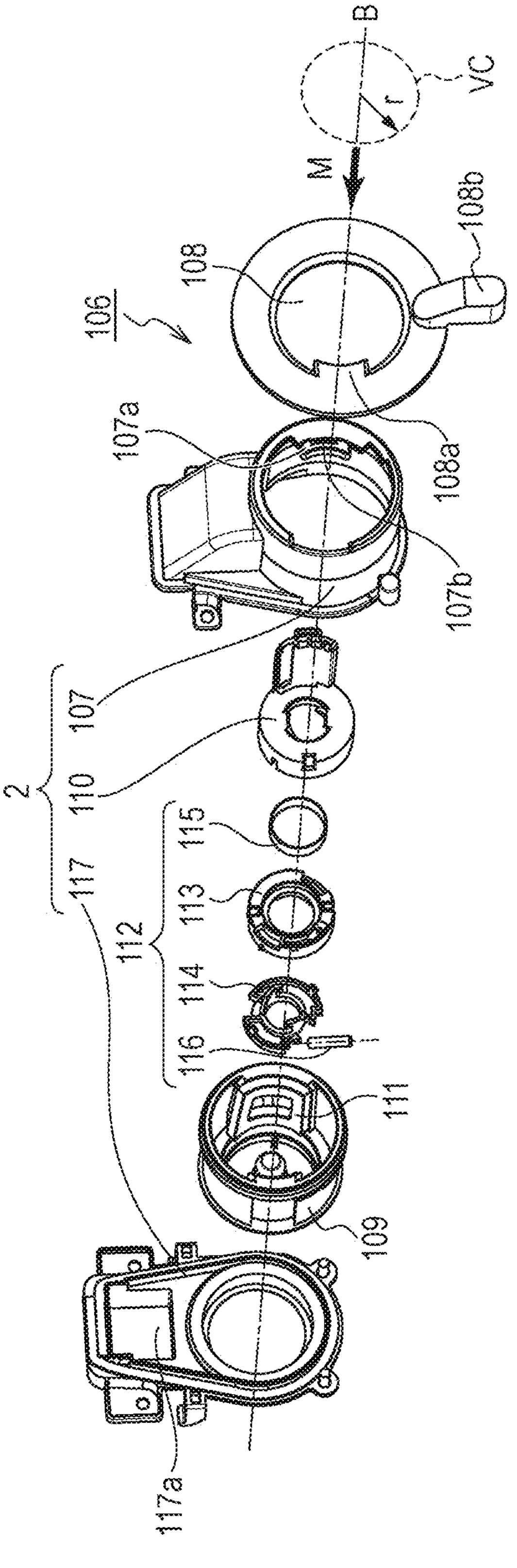
FIGS. 4A and 4B include exploded perspective views of the installation portion according to the first embodiment.
Figure 4B:
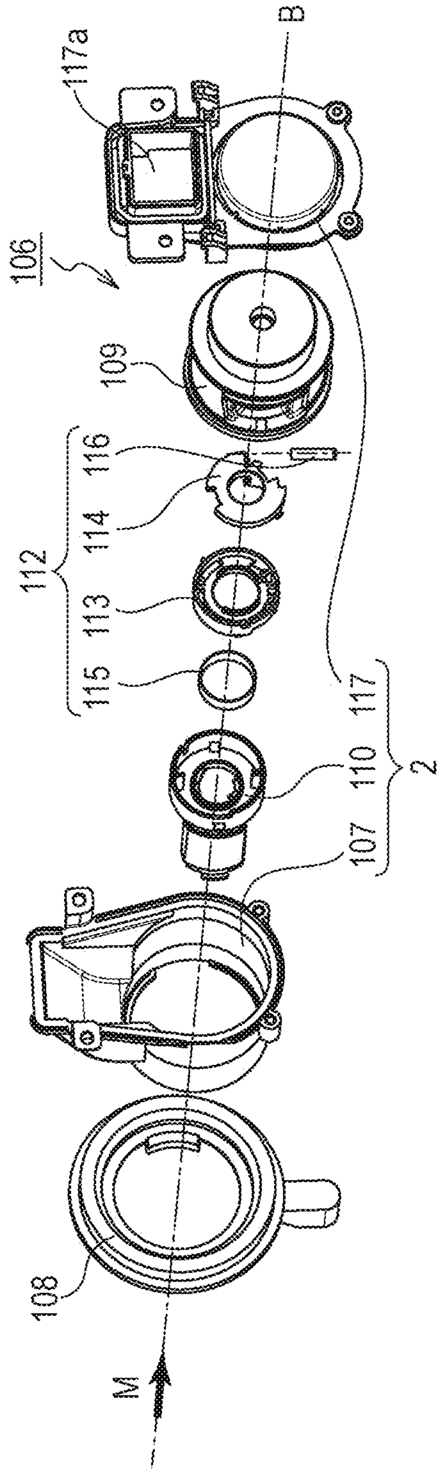
Figure 5B:
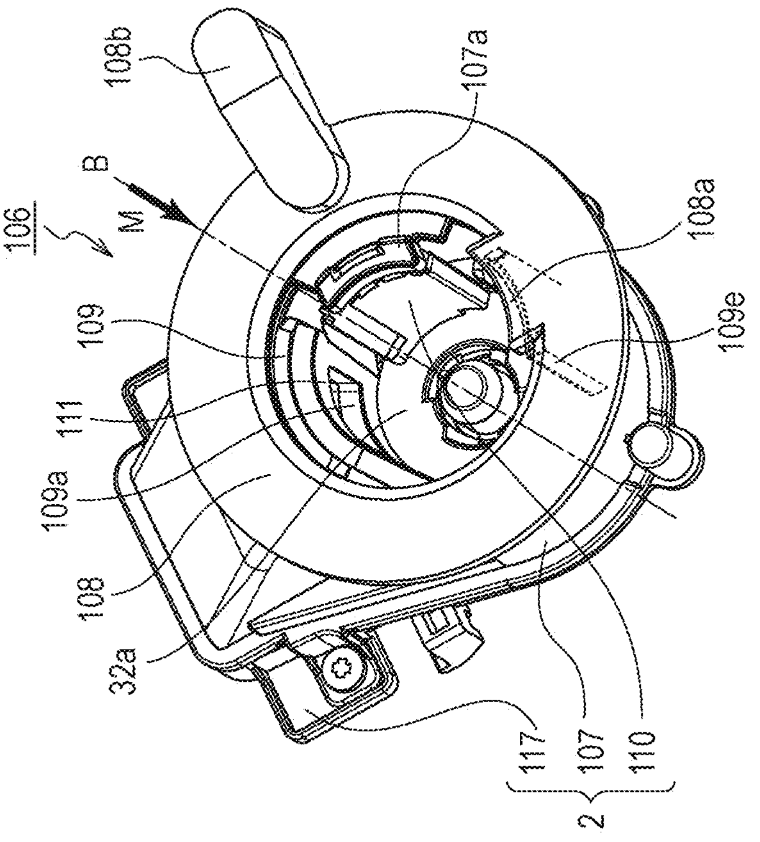
FIGS. 5A and 5B include external perspective views of the installation portion according to the first embodiment.
Figure 5A:
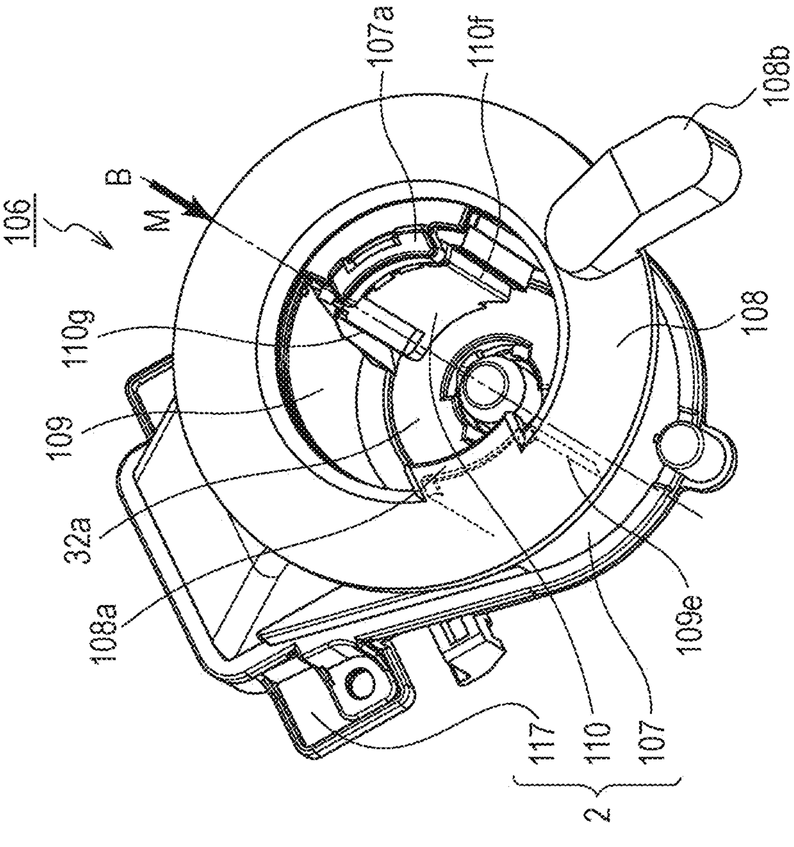
Figure 6B:
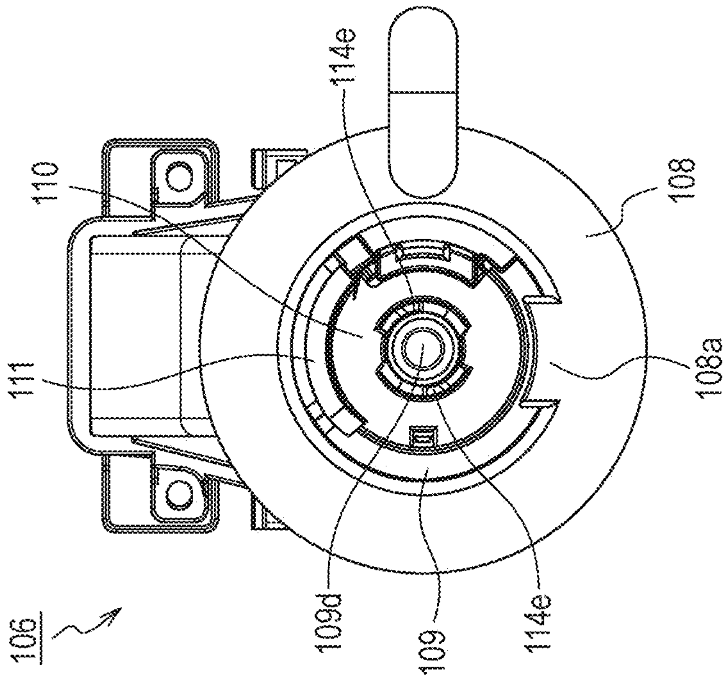
FIGS. 6A and 6B illustrate, from above, the installation portion according to the first embodiment.
Figure 6A:
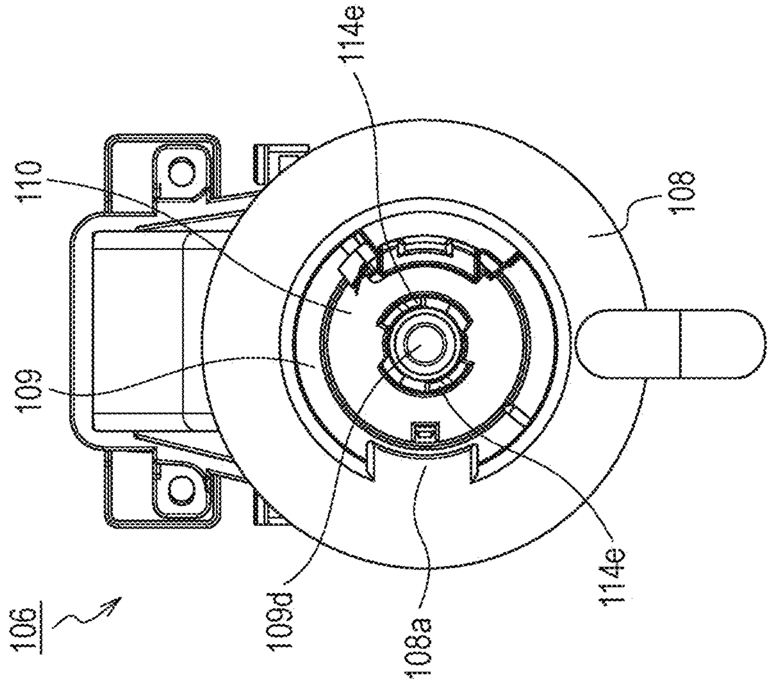
Figure 7:
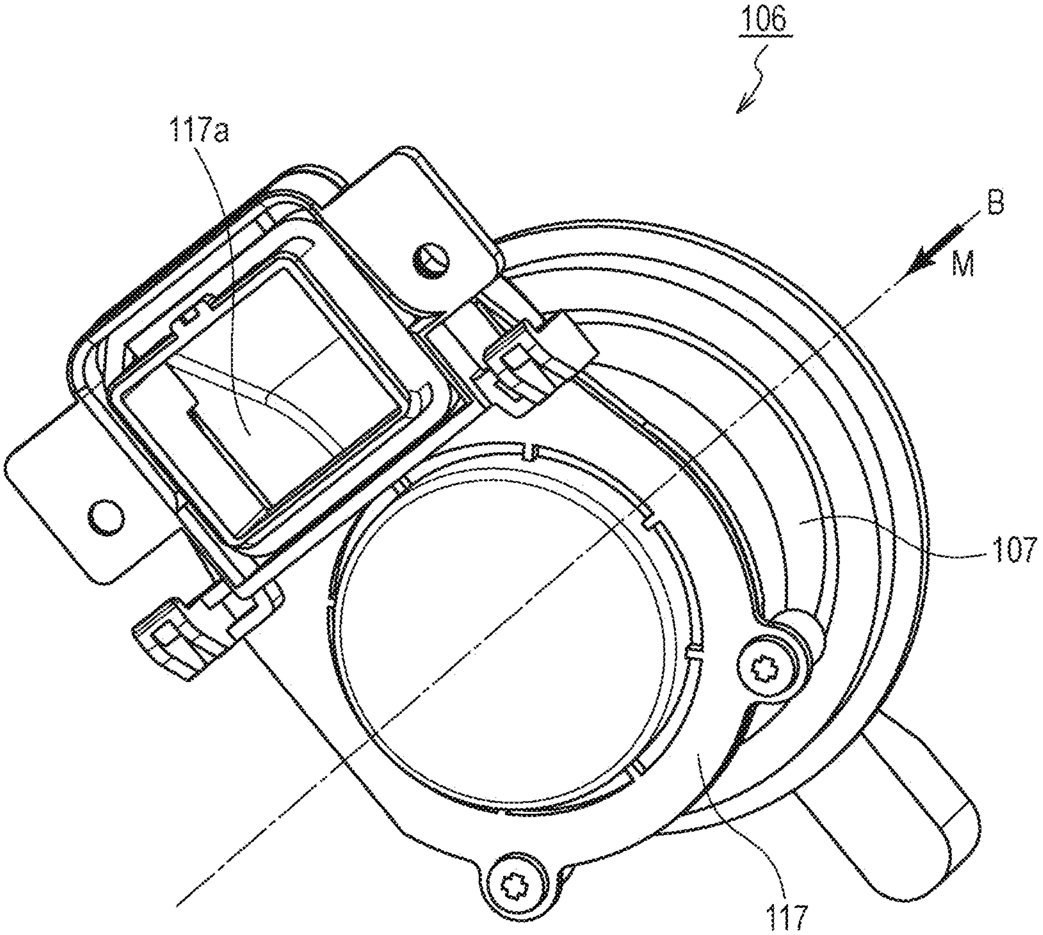
FIG. 7 illustrates, from below, the installation portion according to the first embodiment.

FIG. 4A is an exploded perspective view of the installation portion 106. FIG. 4B is an exploded perspective view of the installation portion 106 viewed in a direction different from that of FIG. 4A. FIGS. 5A and 6A are each a perspective view of the appearance of the installation portion 106, viewed in a mounting direction M, when an operation lever 108 is at a closing position. FIGS. 5B and 6A are each a perspective view of the appearance of the installation portion 106, viewed in the mounting direction M, when the operation lever 108 is at an opening position. FIG. 7 is a perspective view of the installation portion 106 viewed from the downstream side in the mounting direction M.

Figure 8B:
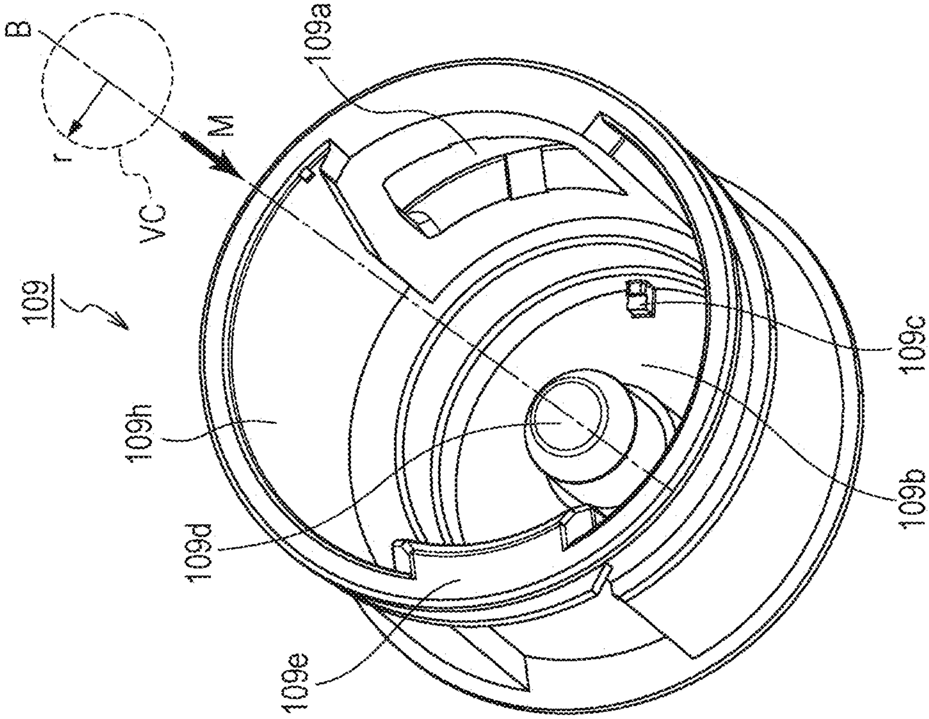
FIGS. 8A and 8B include perspective views of an apparatus-side shutter according to the first embodiment.
Figure 8A:
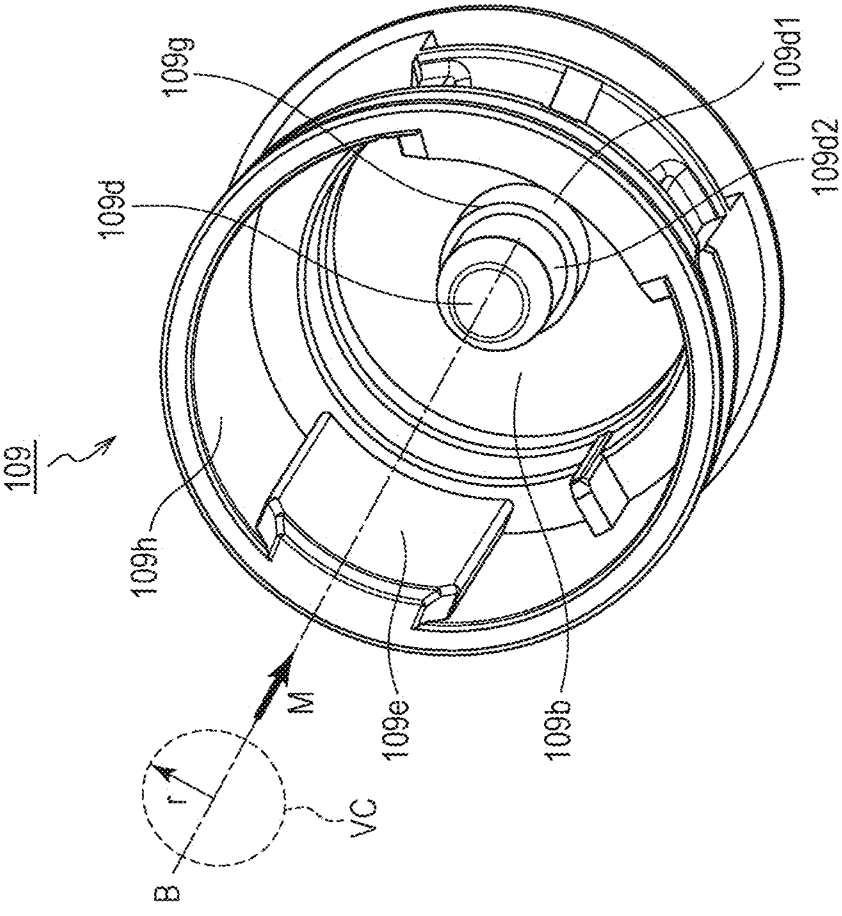

FIG. 8A is a perspective view of an apparatus-side shutter 109 viewed from the upstream side in the mounting direction M. FIG. 8B is a perspective view of the apparatus-side shutter 109 from a point of view different from that of FIG. 8A. FIG. 9A is a perspective view of a cover 110 viewed from the downstream side relative to the cover 110 in the mounting direction M.

Figure 9B:
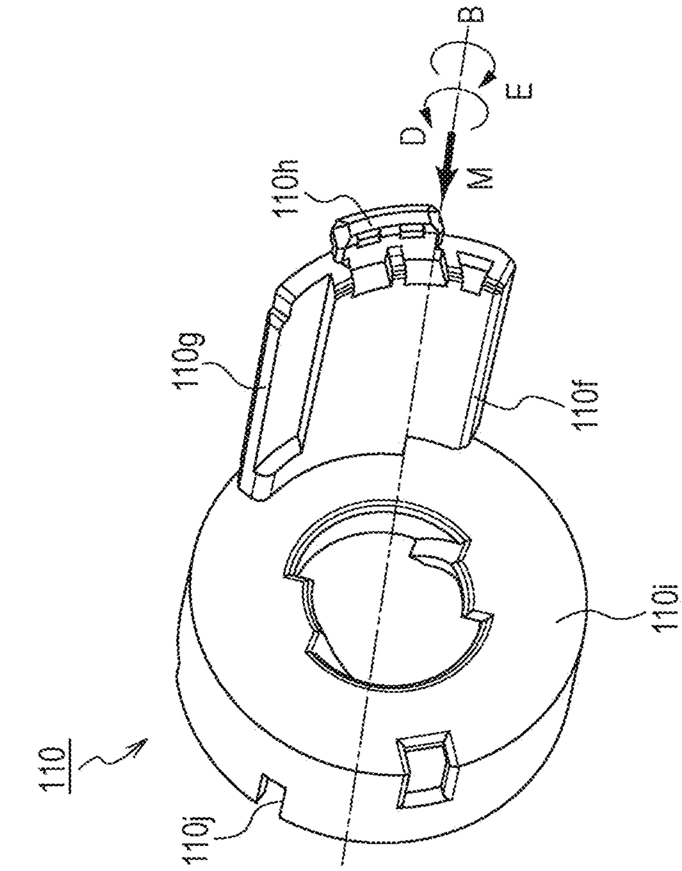
FIGS. 9A and 9B include perspective views of a cover according to the first embodiment.
Figure 9A:
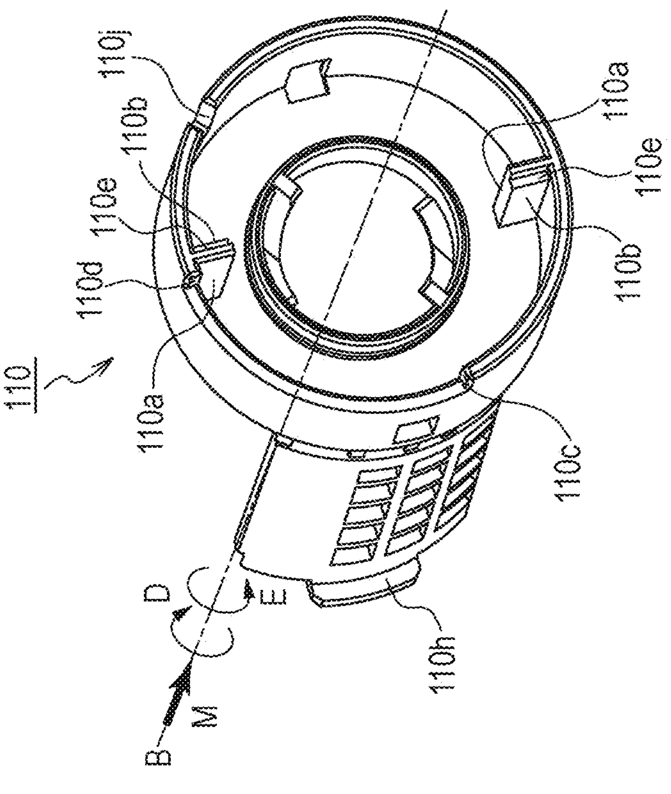

FIG. 9B is a perspective view of the cover 110 viewed from the upstream side in the mounting direction M.

The installation portion 106 illustrated in FIGS. 3 and 5 includes a base frame 2 including a first frame 107, a second frame 117, and the cover 110. The cover 110 and the second frame 117 are fixed to the first frame 107. As FIG. 9 illustrates, the cover 110 includes an engaged portion 110*h*, and the engaged portion 110*h* is engaged with an engaging portion 107*b* (FIG. 4A) of the first frame 107 such that the cover 110 is prevented from rotating about a rotational axis B relative to the first frame 107. Note that the first frame 107, the cover 110, and the second frame 117 are not necessarily different members and may be configured as one body. As FIGS. 4 and 7 illustrate, the second frame 117 has an apparatus-side opening 117*a* (frame opening, receiving opening), and the apparatus-side opening 117*a* communicates with the toner storage chamber 36 of the developing device 30 (refer to FIG. 2A).

The operation lever 108 and the apparatus-side shutter 109 (second shutter) are each attached to the base frame 2 so as to be rotatable about the rotational axis B (center axis) relative to the base frame 2.

The first frame 107 includes a positioning portion 107*a*. In a radial direction r of an imaginary circle VC centered around the rotational axis B, the positioning portion 107*a* protrudes inward relative to an inner peripheral surface, of the first frame 107, centered around the rotational axis B. In addition, the operation lever 108 includes a drive transmission portion 108*a* (protruded portion of lever) and an operation portion 108*b*. As FIG. 4A illustrates, the drive transmission portion 108*a* of the operation lever 108 is a protruded portion protruded inward, in the radial direction r of the imaginary circle VC centered around the rotational axis B, relative to an inner peripheral surface of the operation lever 108 centered around the rotational axis B.

The apparatus-side shutter 109 is a cylindrical member whose upper side is open. As FIG. 8 illustrates, the apparatus-side shutter 109 has a receiving inlet 109*a* (second shutter opening, apparatus-side shutter opening) in a side surface portion, of the apparatus-side shutter, extending in the direction of the rotational axis B, and the apparatus-side shutter 109 has a bottom surface 109*b* provided with a regulated rib 109*c* (rotating regulated portion). The apparatus-side shutter 109 further includes a center boss 109*d* (positioning shaft, shaft portion), a driven transmission portion 109*e* (pushed portion, protruded portion of apparatus-side shutter), a pack contact surface 109*g* (mounting-direction positioning), and an inner peripheral surface 109*h* (radial-direction positioning). The apparatus-side shutter 109 is rotatable about the rotational axis B relative to the base frame 2.

The regulated rib 109*c* protrudes upward from the bottom surface 109*b* in the direction of the rotational axis B. As FIG. 8A illustrates, the driven transmission portion 109*e* is a protruded portion protruded inward in the radial direction r of the imaginary circle VC centered around the rotational axis B. An apparatus-side seal 111 is stuck around the receiving inlet 109*a* (refer to FIG. 5B).

Here, the apparatus-side shutter 109 is rotatable, relative to the base frame 2, so as to take a closing position and an opening position. The receiving inlet 109*a* is covered with the apparatus-side seal 111 and the cover 110 when the apparatus-side shutter 109 is at the closing position, and the receiving inlet 109*a* is open without being covered with the cover 110 when the apparatus-side shutter 109 is at the opening position. The closing position is the position given in FIGS. 5A and 6A, and the receiving inlet 109*a* of the apparatus-side shutter 109 does not communicate with the apparatus-side opening 117*a* of the second frame 117 when the apparatus-side shutter 109 is at the closing position (non-communication position). The opening position is the position illustrated in FIGS. 5B and 6B, and the receiving inlet 109*a* of the apparatus-side shutter 109 communicates with the apparatus-side opening 117*a* of the second frame 117 when the apparatus-side shutter 109 is at the opening position (communication position). The apparatus-side shutter 109 moves to the opening position, and the toner can thereby be supplied (fed) from the toner pack 100 into the toner storage chamber 36 of the developing device 30 through the receiving inlet 109*a*.

Note that, because the operation lever 108 and the apparatus-side shutter 109 are not coupled regarding driving, the apparatus-side shutter 109 is not rotated when the operation lever 108 is operated with the toner pack 100 not being attached.

Toner Pack

Figure 10A:
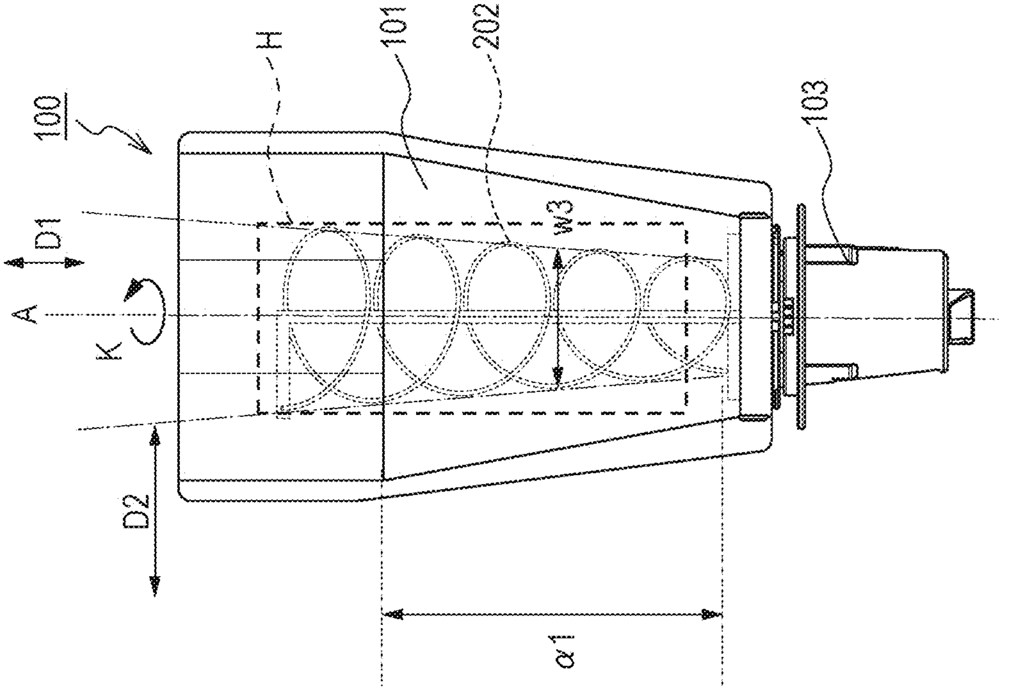
FIGS. 10A and 10B include front views of the toner pack according to the first embodiment.
Figure 10B:
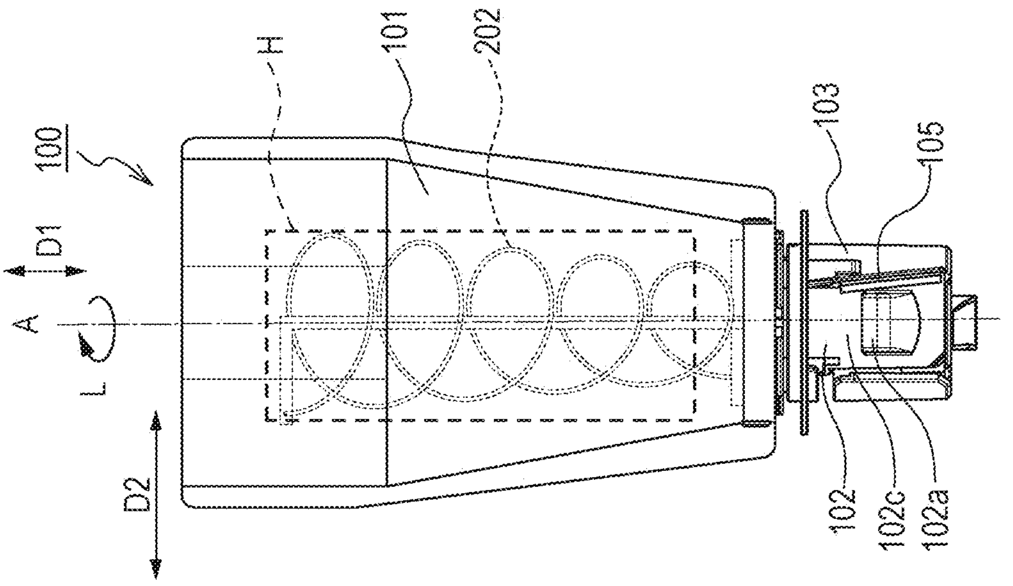
Figure 11:
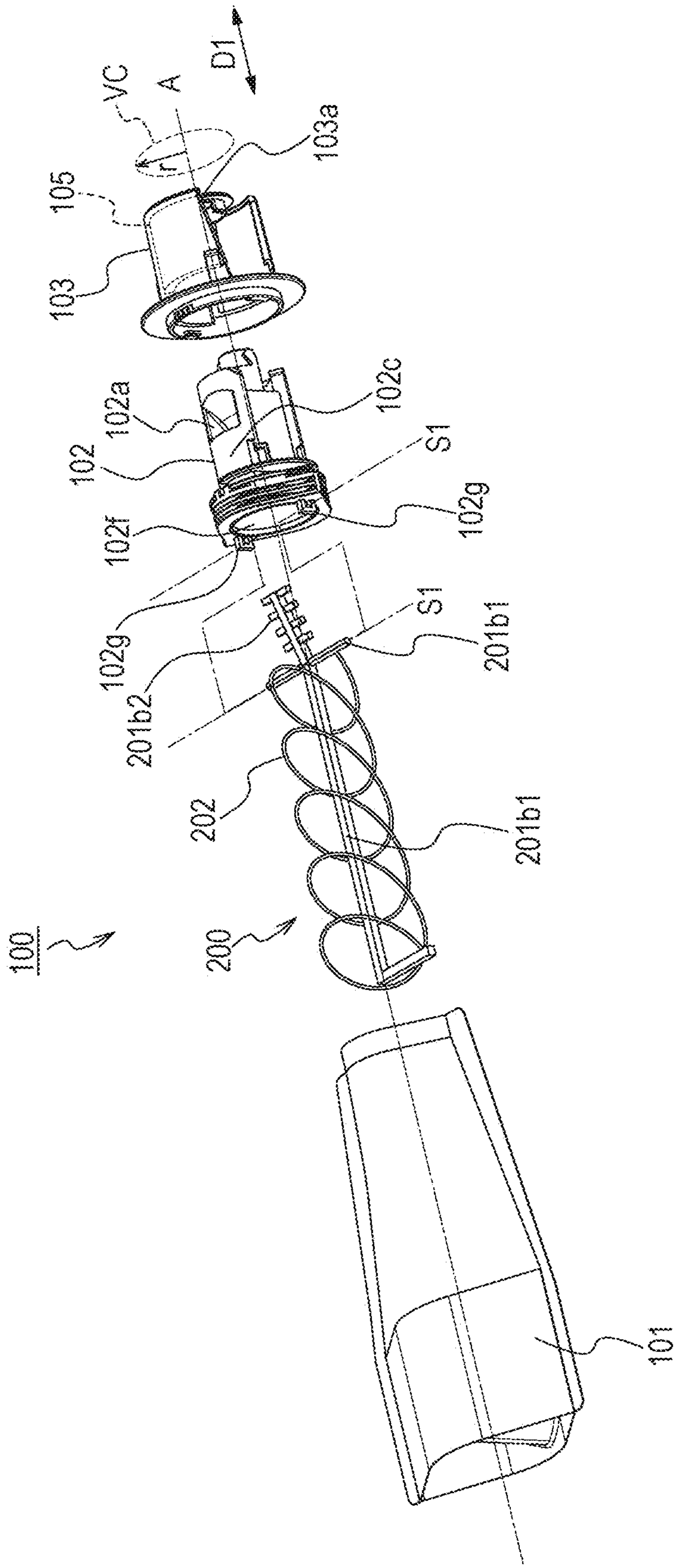
FIG. 11 is an exploded perspective view of the toner pack according to the first embodiment.
Figure 12B:
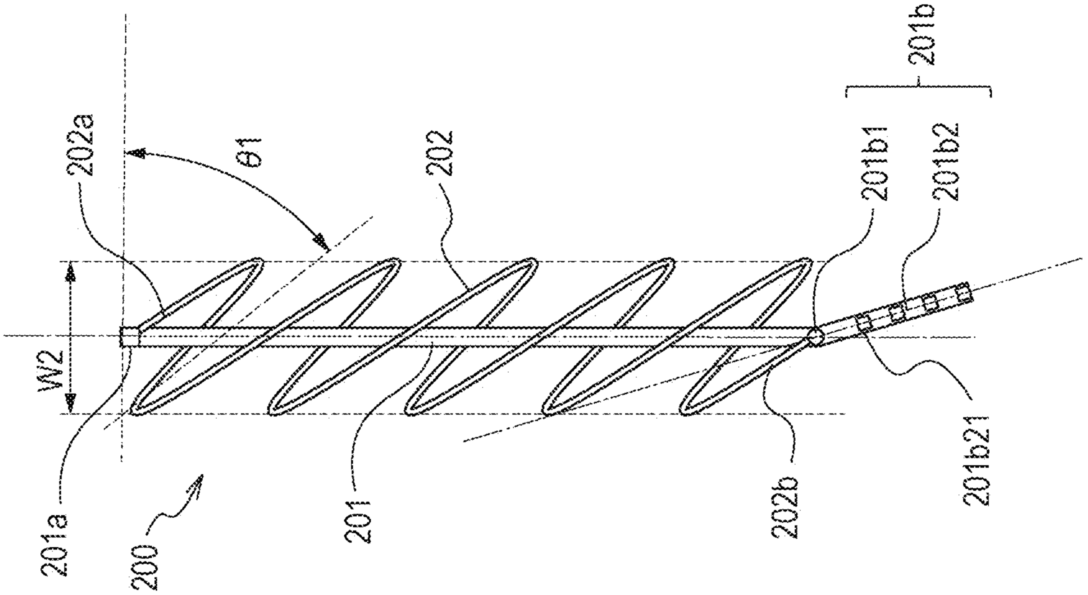
FIGS. 12A and 12B include a front view and a side view of a loosening member according to the first embodiment.
Figure 12A:
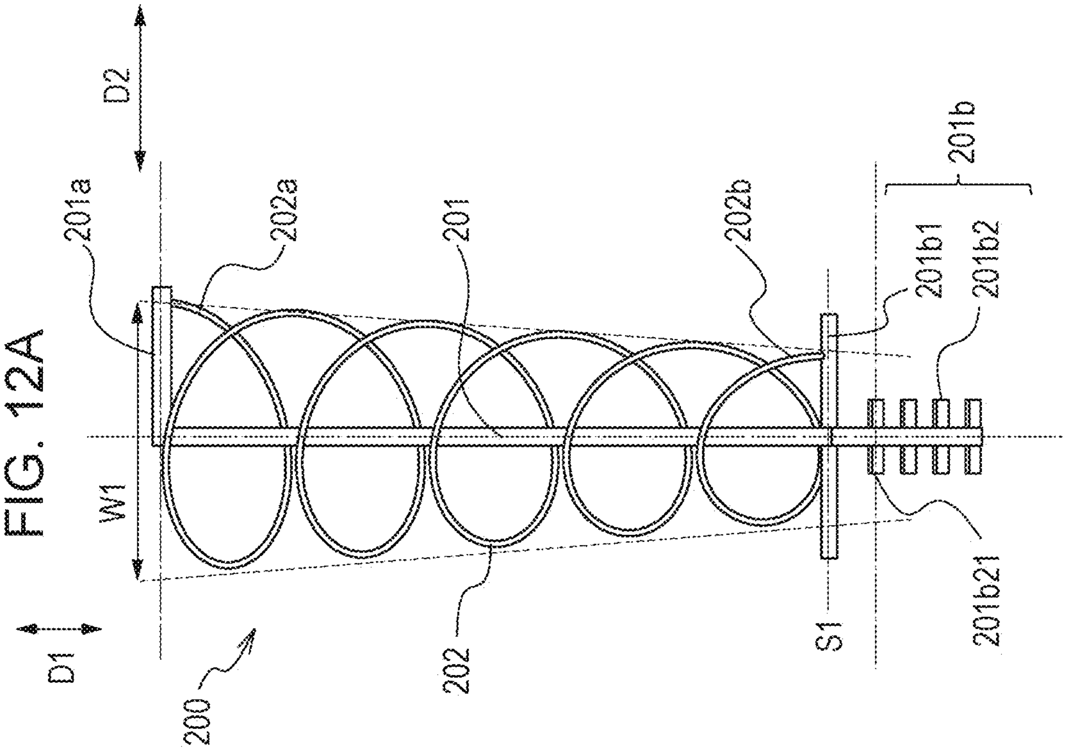
Figure 13B:
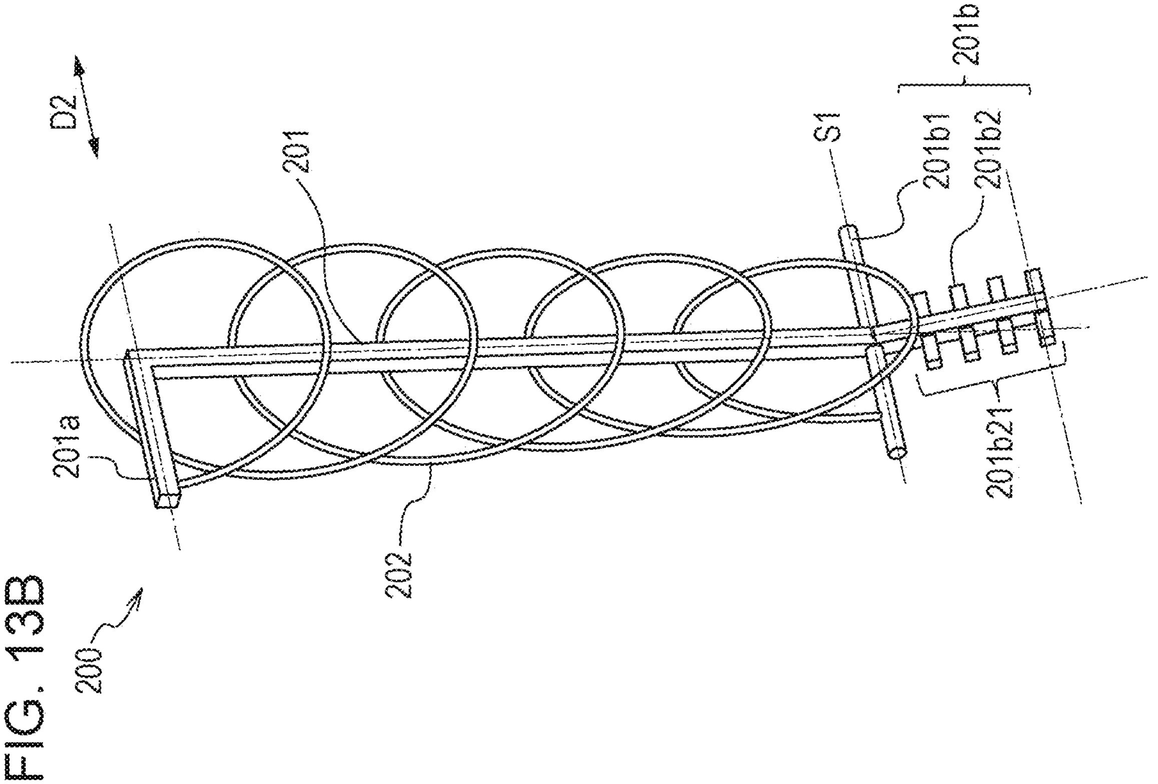
FIGS. 13A and 13B include perspective views of the loosening member according to the first embodiment.
Figure 13A:
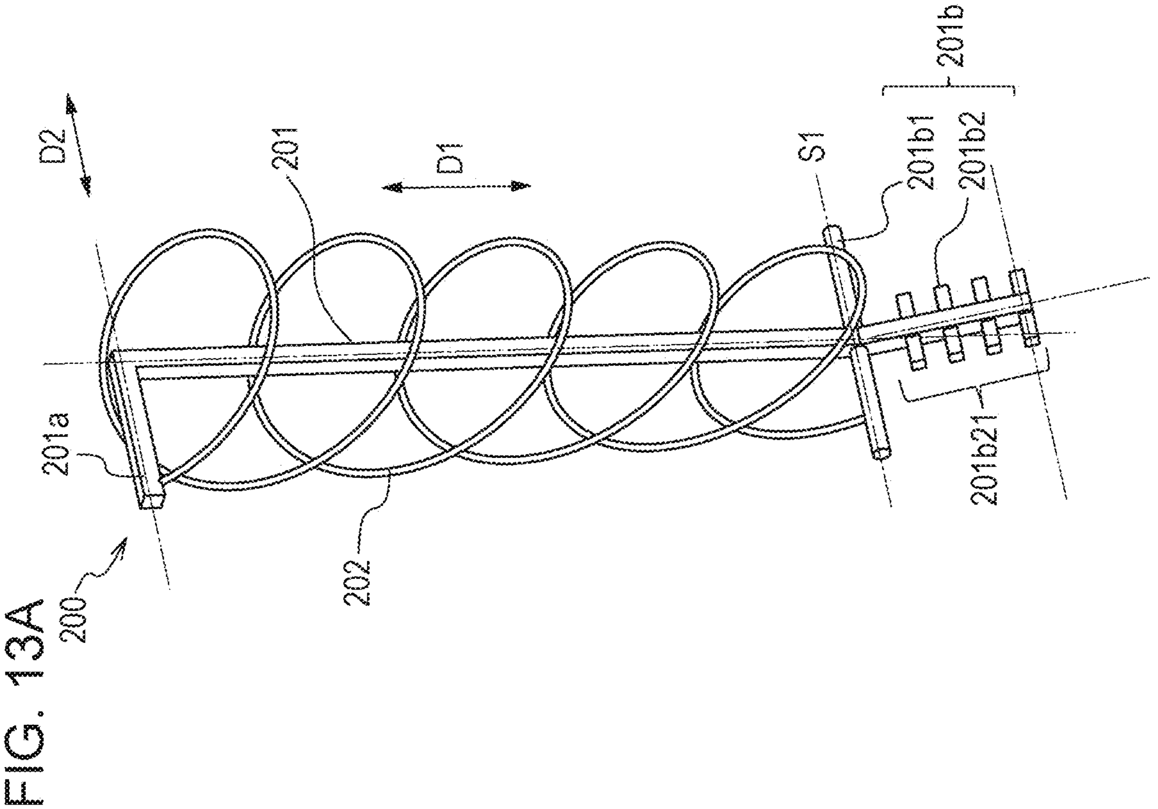
Figure 14:
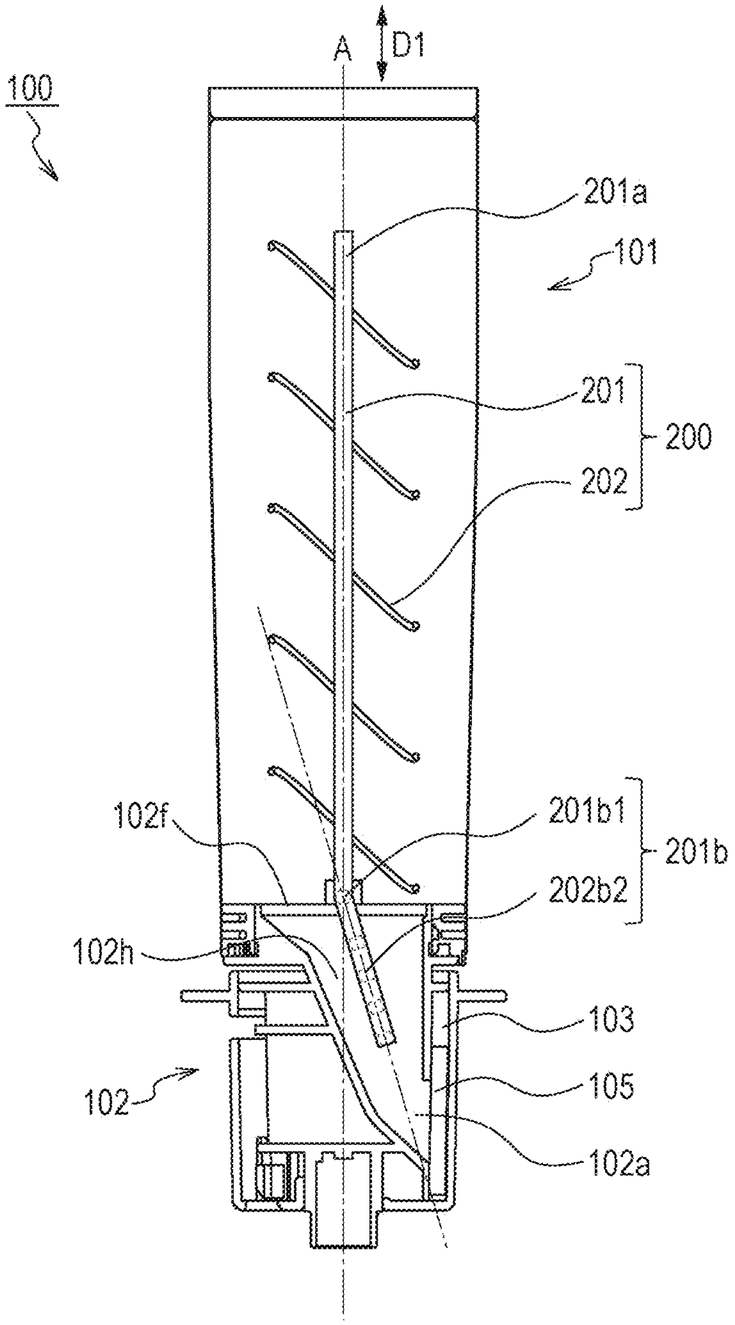
FIG. 14 is a sectional view of the toner pack according to the first embodiment.

The basic configuration of the toner pack 100 will be described using FIGS. 10 to 14. FIG. 10A is a front view of the toner pack 100 when a pack-side shutter 103 is at a closing position. FIG. 10B is a front view of the toner pack 100 when the pack-side shutter 103 is at an opening position. FIG. 11 is an exploded perspective view of the toner pack 100. FIG. 12A is a front view of a loosening member 200. FIG. 12B is a side view of the loosening member 200. FIG. 13A is a perspective view of the loosening member 200. FIG. 13B is a perspective view of the loosening member 200 in a state of being elastically deformed. FIG. 14 is a sectional view of the toner pack 100.

Toner pack 100 includes a storage portion 101 (first storage portion) storing the toner, a nozzle 102 (nozzle portion, pipe, tube, valve, discharging portion), the pack-side shutter 103 (container shutter, rotary member), and the loosening member 200 (refer to FIG. 12). As FIG. 10 illustrates, in a first direction D1, the storage portion 101 is provided on one end side, and the nozzle 102 and the pack-side shutter 103 are provided on the other end side. The storage portion 101 and the nozzle 102 are aligned in the first direction D1.

The storage portion 101 is a pouch formed by a polypropylene sheet (flexible sheet) being subjected to pouch processing. As FIGS. 10 and 11 illustrate, the storage portion 101 has a flat shape in which a width in a second direction D2 is greater than a width in a third direction crossing both the first direction D1 and the second direction D2. As FIG. 10A illustrates, the shape includes a region al of the storage portion 101 in which a width in the second direction D2 increases as a distance from the nozzle 102 increases.

The nozzle 102 in the present embodiment is formed by polypropylene. A side surface 102*c* (first outer surface), of the nozzle 102, extending in the first direction D1 has a discharging port 102*a* (nozzle opening, first opening) communicating with the inside of the storage portion 101. The toner stored in the storage portion 101 is discharged outside the toner pack 100 through the discharging port 102*a*. As FIG. 14 illustrates, the nozzle 102 has a receiving inlet 102*f* that receives the toner from the storage portion 101 and a passage 102*h* allowing the toner to pass through from the receiving inlet 102*f* to the discharging port 102*a*. In the present embodiment, the discharging port 102*a* is provided in the side surface 102*c* extending in the first direction D1.

Note that the nozzle 102 and the storage portion 101 may be configured as one body. In addition, a seal may be provided between the storage portion 101 and the discharging port 102*a* of the nozzle 102, and the storage portion 101 and the discharging port 102*a* may communicate with each other when the seal is removed.

The pack-side shutter 103 (rotary member) is provided on the outer side relative to the side surface 102*c* of the nozzle 102. The pack-side shutter 103 is attached so as to be rotatable about a rotational axis A (first rotational axis) extending in the first direction D1 and has an opening 103*a* (opening of rotary member, first shutter opening) as FIG. 11 illustrates. The pack-side shutter 103 is provided on the outer side relative to the side surface 102*c* in the radial direction r of the imaginary circle VC centered around the rotational axis A. The side surface 102*c* of the nozzle 102 is a curved surface curved outward in the radial direction r of the imaginary circle VC centered around the rotational axis A. A surface on the inner side of the pack-side shutter 103 (surface facing the side surface 102*c*) is a curved surface curved along the side surface 102*c* of the nozzle 102, and a pack-side seal 105 having a substantially rectangular shape is attached to the curved surface. Note that the side surface 102*c* of the nozzle 102 is also a surface extending along the rotational axis A.

The loosening member 200 includes, as FIG. 12A illustrates, a base portion 201 and a first loosening portion 202 (elastic portion) formed by a wire spring (wire material).

The base portion 201 is provided from the storage portion 101 to the passage 102*h* of the nozzle 102 such that the longitudinal direction thereof coincides with the first direction D1, and the base portion 201 includes a first end portion 201*a* that is one end portion in the longitudinal direction and a second end portion 201*b* that is the other end portion in the longitudinal direction. The first end portion 201*a* is a free end including a portion extending in the second direction D2 orthogonal to the first direction D1. A second loosening portion 201*b*2 is provided in the second end portion 201*b* so as to be positioned in the passage 102*h* of the nozzle 102.

One end portion 202*a* (third end portion) and the other end portion 202*b* (fourth end portion) of the first loosening portion 202 are supported by the first end portion 201*a* and the second end portion 201*b* of the base portion 201, respectively. As FIG. 12B illustrates, the first loosening portion 202 has a substantially helical shape wound around the base portion 201 from the one end portion 202*a* toward the other end portion 202*b* so as to form an ellipse forming an angle of θ1 with a direction orthogonal to the longitudinal direction of the base portion 201. In other words, the first loosening portion 202 is a wire spring (wire material) extending in the first direction D1 while turning around the base portion 201. A minor axis W2 of the first loosening portion 202 is uniform in the longitudinal direction, whereas a major axis W1 of the first loosening portion 202 decreases from the one end portion 202*a* toward the other end portion 202*b* as FIG. 12A illustrates. In other words, in the region al (FIG. 10A) of the storage portion 101 described above, a width W3 (the major axis W1) of the first loosening portion 202 in the second direction D2 increases, according to the width of the storage portion 101, as a distance from the nozzle 102 increases. In addition, the second loosening portion 201*b*2 has plural protruding portions 201*b*21 extending in the second direction D2 and aligned in the first direction D1.

Because the first loosening portion 202 is formed by a wire spring, the first loosening portion 202 transitions from the state of FIG. 13A to the state of the FIG. 13B. The first loosening portion 202 elastically deforms so as to be displaced relative to the base portion 201 when applied with force.

The second end portion 201*b* of the base portion 201 is provided with a supported portion 201*b*1 (swing shaft portion) having a shaft shape, and supporting hole portions 102*g* (supporting portions) provided in the nozzle 102 support the supported portion 201*b*1 as FIG. 11 illustrates. Thus, the base portion 201 is supported by the nozzle 102 so as to be swingable relative to the nozzle 102 about a swing axis S1 of the supported portion 201*b*1. When the base portion 201 swings about the swing axis S1, a second loosening portion 202*b*2 inside the passage 102*h* of the nozzle 102 also swings about the swing axis S1. The first loosening portion 202 and the second loosening portion 202*b*2 are on the sides opposite from each other in the longitudinal direction of the base portion 201 relative to the supported portion 201*b*1. The swing axis S1 in the present embodiment extends in the second direction D2 according to the shape (flat shape) of the storage portion 101, and there is not caused the swing about an imaginary line extending in the third direction crossing both the first direction D1 and the second direction D2. However, in addition to the swing about the swing axis S1 extending in the second direction D2, swing may also be caused about a swing axis extending in the third direction crossing both the first direction D1 and the second direction D2. Swing may be caused in every direction crossing the first direction D1. Note that the movement of the loosening member 200 accompanying a supply operation using the toner pack 100 and performed by a user will be described later.

As FIG. 10 illustrates, the pack-side shutter 103 is rotatable about the rotational axis A, between a closing position and an opening position. The pack-side seal 105 closes the discharging port 102*a* of the nozzle 102 when the pack-side shutter 103 is at the closing position, and the discharging port 102*a* is open when the pack-side shutter 103 is at the opening position. When the pack-side shutter 103 is at the opening position, the discharging port 102*a* of the nozzle 102 is exposed through the opening 103*a*.

FIGS. 10A and 10B illustrate the state where the pack-side shutter 103 is at the closing position and the state where the pack-side shutter 103 is at the opening position, respectively. As FIG. 10A illustrates, when the pack-side shutter 103 at the closing position is rotated about the rotational axis A in an allow K direction (first rotational direction), the pack-side shutter 103 reaches the opening position illustrated in FIG. 10B. Conversely, when the pack-side shutter 103 is rotated in an allow L direction (second rotational direction) from the opening position, the pack-side shutter

103 reaches the closing position. In the rotation operation of the pack-side shutter 103, the pack-side shutter 103 slide with the side surface 102*c* of the nozzle 102 with the pack-side seal 105 therebetween.

The detailed configurations of the nozzle 102 and the pack-side shutter 103 will be described using FIGS. 15 to 17. An arrow N direction is a direction from the storage portion 101 toward the nozzle 102, and an arrow U direction is a direction opposite to the arrow N direction. The arrow N direction and the arrow U direction are parallel to the rotational axis A.

Figure 15B:
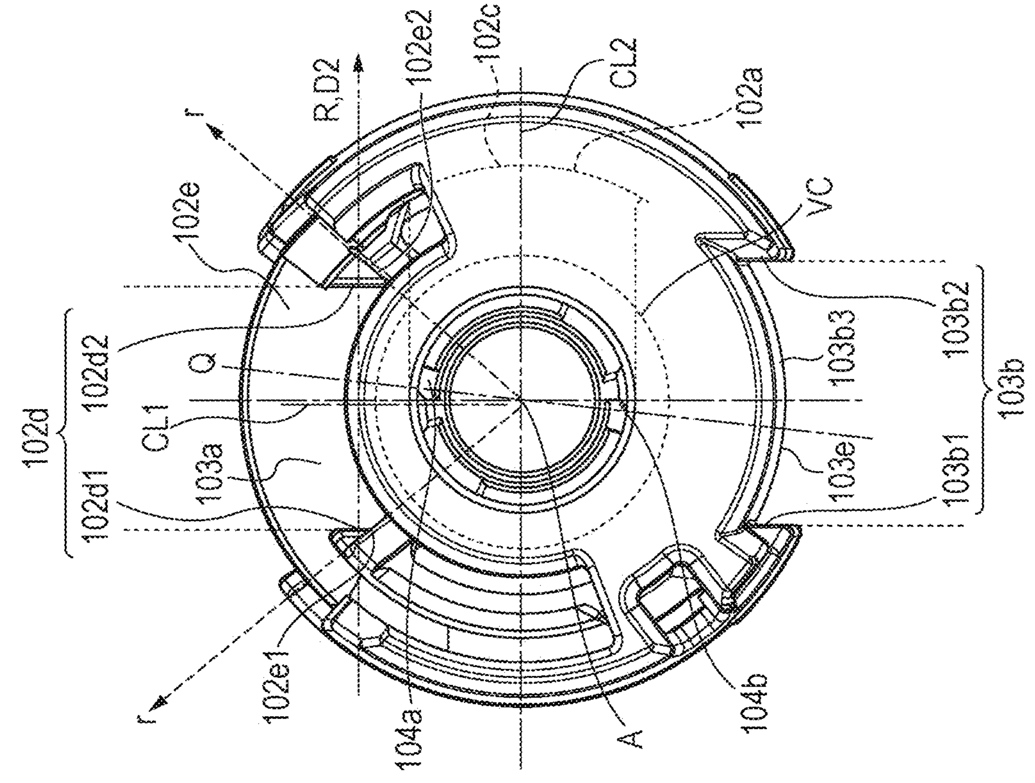
FIGS. 15A and 15B include a perspective view and a bottom view of the vicinity of a nozzle according to the first embodiment (when a pack-side shutter is closed).
Figure 15A:
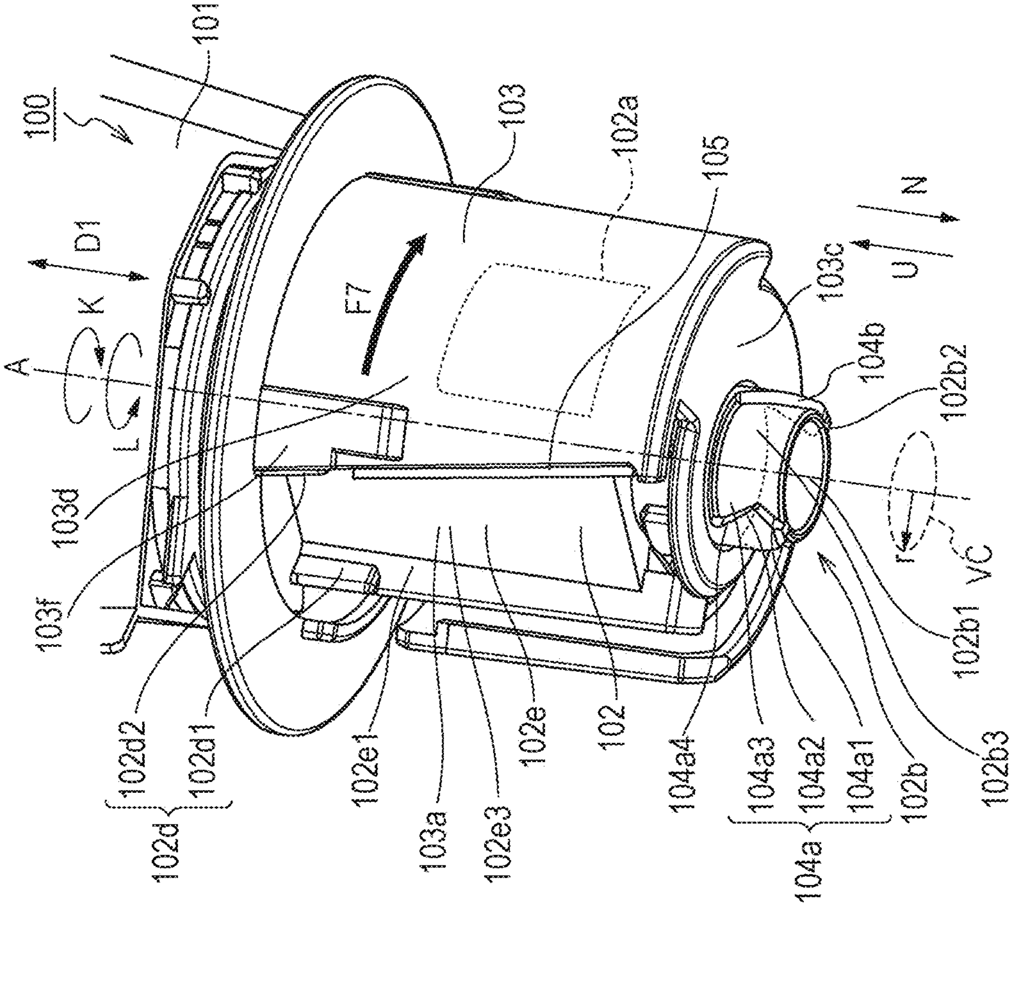
Figure 16B:
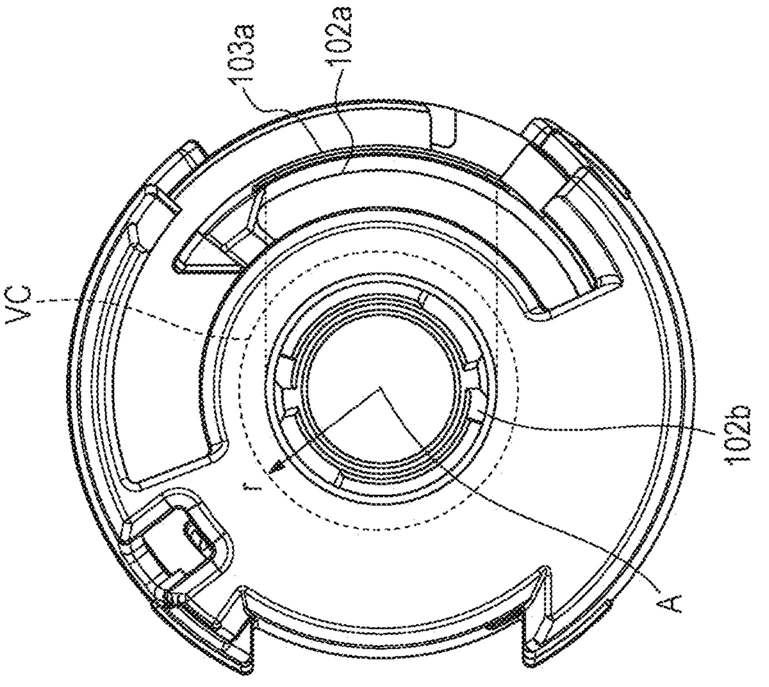
FIGS. 16A and 16B include a perspective view and a bottom view of the vicinity of the nozzle according to the first embodiment (when the pack-side shutter is open).
Figure 16A:
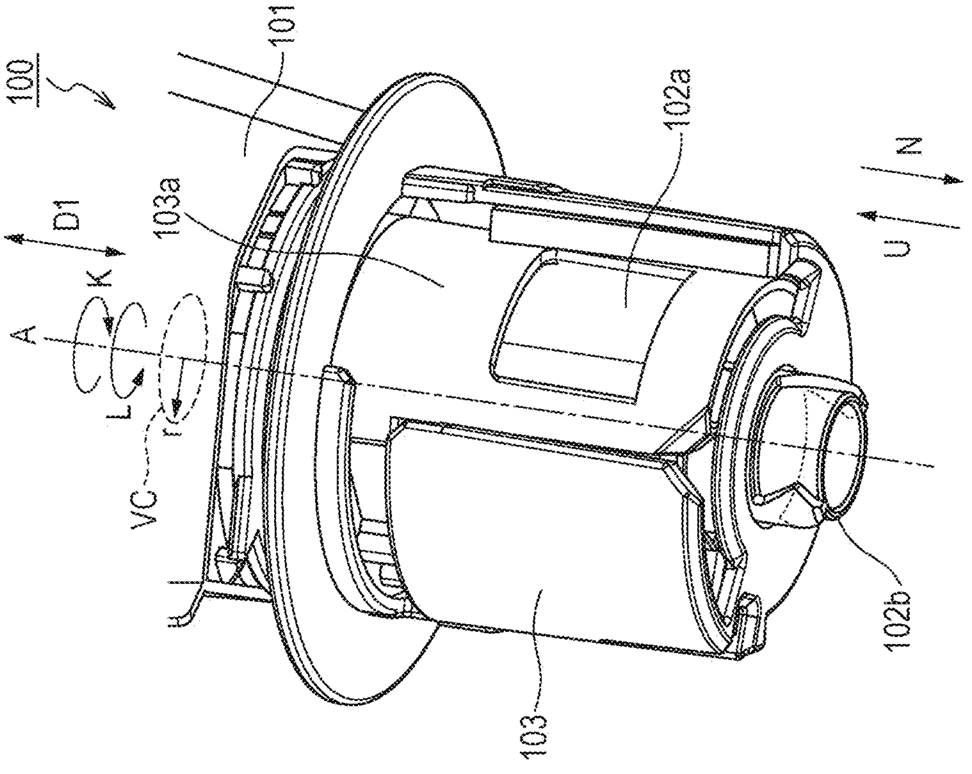

FIG. 15A is an enlarged view of the vicinity of the nozzle 102 when the pack-side shutter 103 is at the closing position. FIG. 15B illustrates the toner pack 100 viewed in the arrow U direction in FIG. 15A. FIG. 16A is an enlarged view of the vicinity of the nozzle 102 when the pack-side shutter 103 is at the opening position. FIG. 16B illustrates the toner pack 100 viewed in the arrow U direction in FIG. 16A. FIG. 17 illustrates the vicinity of the nozzle 102 viewed from the side opposite from that of FIG. 14.

As FIGS. 15A and 15B illustrate, the nozzle 102 includes a positioned portion 102*d* having a surface 102*d*1 (first nozzle surface, first opposed surface) and a surface 102*d*2 (second nozzle surface, second opposed surface). The surface 102*d*1 and the surface 102*d*2 are spaced in an arrow R direction (the second direction D2) so as to be opposed to each other and extend in a direction crossing the R direction. As FIG. 15B illustrates, the surface 102*d*1 and the surface 102*d*2 in the present embodiment extend in a direction perpendicular to the arrow R direction and are parallel to each other. That is, the arrow R direction is the normal direction of each of the surface 102*d*1 and the surface 102*d*2. The positioned portion 102*d* is engaged with the positioning portion 107*a* (FIG. 4A) of the first frame 107 when the toner pack 100 is mounted on the installation portion 106. Thus, the position of the nozzle 102 relative to the first frame 107 (the base frame 2) in the arrow R direction is determined. Accordingly, the position of the nozzle 102 relative to the first frame 107 in a rotational direction around the rotational axis A is also determined. In FIG. 15B, a straight line CL1 (first imaginary straight line), while extending through the center in the R direction between the surface 102*d*1 and the surface 102*d*2, extends in a direction perpendicular to the arrow R direction, and the straight line CL1 is in a phase rotated by approximately 90 degrees relative to a straight line CL2 (second imaginary straight line) passing across the rotational axis A and extending through the center of the discharging port 102*a*. That is, the straight line CL1 and the straight line CL2 are orthogonal to each other.

Figure 18:
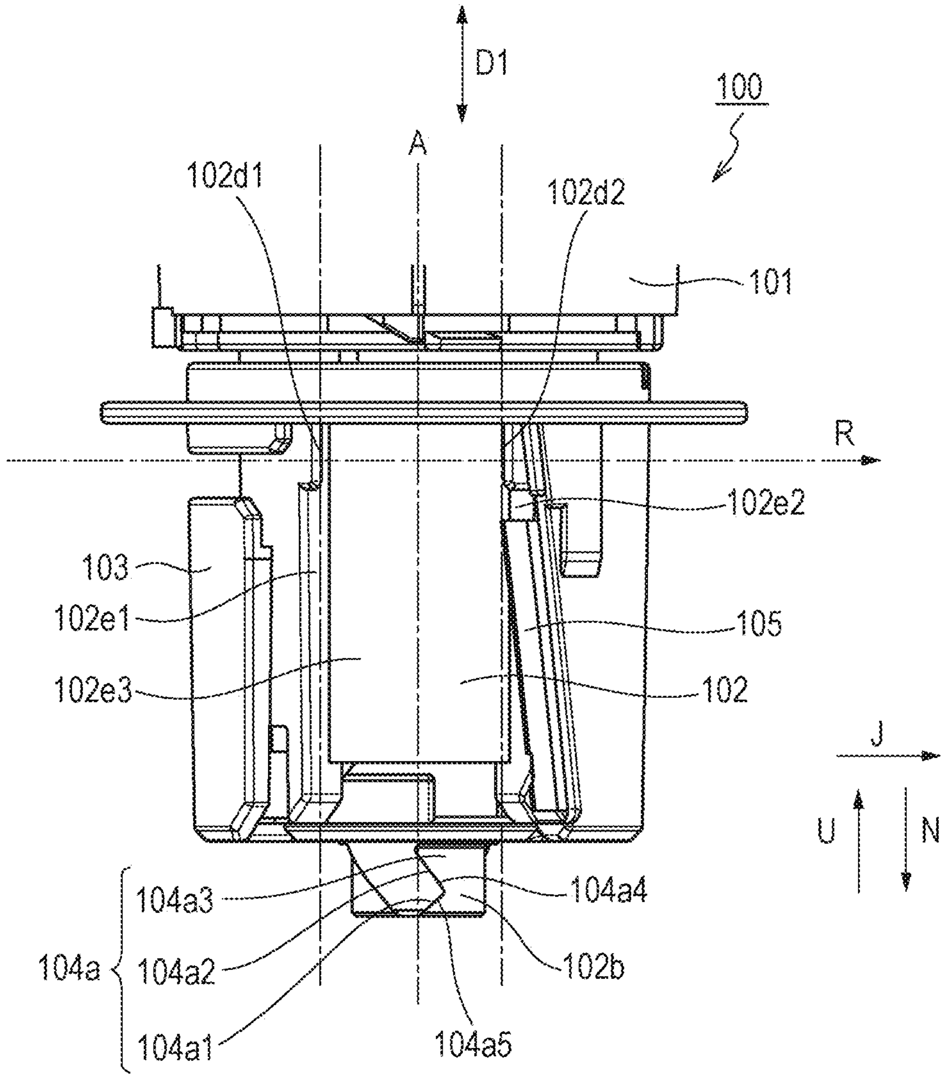
FIG. 18 is a front view of the vicinity of the nozzle according to the first embodiment.

In addition, as FIGS. 15 and 18 illustrate, in the direction of the rotational axis A, a surface 102*e*1 and a surface 102*e*2 are provided on the downstream side relative to the surface 102*d*1 and the surface 102*d*2 in the N direction, respectively. As FIG. 15B illustrates, the surface 102*e*1 and the surface 102*e*2 extend in the radial direction r of the imaginary circle VC centered around the rotational axis A.

In FIG. 18, a side surface 102*e*3 (second outer surface) is provided, in the arrow R direction, between the surface 102*d*1 and the surface 102*d*2 and between the surface 102*e*1 and the surface 102*e*2. The side surface 102*e*3 is recessed inward in the radial direction r relative to the side surface 102*c*. A recess 102*e* (nozzle recess) is formed by the surface 102*d*1, the surface 102*d*2, and the side surface 102*e*3, and the surface 102*e*1, the surface 102*e*2, and the side surface 102*e*3.

Note that the surface 102*d*1 and the surface 102*d*2 do not necessarily parallel as in the present embodiment. The surface 102*d*1 and the surface 102*d*2 may each be a surface extending in the radial direction r of the imaginary circle VC centered around the rotational axis A.

In addition, as FIG. 15 illustrates, when viewed in a direction orthogonal to the direction of the rotational axis A (the first direction D1), a side surface 103*d* (first outer surface of rotary member) of the pack-side shutter 103 has the opening 103*a* (rotating-body opening). In FIG. 15A, when the pack-side shutter 103 is at the closing position, at least a portion of the recess 102*e* of the nozzle 102 is exposed through the opening 103*a*. This is because, when the toner pack 100 in the state where the pack-side shutter 103 is closed is mounted on the installation portion 106, the recess 102*e* (the surface 102*d*1 and the surface 102*d*2) is caused to be engaged with the positioning portion 107*a*.

Moreover, FIG. 15B is a bottom view of the nozzle 102 and the pack-side shutter 103 when the pack-side shutter 103 is at the closing position. When viewed in the direction of the rotational axis A (the first direction D1), a driven transmission portion 103*e* (rotating-body recess) is provided across the rotational axis A from the recess 102*e* (the opening 103*a* of the pack-side shutter 103) of the nozzle 102. The driven transmission portion 103*e* has a surface 103*b*1 and a surface 103*b*2 that are both extend in a direction perpendicular to the arrow R direction. FIG. 17 is an enlarged perspective view of the vicinity of the pack-side shutter 103 viewed from the side where the driven transmission portion 103*e* is provided. Between the surface 103*b*1 and the surface 103*b*2, there is provided a side surface 103*b*3 (second outer surface of rotary member) recessed inward in the radial direction r relative to the side surface 103*d*. The driven transmission portion 103*e* is constituted by the surface 103*b*1, the surface 103*b*2, and the side surface 103*b*3.

When the pack-side shutter 103 is rotated in the arrow K direction from the closing position illustrated in FIG. 15, the pack-side shutter 103 takes the opening position as FIG. 16 illustrates, and the discharging port 102*a* of the nozzle 102 is exposed through the opening 103*a* of the pack-side shutter 103.

Figure 17:
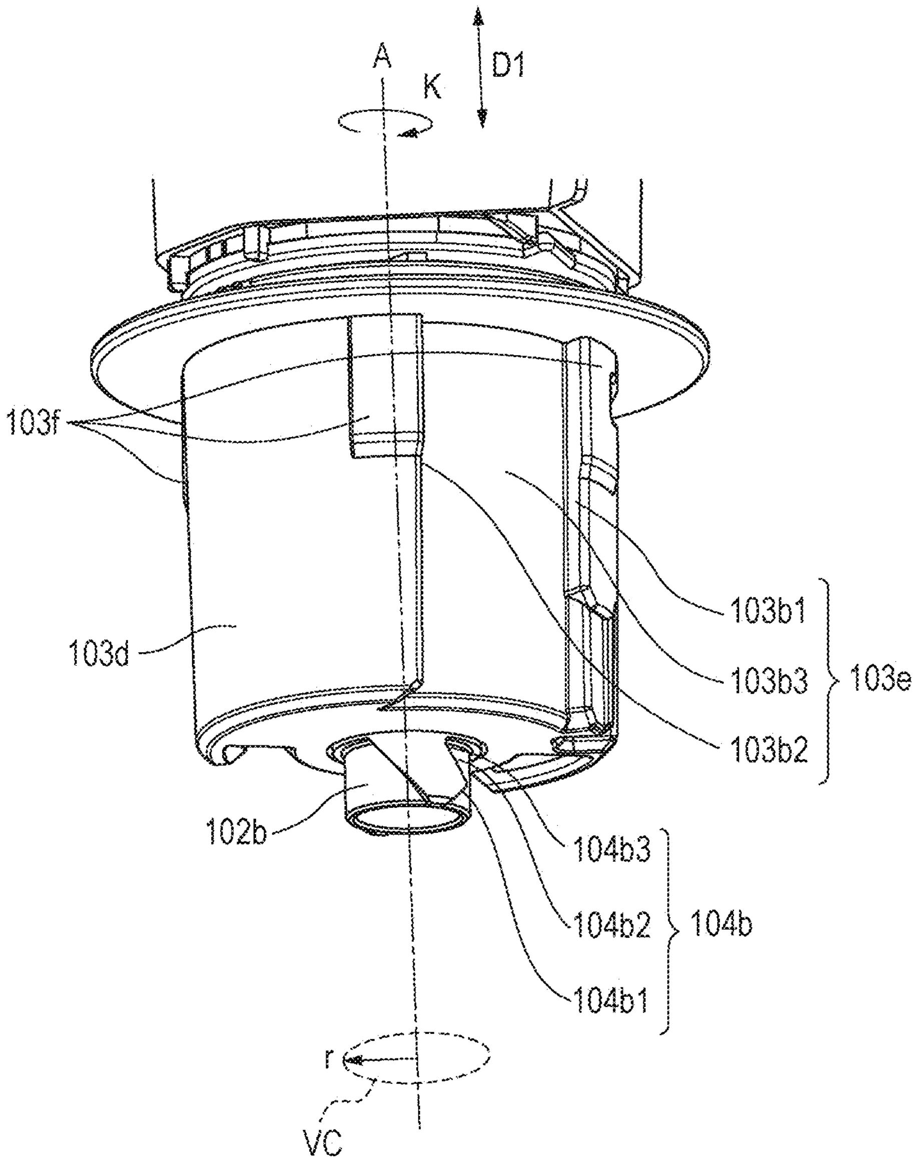
FIG. 17 is a rear perspective view of the vicinity of the nozzle according to the first embodiment.

As FIGS. 15 and 17 illustrate, the pack-side shutter 103 includes radial-direction positioning portions 103*f* protruding outward in the radial direction r relative to the side surface 103*d*. The radial-direction positioning portions 103*f* are provided on the upstream side of the pack-side shutter 103 in the N direction in the direction of the rotational axis A. The radial-direction positioning portions 103*f* are spaced at three spots in the rotational direction of the pack-side shutter 103 (circumferential direction of the imaginary circle VC). When the toner pack 100 is mounted on the installation portion 106, the radial-direction positioning portions 103*f* of the pack-side shutter 103 contact the inner peripheral surface 109*h* of the apparatus-side shutter 109, thereby determining the position of the toner pack 100 in the radial direction r.

Note that the nozzle 102 in the present embodiment is a part including the passage 102*h* through which the toner passes and the discharging port 102*a* allowing the toner to be discharged from the nozzle 102. The cross-sectional area of the passage, of the nozzle 102, through which the toner passes may decrease or increase toward the discharging port 102*a* or may be uniform. The cross-sectional area and the length of the passage of the nozzle 102 may be appropriately changed according to, for example, performance of discharging toner and are thus not limited. In addition, the discharging port 102*a* of the nozzle 102 is not necessarily the most downstream opening through which the toner is discharged from the toner pack 100. The toner discharged from the discharging port 102*a* of the nozzle 102 may pass through a passage in a member different from the nozzle 102 and may then be discharged outside the toner pack 100. In addition, although formed by polypropylene that is not flexible in the present embodiment, the nozzle 102 may be formed by another material such as ABS or polystyrene.

Note that the pack-side shutter 103 may be a rotating body including the driven transmission portion 103*e* and allowing the discharging port 102*a* of the nozzle 102 to be always open regardless the rotation position of the pack-side shutter 103. In this case, the discharging port 102*a* of the nozzle 102 may be closed with a seal when the toner pack 100 is not yet mounted on the installation portion 106, and the seal may be removed by a mounting operation on the installation portion 106 or may be removed after the toner pack 100 is mounted. In addition, the toner pack 100 without the pack-side shutter 103 may be possible.

Supply Operation

Next, an operation for mounting the toner pack 100 and supplying the toner will be described using FIGS. 19 to 25.

Figures 1A, 1B, 1C:
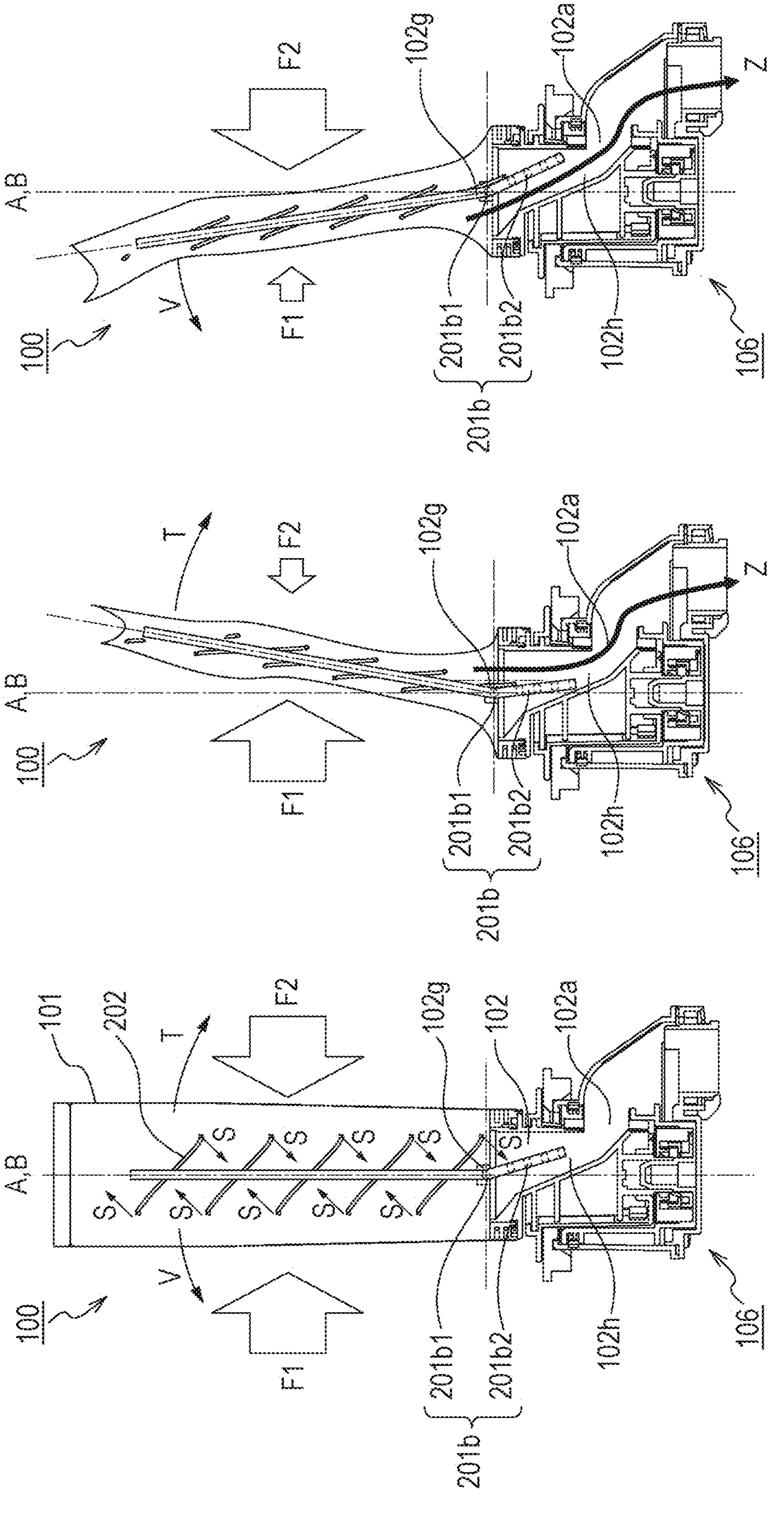
FIGS. 1A to 1C include sectional views of an installation portion and a toner pack according to a first embodiment during toner supply.
Figure 19A:
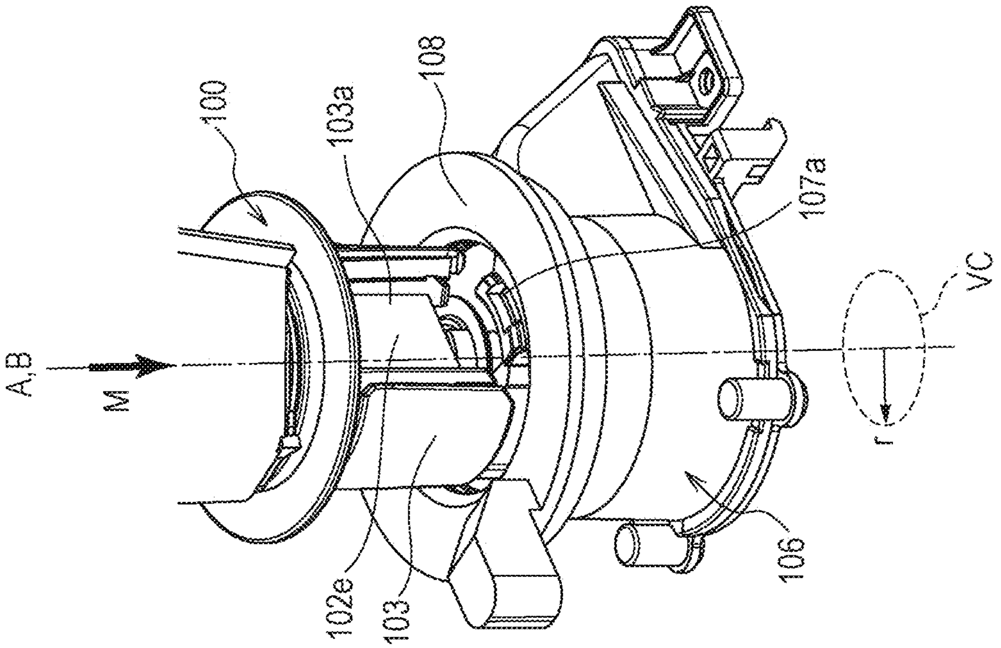
FIGS. 19A and 19B include perspective views of the installation portion and the toner pack according to the first embodiment in the middle of the mounting.
Figure 19B:
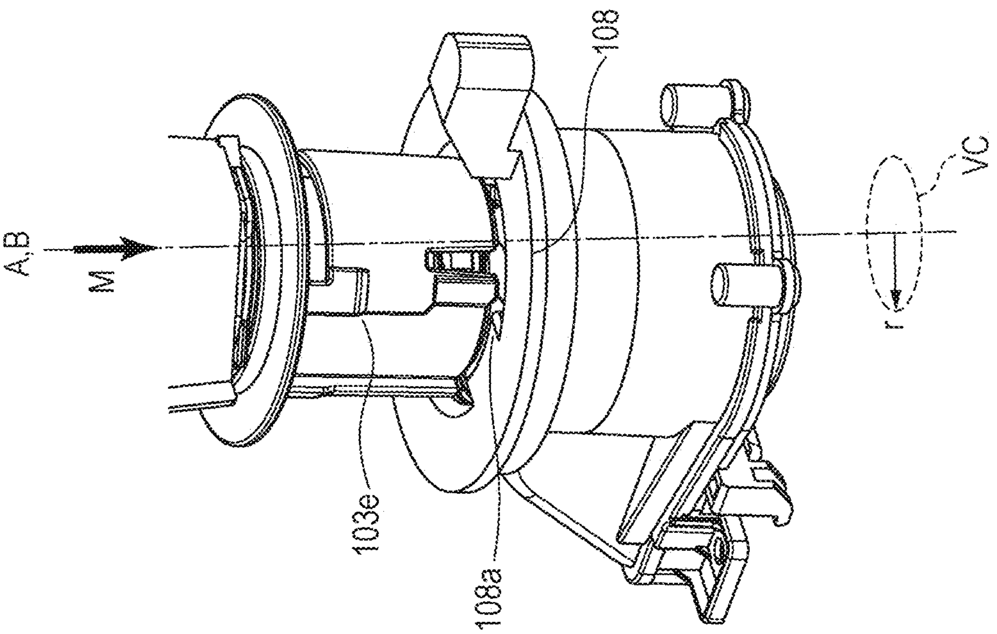
Figure 20:
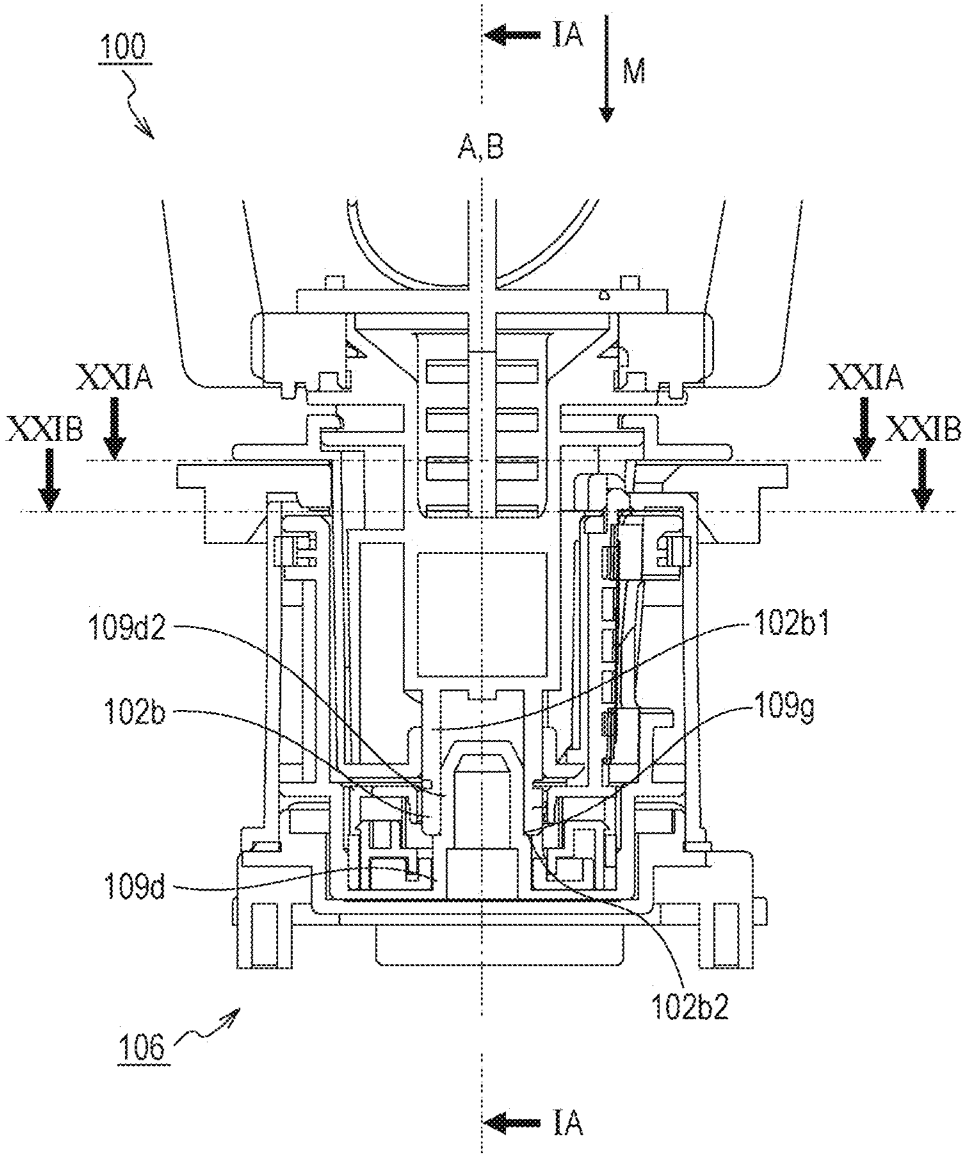
FIG. 20 is a sectional view of the installation portion and the toner pack according to the first embodiment at the completion of the mounting.
Figure 21B:
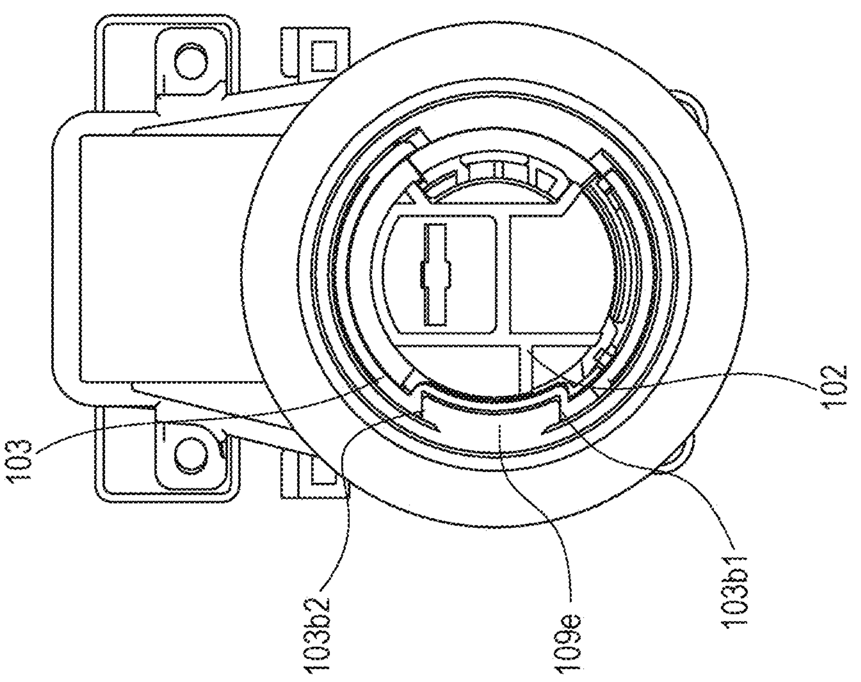
FIGS. 21A and 21B include sectional views of the installation portion and the toner pack according to the first embodiment at the completion of the mounting.
Figure 21A:
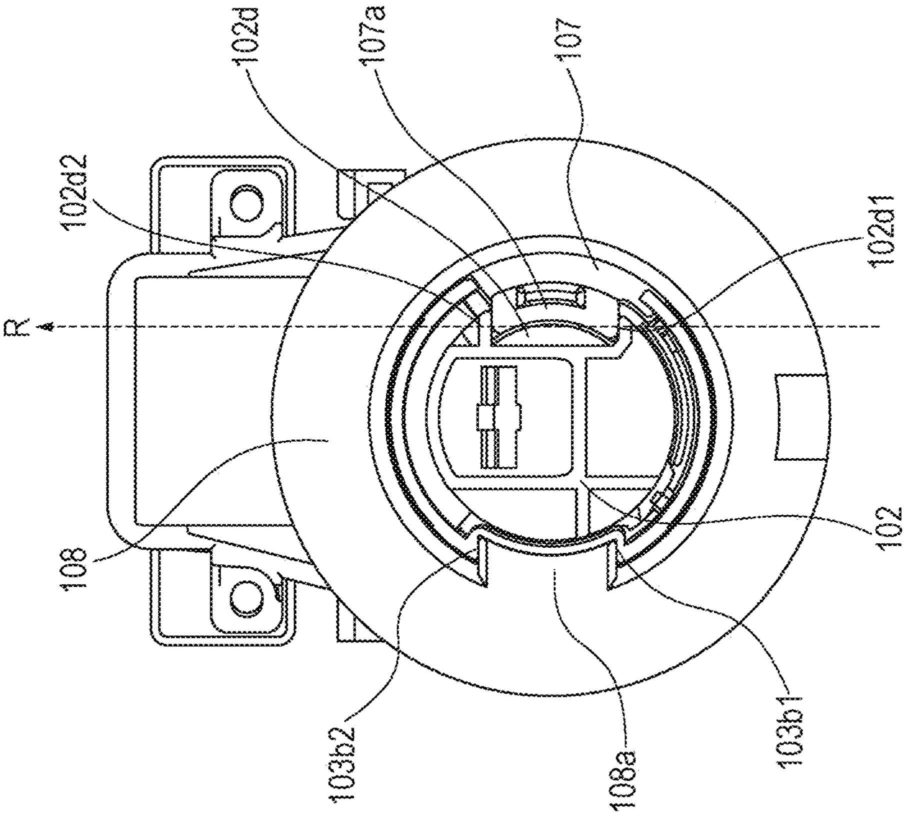
Figure 22A:
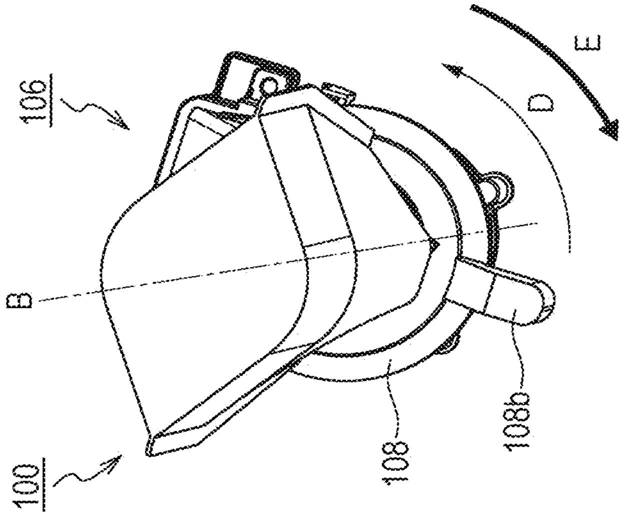
FIGS. 22A to 22C include perspective views illustrating, from above, the toner pack mounted on the installation portion when an operation lever is positioned at a closing position and when at an opening position.
Figure 22B:
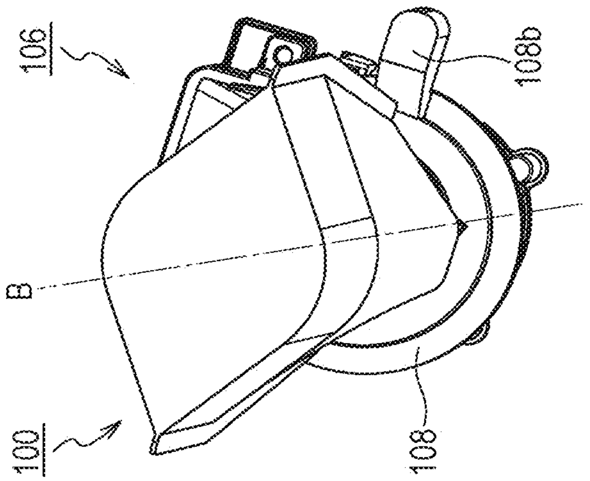
Figure 22C:
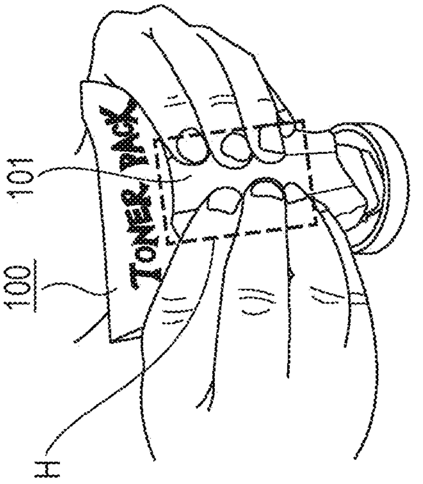

FIG. 19A is a perspective view of the toner pack 100 and the installation portion 106 in the middle of the mounting of the toner pack 100 on the installation portion 106. FIG. 19B is a perspective view of the toner pack 100 and the installation portion 106 from a point of view different from that of FIG. 19A. FIG. 20 is a sectional view parallel to the rotational axis A (the rotational axis B) and illustrates a mounting completion state where the toner pack 100 in the state of FIG. 19 has been moved further in the mounting direction. FIG. 21A is a sectional view taken along line XXIA-XXIA in FIG. 20. FIG. 21B is a sectional view taken along line XXIB-XXIB in FIG. 20. FIG. 22A is a perspective view of the toner pack 100 viewed from above when the operation lever 108 is at the opening position. FIG. 22B is a perspective view illustrating the pack-side shutter 103 and the apparatus-side shutter 109 in an opening state changed from the state of FIG. 22A by operating the operation lever 108. FIG. 22C is a schematic view illustrating how a user supplies the toner. FIG. 1A is a sectional view, taken along line IA-IA in FIG. 20, illustrating a state changed from the state of FIG. 20 after the operation lever 108 is operated. FIGS. 1B and 1C are sectional views illustrating the state where the toner pack 100 in the state of FIG. 22A is flattened when a user supplies the toner.

As FIG. 19 illustrates, the toner pack 100 in the state where the pack-side shutter 103 is at the closing position is moved in the mounting direction M to be mounted on the installation portion 106 in the state where the apparatus-side shutter 109 is at the closing position. At this time, when viewed in the mounting direction M, in the rotational direction of the pack-side shutter 103, the position of the recess 102*e* (the opening 103*a* of the pack-side shutter 103) of the nozzle 102 and the position of the positioning portion 107*a* of the first frame 107 are aligned. At the same time, in the rotational direction of the pack-side shutter 103, the position of the driven transmission portion 103*e* of the pack-side shutter 103 and the position of the drive transmission portion 108*a* of the operation lever 108 are also aligned.

After the above-described positioning is performed, when the mounting on the installation portion 106 proceeds while the toner pack 100 is moved in the mounting direction M, the toner pack 100 reaches a mounting completion position illustrated in FIG. 20. As FIG. 20 illustrates, a small diameter portion 109*d*2 of the center boss 109*d* of the apparatus-side shutter 109 is fitted along (engaged with) an inner peripheral surface 102*b*1 of a projection 102*b* of the nozzle 102. Thus, in a lower portion (the downstream side in the mounting direction M) of the nozzle 102, the position of the nozzle 102 in the radial direction relative to the apparatus-side shutter 109 is determined. In addition, the radial-direction positioning portions 103*f* (FIG. 14, FIG. 16) of the pack-side shutter 103 at three spots are in contact with the inner peripheral surface 109*h* (FIG. 8) of the apparatus-side shutter 109.

Thus, on the upstream side in the mounting direction M, the positions of the nozzle 102 and the pack-side shutter 103 (the toner pack 100) in the radial direction are determined. On the other hand, a projection end surface 102*b*2 of the projection 102*b* of the nozzle 102 is in contact with the pack contact surface 109*g* of the apparatus-side shutter 109. Thus, the position of the nozzle 102 (the toner pack 100) in the direction of the rotational axis A (the mounting direction M) relative to the installation portion 106 is determined. Moreover, as FIG. 21A illustrates, the positioning portion 107*a* of the first frame 107 engages with the positioned portion 102*d*, of the nozzle 102, having the surface 102*d*1 and the surface 102*d*2. Thus, in the arrow R direction of the surface 102*d*1 and the surface 102*d*2, the position of the nozzle 102 is determined relative to the first frame 107 (the base frame 2). Note that the inner peripheral surface 102*b*1 of the projection 102*b* is not necessarily fitted onto the center boss 109*d* as long as there is no interference. As FIG. 21A illustrates, the drive transmission portion 108*a* (protruded portion of lever) of the operation lever 108 engages with the driven transmission portion 103*e* (rotating-body recess, refer to FIG. 17) of the pack-side shutter 103. Moreover, as FIG. 21B illustrates, the driven transmission portion 103*e* (rotating-body recess) of the pack-side shutter 103 engages with the driven transmission portion 109*e* (protruded portion of shutter) of the apparatus-side shutter 109. Thus, the rotational axis A of the pack-side shutter 103 and the rotational axis B of the apparatus-side shutter 109 are substantially coaxial with each other. Relative to the first frame 107 (the base frame 2) and the nozzle 102, the operation lever 108, the pack-side shutter 103, and the apparatus-side shutter 109 are movable as a substantially integrated body in the rotation about the rotational axis A (the rotational axis B). Specifically, when the operation lever 108 is rotated, the drive transmission portion 108*a* of the operation lever 108 pushes the surface 103*b*1 or 103*b*2 of the pack-side shutter 103 to rotate the pack-side shutter 103. Subsequently, the surface 103*b*1 or the surface 103*b*2 of the pack-side shutter 103 pushes the driven transmission portion 109*e* of the apparatus-side shutter 109 to rotate the apparatus-side shutter 109.

As FIGS. 22A and 22B illustrate, after the mounting of the toner pack 100 on the installation portion 106 is completed, the operation portion 108*b* of the operation lever 108 is rotated in a rotational direction D. When the operation lever 108 is operated so as to rotate in the rotational direction D, the apparatus-side shutter 109 rotates from the closing position to the opening position, and the pack-side shutter 103 rotates from the closing position to the opening position.

Action of Loosening Member Accompanying Supply Operation

The action of the loosening member 200 accompanying the supply operation with the toner pack 100 will be described.

As FIG. 22C illustrates, as the supply operation, a user presses a region H that is a part of the storage portion 101 of the toner pack 100. The region H is, as FIG. 10 illustrates, a region in which the first loosening portion 202, which is disposed inside the storage portion 101, is disposed. As described above, the loosening member 200 is supported by the nozzle 102 so as to be swingable relative to the nozzle 102 about the supported portion **201*b*1 (the swing axis S1). Moreover, the second loosening portion 201*b*2 is also swingable relative to the nozzle 102 about the supported portion 201*b*1. Thus, as FIG. 1A illustrates, the first loosening portion 202 is elastically deformed in an arrow S direction by a pressing force F1 and a pressing force F2 that press the storage portion 101 from both outer sides in the second direction D2, and the entire loosening member 200 also swings in an arrow T direction or an arrow V direction about the supported portion 201*b*1. When the pressing force F1 is greater than the pressing force F2, the toner pack 100 transitions from the state of FIG. 1A to the state of FIG. 1B. When the pressing force F2 is greater than the pressing force F1, the toner pack 100 transitions from the state of FIG. 1A to the state of FIG. 1C. In addition, when the user stops applying the pressing force F1 and the pressing force F2, the toner pack 100 returns to the state of FIG. 1A or a state close thereto with the restoration of the first loosening portion 202 from the state of being elastically deformed. Due to such an above-described action of the loosening member 200, the toner stored in the storage portion 101 is loosened by the first loosening portion 202. At the same time, the toner inside the passage 102*h* of the nozzle 102 is loosened by the second loosening portion 201*b*2. Due to the own weight of the toner and increase in the internal pressure of the storage portion 101 caused by pressing the storage portion 101, the toner inside the storage portion 101 and the toner inside the passage 102*h* are discharged through the discharging port 102*a* of the nozzle 102 along arrow Z. When the supply operation ends, the operation lever 108 is rotated in a rotational direction E by operating the operation portion 108*b*, and the toner pack 100 is then removed from the installation portion 106**.

With the toner pack 100 according to the present embodiment, the toner inside the storage portion 101 and the toner inside the passage **102*h* can be loosened efficiently at the same time of the supply operation, without loosening the toner before the supply, compared with when no loosening member 200 is provided. Moreover, the toner pack 100 is improved in performance of discharging toner, and the toner remaining in the toner pack 100 after the supply can thereby be reduced. In addition, due to the elastic restorative force of the first loosening portion 202, in the storage portion 101, a certain volumetric size or more is maintained, with which the storage portion 101 is easily flattened. For example, even when the toner pack 100 is flattened by, for example, impact during physical distribution and temporarily brought into a state where the air thereinside is discharged through the pack-side seal 105, the shape of the toner pack 100** is easily restored.

Figure 23B:
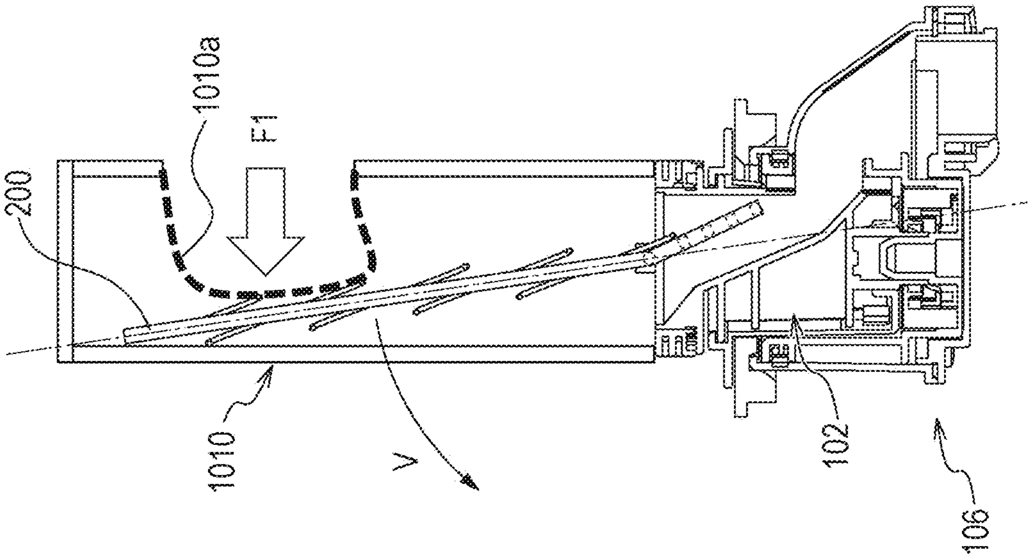
FIGS. 23A and 23B include sectional views of the installation portion and a toner pack according to the first embodiment.
Figure 23A:
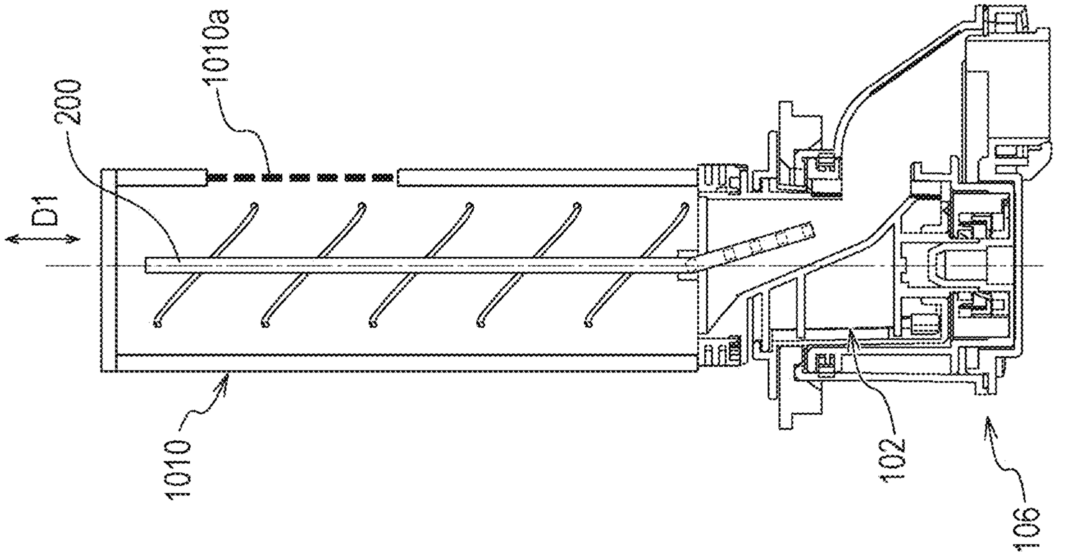
Figure 24B:
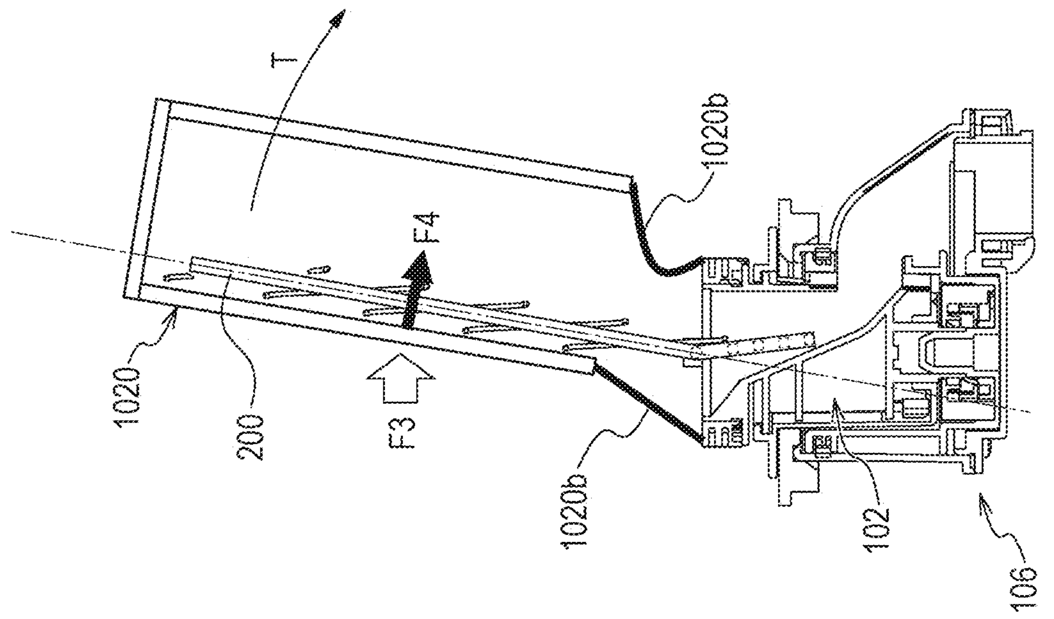
FIGS. 24A and 24B include sectional views of the installation portion and a toner pack according to the first embodiment.
Figure 24A:
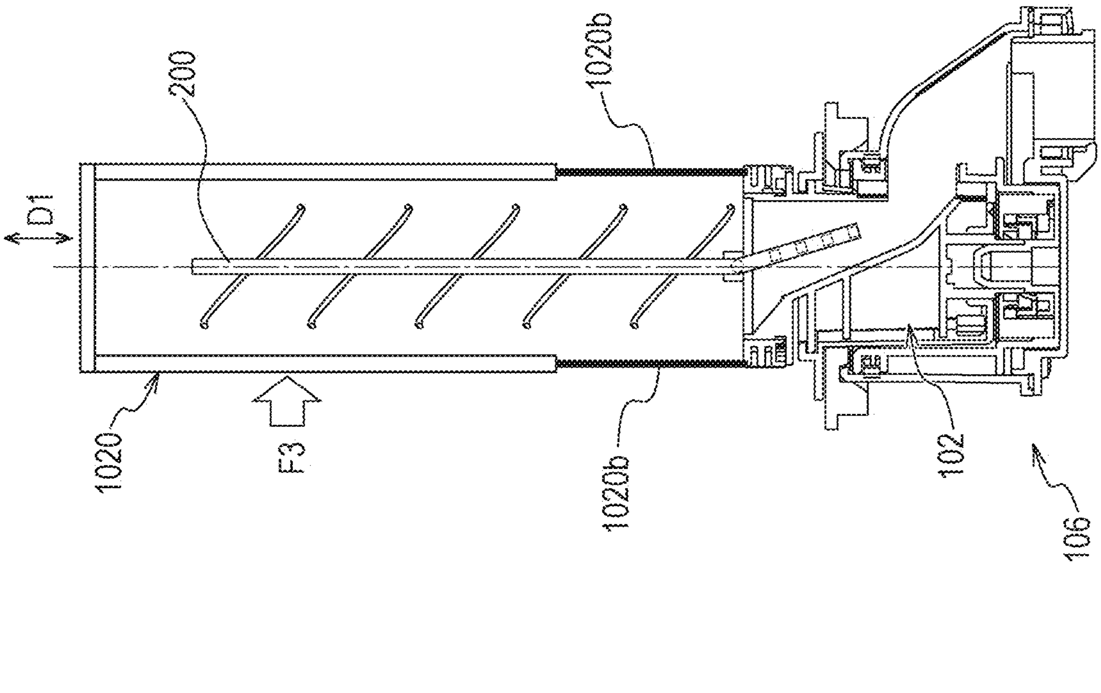
Figure 25B:
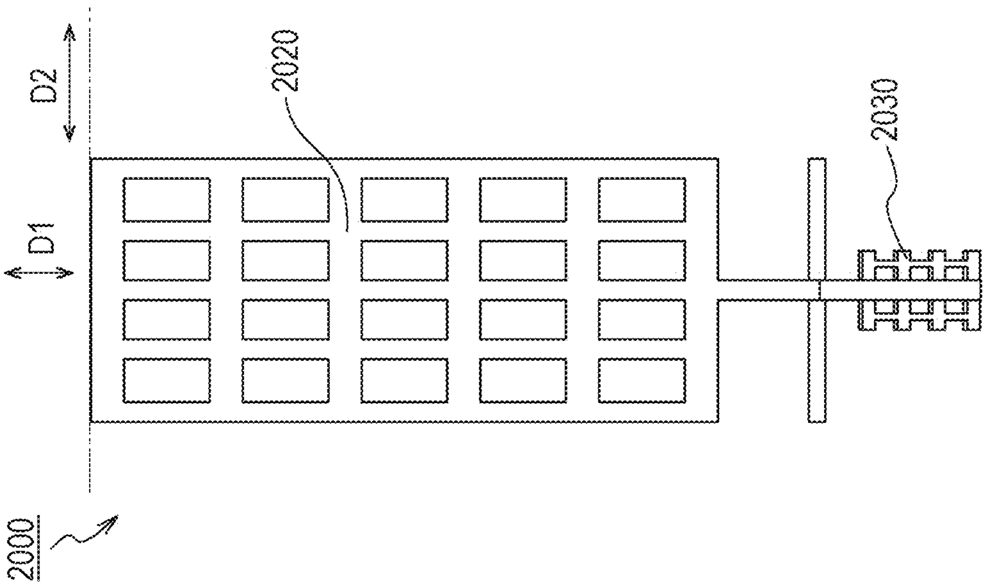
FIGS. 25A and 25B include front views of loosening members according to the first embodiment.
Figure 25A:
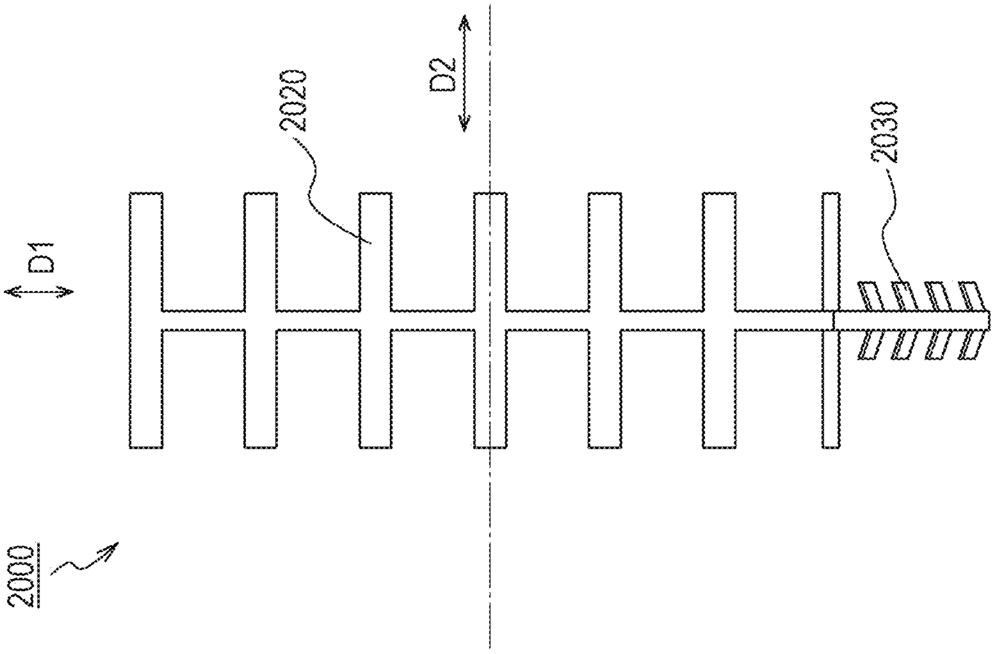

Note that the storage portion 101 of the toner pack 100 is not limited to a pouch as in the present embodiment and may be a container made of, for example, paper or vinyl. In addition, as FIG. 23A illustrates, an elastic portion **1010*a* that partially elastically deforms with ease may be provided in an end portion, on the further side from the nozzle 102 in the first direction D1, of a storage portion 1010 (bottle) made of resin and having a thickness of 0.5 mm or more and 2.0 mm or less. The elastic portion 1010*a* is, for example, a thin portion having a thickness (thickness of 0.1 mm or more and 0.3 mm or less) smaller than the part other than the elastic portion 1010*a*, or a portion constituted by a material having a Young's modulus smaller than the material of the part other than the elastic portion 1010*a*. The elastic portion 1010*a* is elastically deformed by being pressed by a user as FIG. 23B illustrates, and the pressing force F1 applied by the user is transmitted to the loosening member 200 inside the storage portion 1010; thus, the toner can be loosened. In addition, as in FIG. 24A, an elastic portion 1020*b* that partially elastically deforms with ease may be formed in an end portion, on the nozzle 102 side in the first direction D1, of a storage portion 1020 (bottle) made of resin and having a thickness of 0.5 mm or more and 2.0 mm or less. The elastic portion 1020*b* is, for example, a thin portion having a thickness (thickness of 0.1 mm or more and 0.3 mm or less) smaller than the part other than the elastic portion 1020*b*, or a portion constituted by a material having a Young's modulus smaller than the material of the part other than the elastic portion 1020*b*. The storage portion 1020 is moved relative to the nozzle 102 by a pressing force F3 applied by the user, and the loosening member 200 receives a pressing force F4 from the storage portion 1020** and can thus loosen the toner.

In addition, although the loosening member 200 is supported so as to be swingable relative to the nozzle 102, and the first loosening portion 202 is an elastically deformable wire spring and has a helical shape in the present embodiment, this is not the only option. For example, the first loosening portion 202 and the second loosening portion **201*b*2 may be a loosening member 2000 in FIG. 25A having a comb shape or may be a loosening member 2000 in FIG. 25B having a mesh shape. The loosening member 2000 in FIG. 25A includes a first loosening portion 2020 and a second loosening portion 2030. The first loosening portion 2020 is constituted by plural protrusions extending in the second direction D2 and aligned in the first direction D1. The second loosening portion 2030 is constituted by plural protrusions shorter than the protrusions of the first loosening portion 2020 and aligned in the first direction D1. The loosening member 2000 in FIG. 25B includes a first loosening portion 2020 and a second loosening portion 2030** each having a mesh shape.

In addition, the loosening member 200 is not necessarily supported by the nozzle 102 and may be kept floating inside the storage portion 101. The base portion 201 itself may be formed by a wire spring. When the toner in the passage **102*h* of the nozzle 102 is not required to be loosened, the second loosening portion 201*b*2 is not necessarily provided. With the configuration in which the pressing force applied by a user is transmitted to the loosening member 200, the toner stored in the storage portion 101 can be loosened by moving the position of the loosening member 200 relative to the storage portion 101 and the nozzle 102**.

Second Embodiment

The configuration of a second embodiment will be described. Note that the description of the same elements as those in the above-described embodiment may be omitted. In addition, the elements corresponding to the elements described in the first embodiment may be denoted by names similar to those of the elements in the first embodiment. In the present embodiment, the elements different from those in the first embodiment will mainly be described.

Figure 26B:
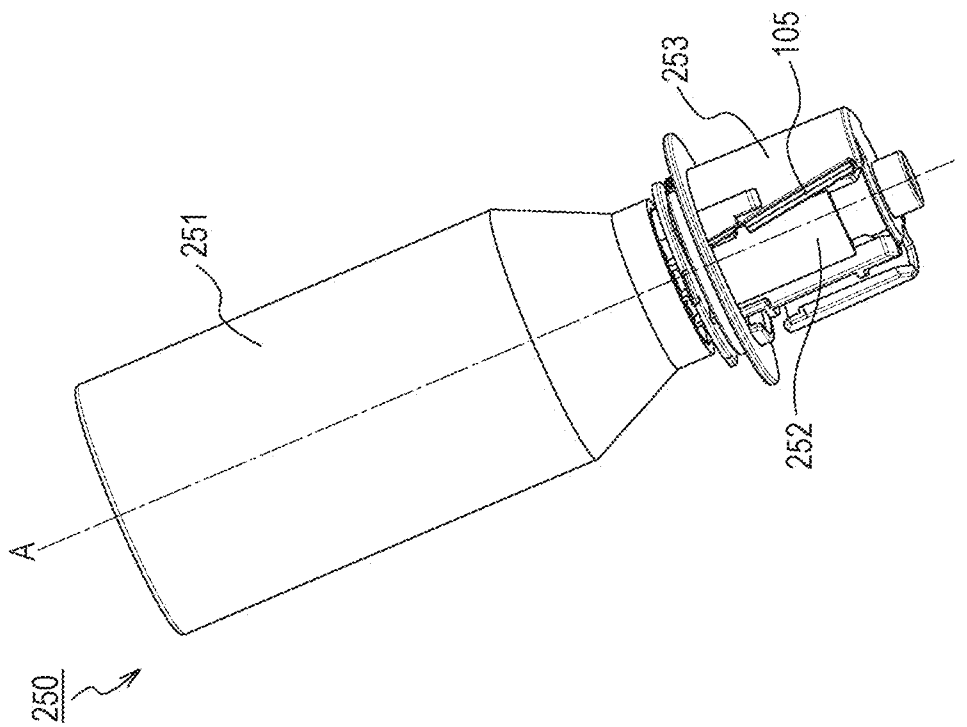
FIGS. 26A and 26B include a front view and a perspective view of a toner pack according to a second embodiment.
Figure 26A:
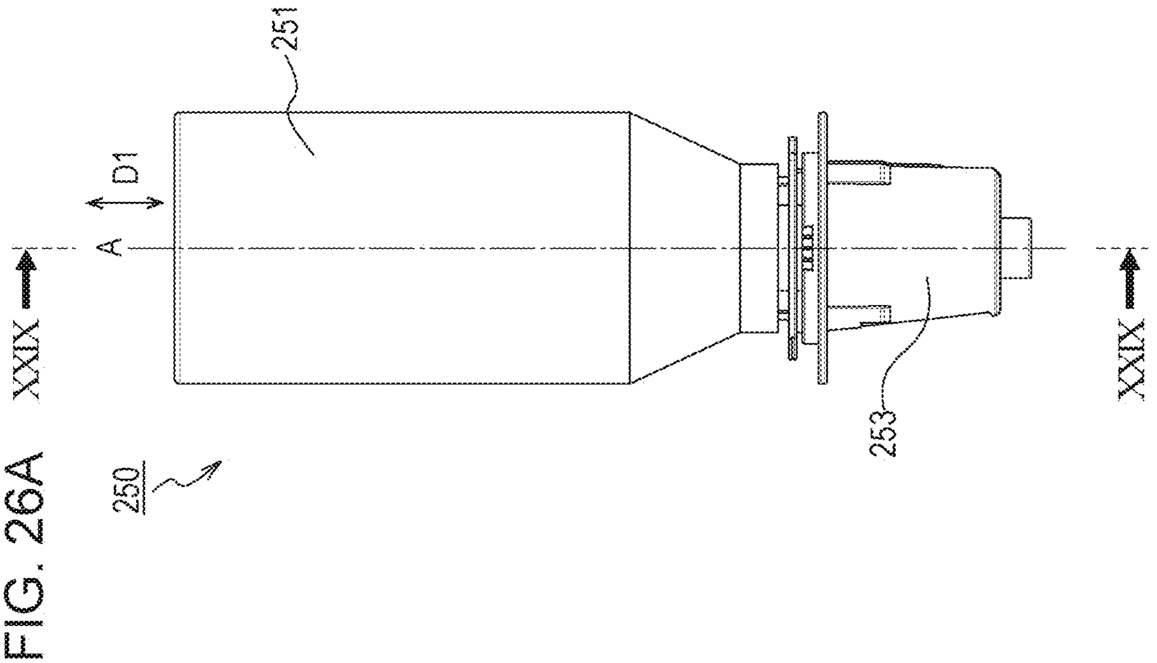

The configuration of a toner pack 250 in the present embodiment will be described using FIGS. 26 to 29. Note that the configuration of the installation portion 106 is the same as that in the first embodiment. FIG. 26A is a front view of the toner pack 250. FIG. 26B is a perspective view of the toner pack 250. FIG. 27A is an enlarged view of the vicinity of a nozzle 252 when a pack-side shutter 253 is at a closing position.

Figure 27B:
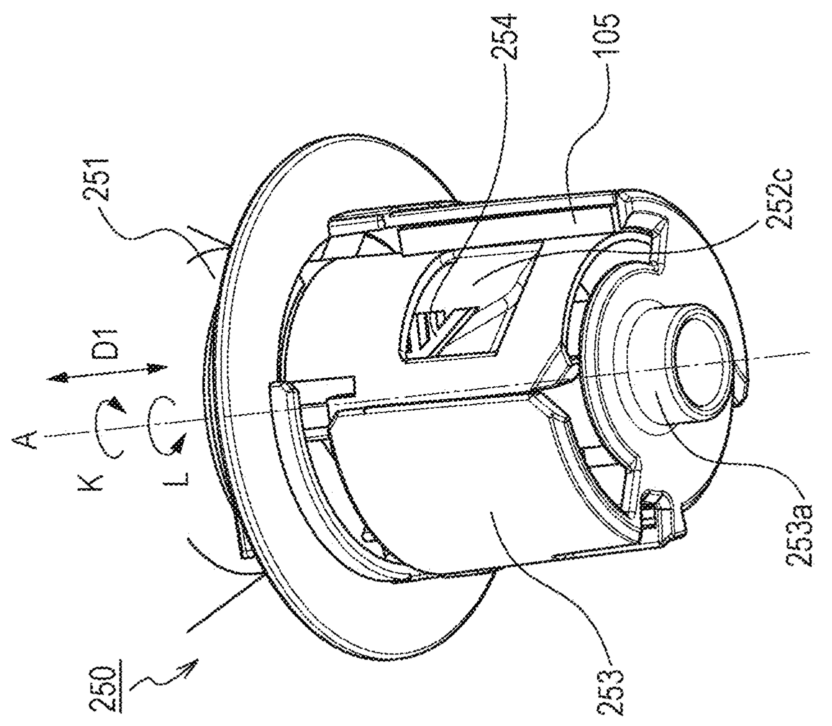
FIGS. 27A and 27B include perspective views of the vicinity of a nozzle according to the second embodiment when a pack-side shutter is closed and when opened.
Figure 27A:
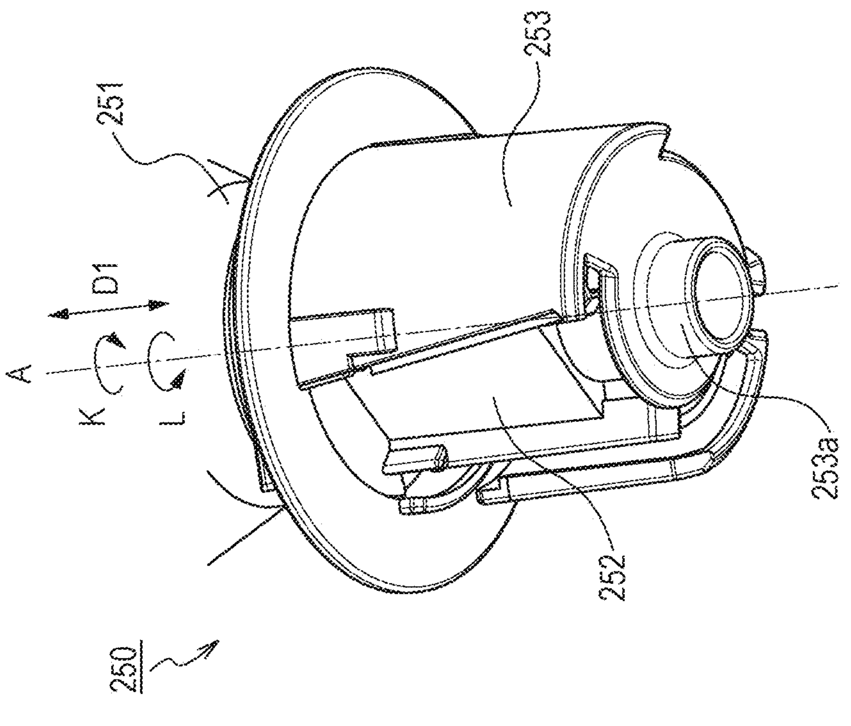
Figures 28A, 28B, 28C:
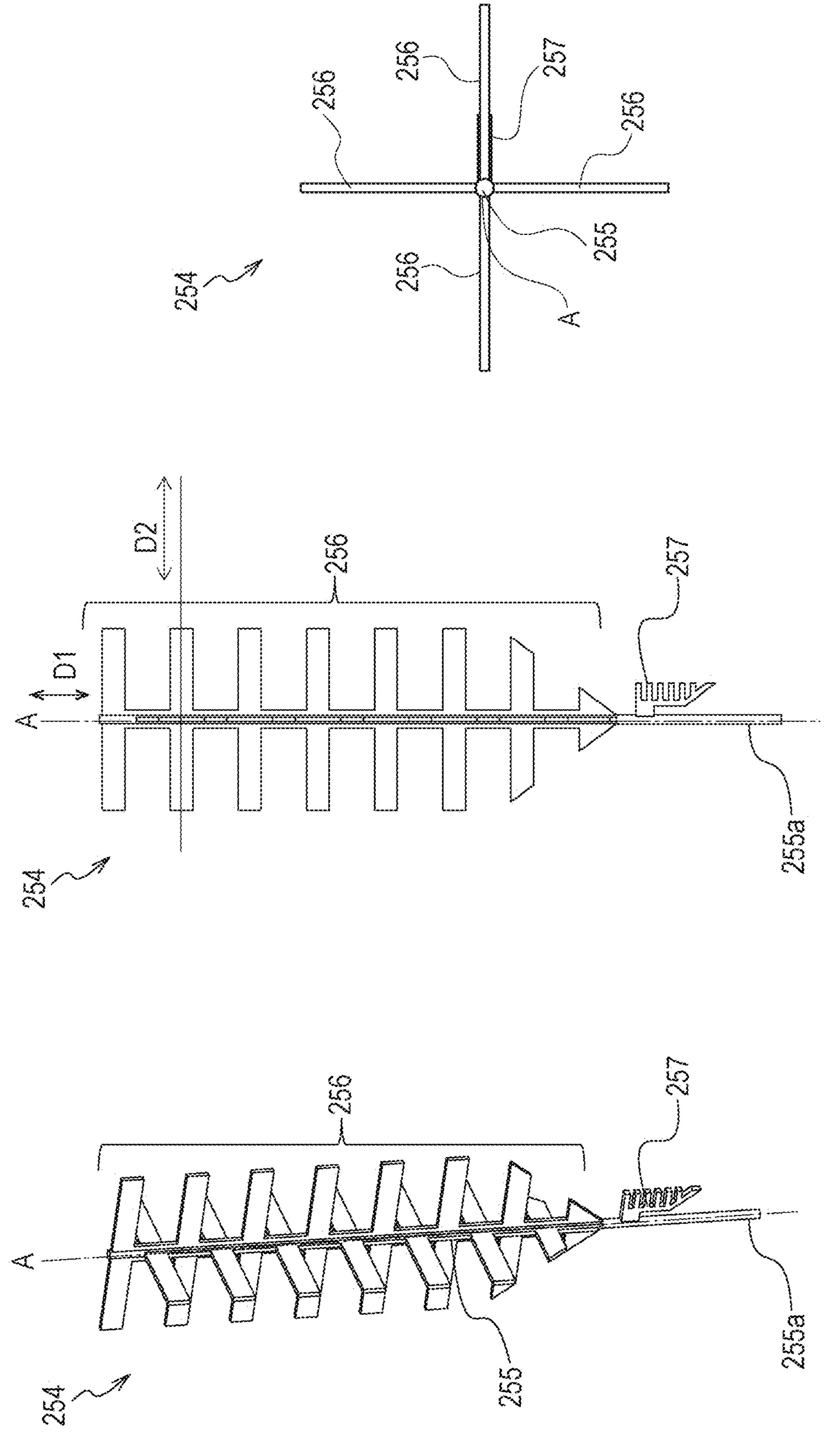
FIGS. 28A to 28C include a perspective view, a front view, and a top view of a loosening member according to the second embodiment.
Figure 29:
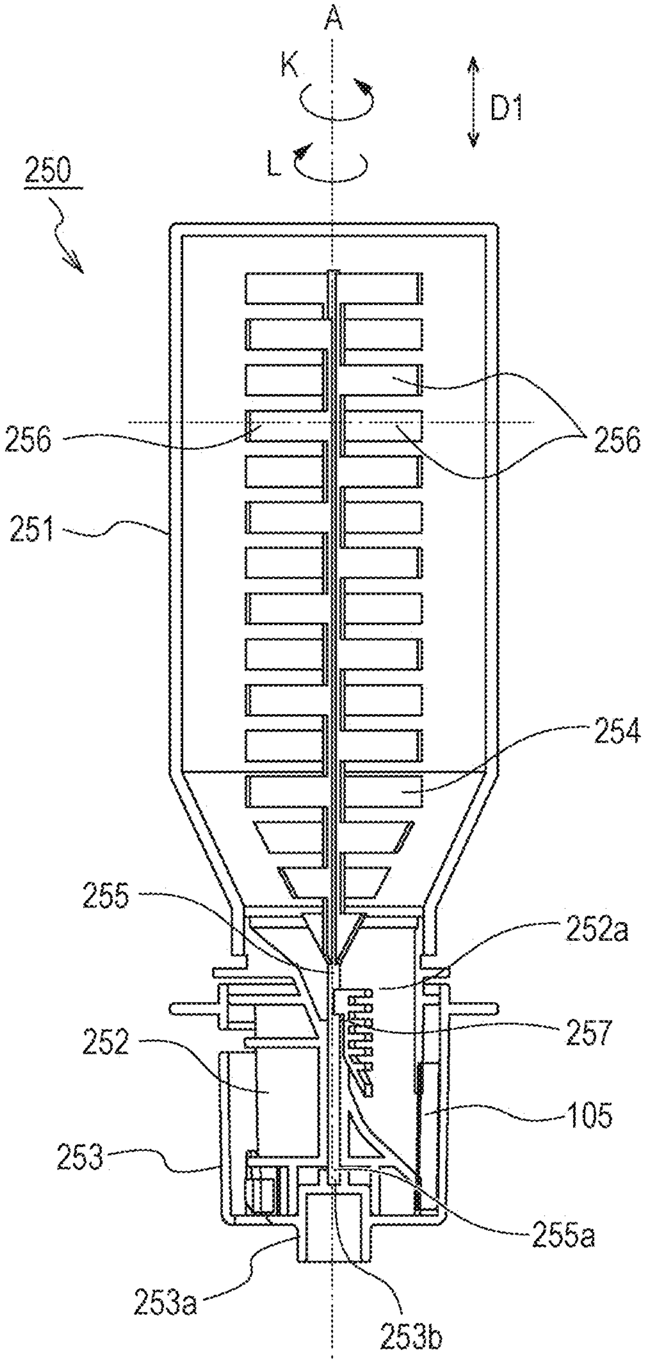
FIG. 29 is a sectional view of the toner pack according to the second embodiment.
Figure 30B:
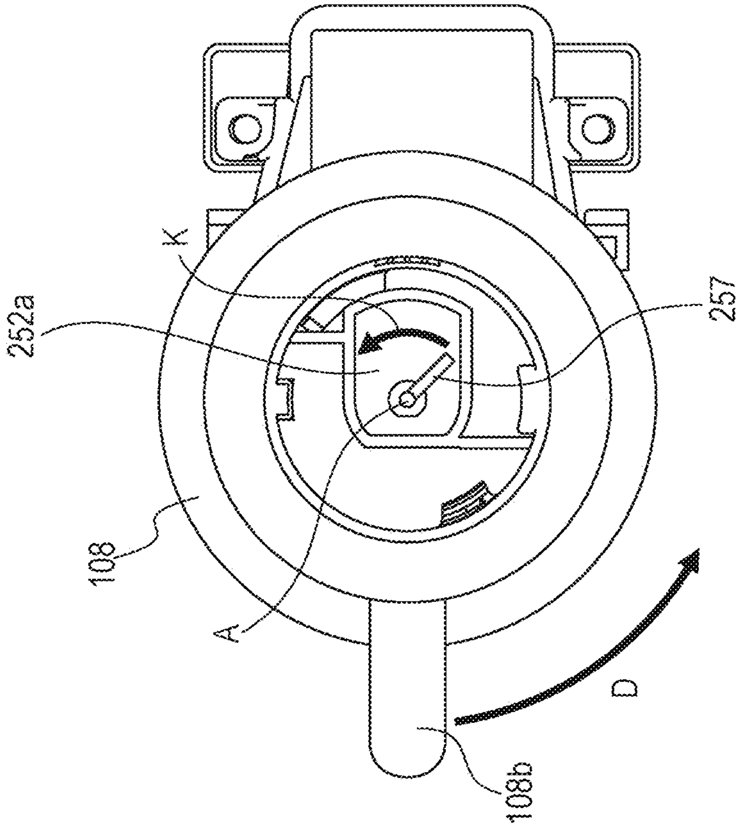
FIGS. 30A and 30B include sectional views of the installation portion and the toner pack according to the second embodiment at the completion of the mounting.
Figure 30A:
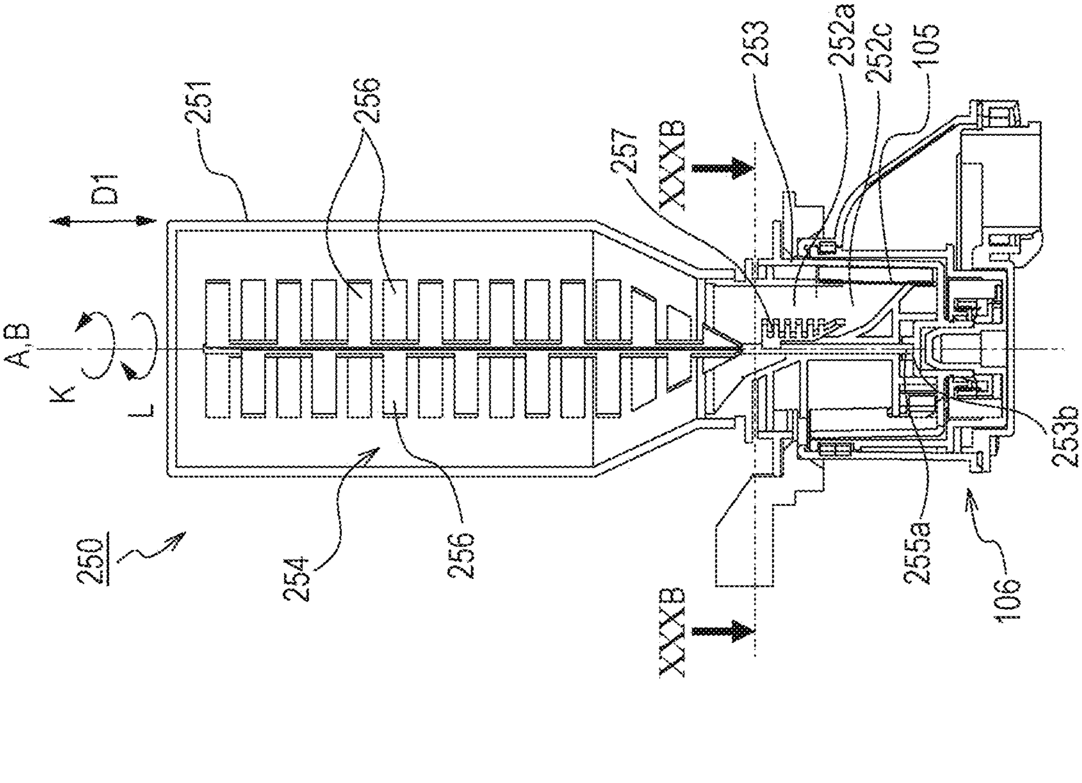
Figure 31:
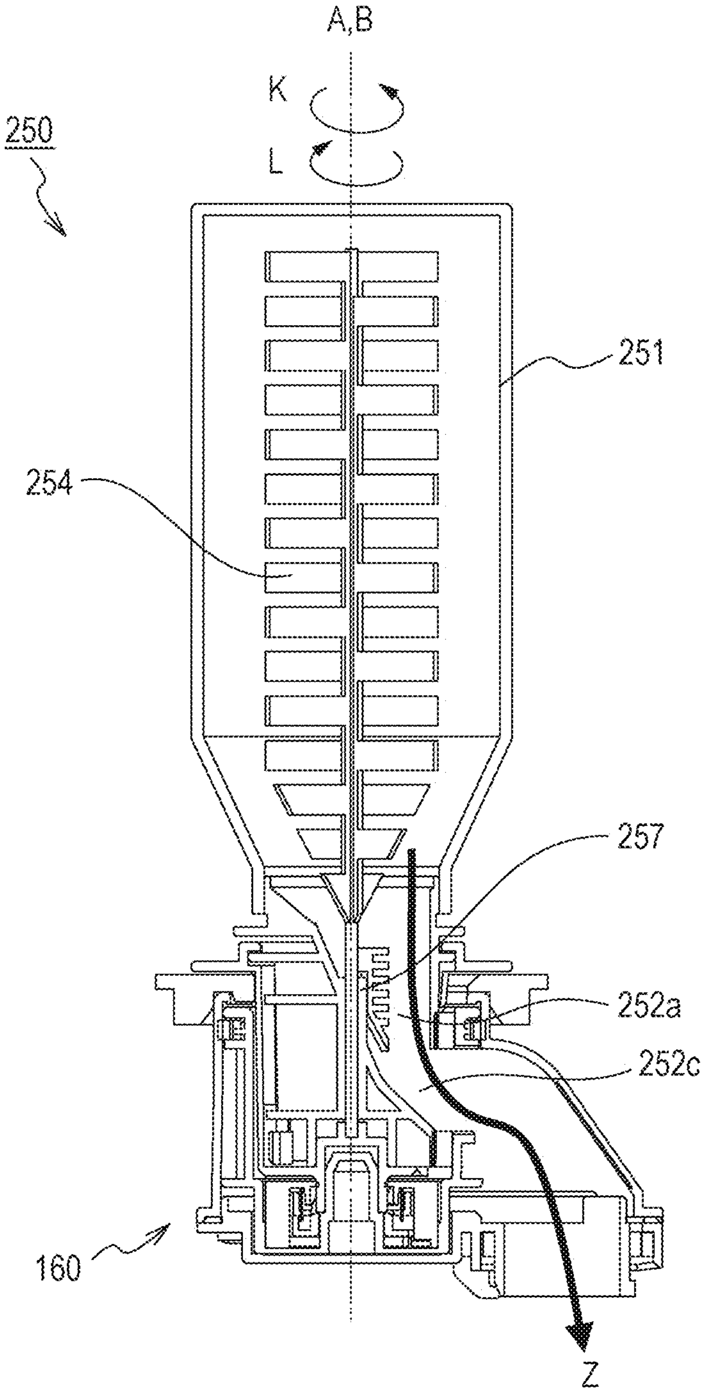
FIG. 31 is a sectional view of the installation portion and the toner pack according to the second embodiment.

FIG. 27B is an enlarged view of the vicinity of the nozzle 252 when the pack-side shutter 253 is at an opening position. FIG. 28A is a perspective view of a loosening member 254. FIG. 28B is a side view of the loosening member 254. FIG. 28C is a top view of the loosening member 254. FIG. 29 is a sectional view of the toner pack 250 in FIG. 26A, taken along line XXIX-XXIX. FIG. 30A is a sectional view parallel to a rotational axis A (the rotational axis B) in the state where the mounting is completed. FIG. 30B is a section taken along line XXXB-XXXB in FIG. 30A. FIG. 31 is a sectional view parallel to the rotational axis A (the rotational axis B) with the pack-side shutter 253 and the apparatus-side shutter 109 being rotated to be brought into an opening state. Note that the loosening member 254 is not illustrated in a form of section in FIGS. 29, 30A, and 31 for good viewability.

The toner pack 250 includes a storage portion 251 storing the toner, the nozzle 252, the pack-side shutter 253, and the loosening member 254. As FIG. 26 illustrates, in the first direction D1, the storage portion 251 is provided on one end side, and the nozzle 252 and the pack-side shutter 253 are provided on the other end side. The storage portion 251 is a bottle made of resin. The resin bottle in the present embodiment has a thickness of 0.5 mm or more and 2.0 mm or less. Examples of the material include polystyrene (PS), polyethylene (PE), polyethylene terephthalate (PET), PC, ABS, PC+ABS, PP, and nylon. As FIG. 27 illustrates, the pack-side shutter 253 is rotatable about the rotational axis A, between the closing position and the opening position. The pack-side seal 105 closes a discharging port 252*c* of the nozzle 252 when the pack-side shutter 253 is at the closing position, and the discharging port 252*c* is open when the pack-side shutter 253 is at the opening position. A projection 253*a* is provided at a leading end of the pack-side shutter 253.

As FIGS. 28A and 28B illustrate, the loosening member 254 includes a base portion 255, a first loosening portion 256, and a second loosening portion 257. The first loosening portion 256 is constituted by comb-shaped parts provided on the base portion 255, the parts are arranged every 90 degrees in the rotational direction around the rotational axis A, and the parts are provided in a staggered manner in the direction of the rotational axis A. That is, the first loosening portion 256 has first protruding portions extending in the second direction D2 and second protruding portions extending in the third direction crossing the first direction D1 and the second direction D2. The second loosening portion 257 is a comb-shaped part provided on the base portion 255.

As FIG. 29 illustrates, the loosening member 254 is provided inside the storage portion 251. The second loosening portion 257 is disposed inside a passage 252*a* of the nozzle 252. A leading end 255*a* of the base portion 255 is fitted in and fixed to a hole portion 253*b* of the pack-side shutter 253.

Figure 32A:
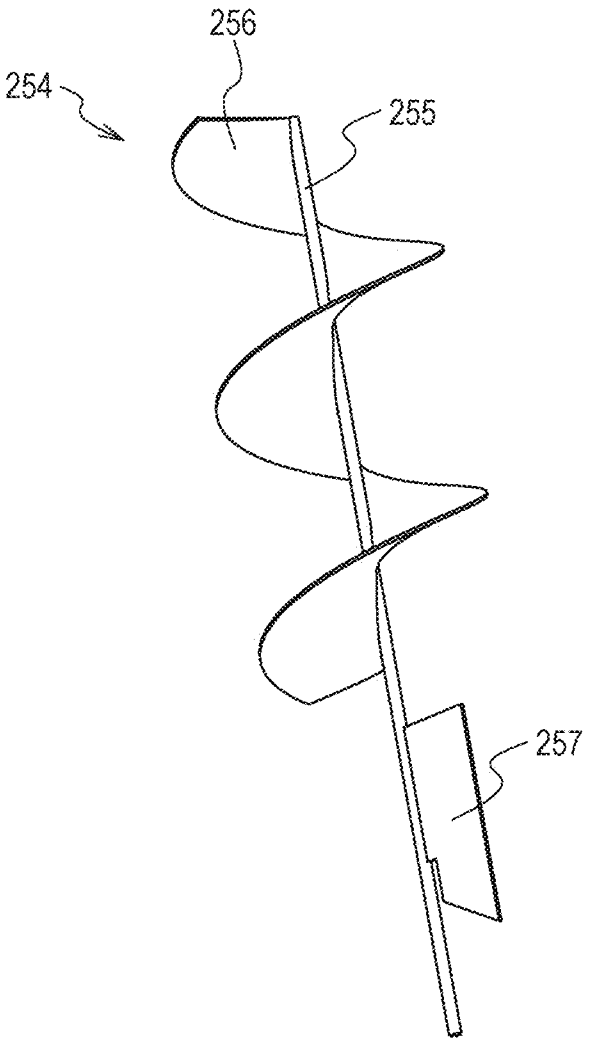
FIGS. 32A and 32B include a perspective view and a front view of the loosening member according to the second embodiment.
Figure 32B:
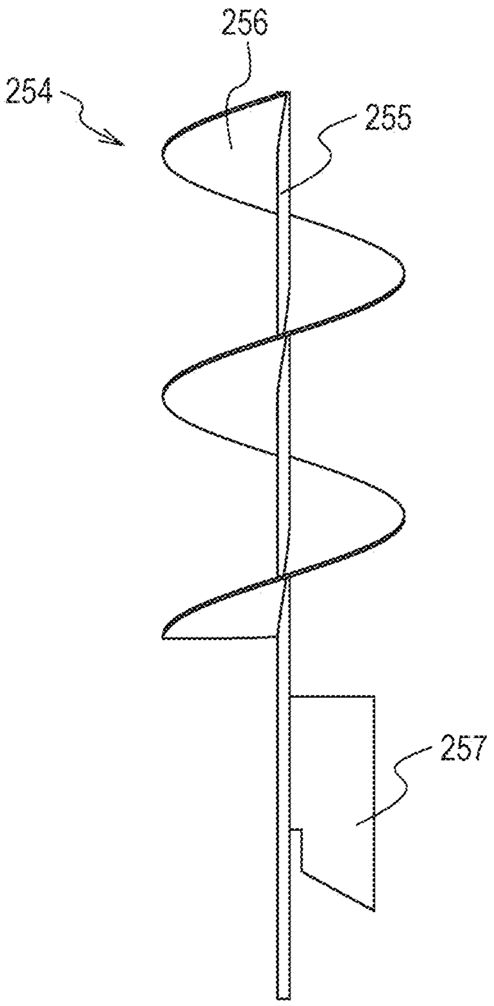

Next, a mechanism by which the loosening member 254 loosens the toner will be described using FIGS. 30 to 32. FIG. 30A is a sectional view illustrating the state where the toner pack 250 is mounted on the installation portion 106. As in the above-described embodiment, when, in the state of FIG. 30A, the operation lever 108 is rotated in the rotational direction D by operating the operation portion 108*b* (refer to FIGS. 22A and 22B), each of the apparatus-side shutter 109 and the pack-side shutter 253 is rotated from the closing position to the opening position. Because the loosening member 254 is fixed to the pack-side shutter 253, the loosening member 254 rotates about the rotational axis A in the arrow K direction. Thus, the toner in the storage portion 251 is loosened by the first loosening portion 256, and the toner in the passage 252*a* is loosened by the second loosening portion 257. As a result, as FIG. 31 illustrates, the loosened toner is discharged from the storage portion 251 along arrow Z due to the own weight. In other words, the toner in the storage portion 251 is loosened by a shutter opening and closing operation, and the toner is thereby easily discharged. After the toner supply ends, the operation portion 108*b* is rotated in a rotational direction E, and the toner pack 250 is then removed from the installation portion 106.

Note that, although the storage portion 251 of the toner pack 250 is a resin bottle in the present embodiment, this is not the only option. For example, a pouch formed by a sheet such as a flexible polypropylene sheet being subjected to pouch processing may be possible. In addition, the form of the loosening member 254 is not necessarily limited thereto. For example, as FIG. 32 illustrates, a first loosening portion 256 may be a screw including a blade portion having a helical shape, and a second loosening portion 257 may be an elastically deformable sheet.

Third Embodiment

Next, a third embodiment will be given. Note that the description of the elements similar to those in the above-described embodiments may be omitted. Of the elements in the present embodiment, the elements corresponding to those in the first embodiment may be denoted by names similar to those of the elements in the first embodiment. In the present embodiment, the elements different from those in the first embodiment will be described.

Figure 33:
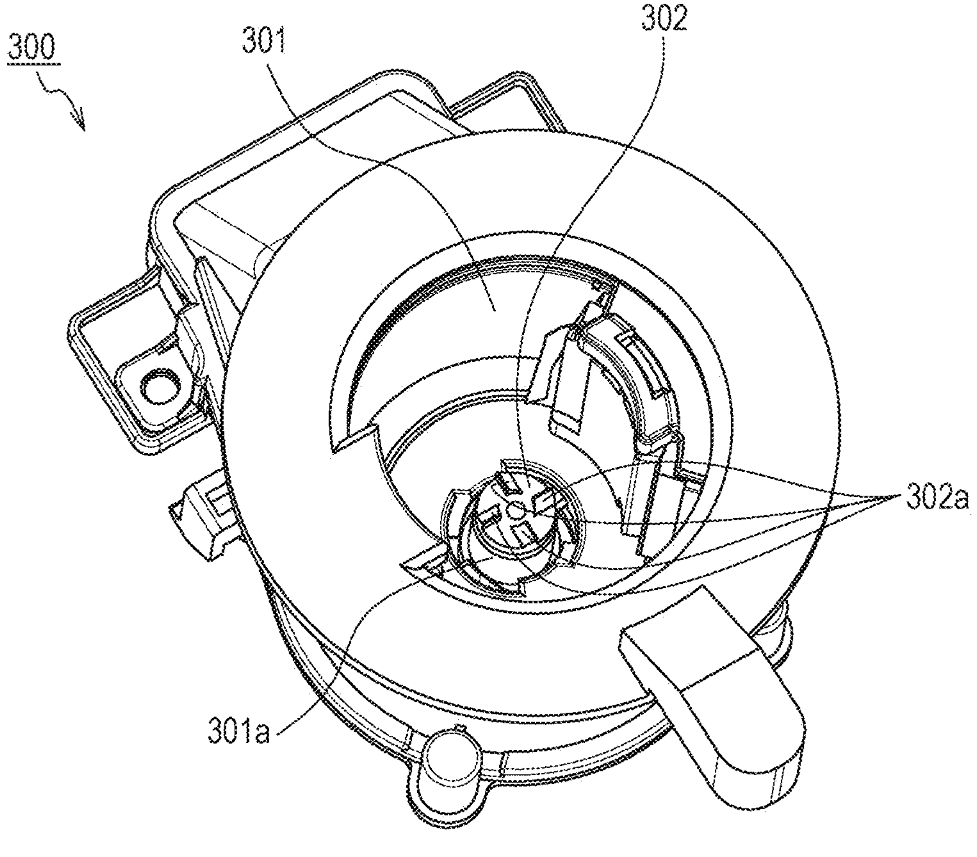
FIG. 33 is a perspective view of an installation portion according to a third embodiment.
Figure 34B:
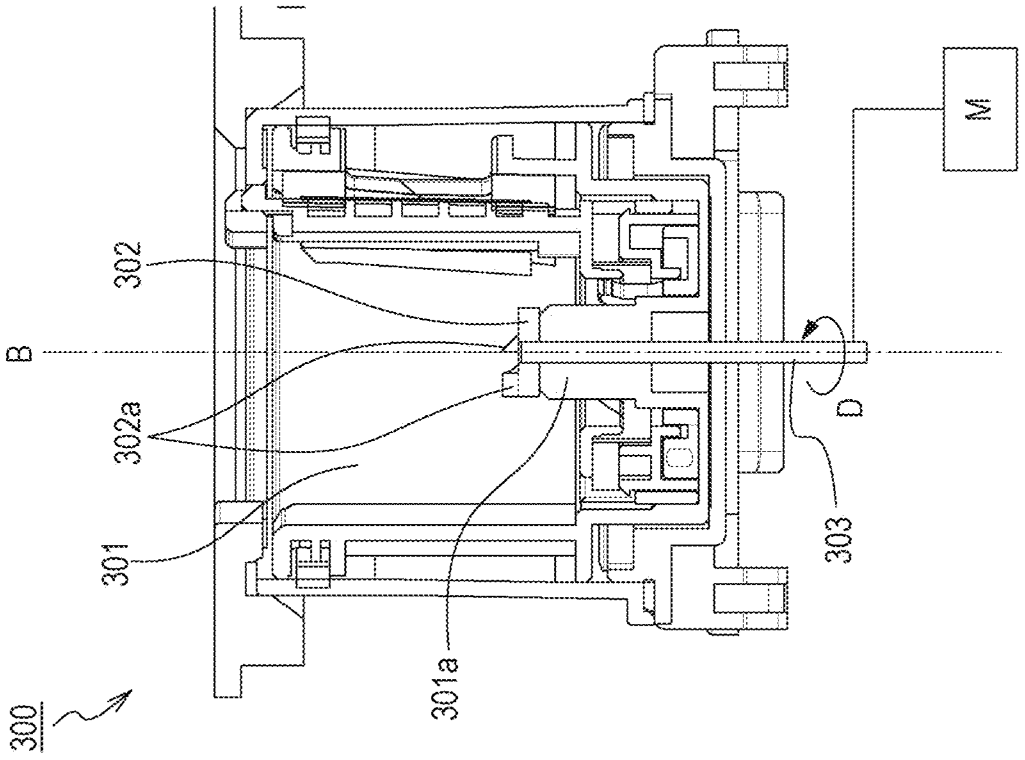
FIGS. 34A and 34B include a top view and a sectional view of the installation portion according to the third embodiment.
Figure 34A:
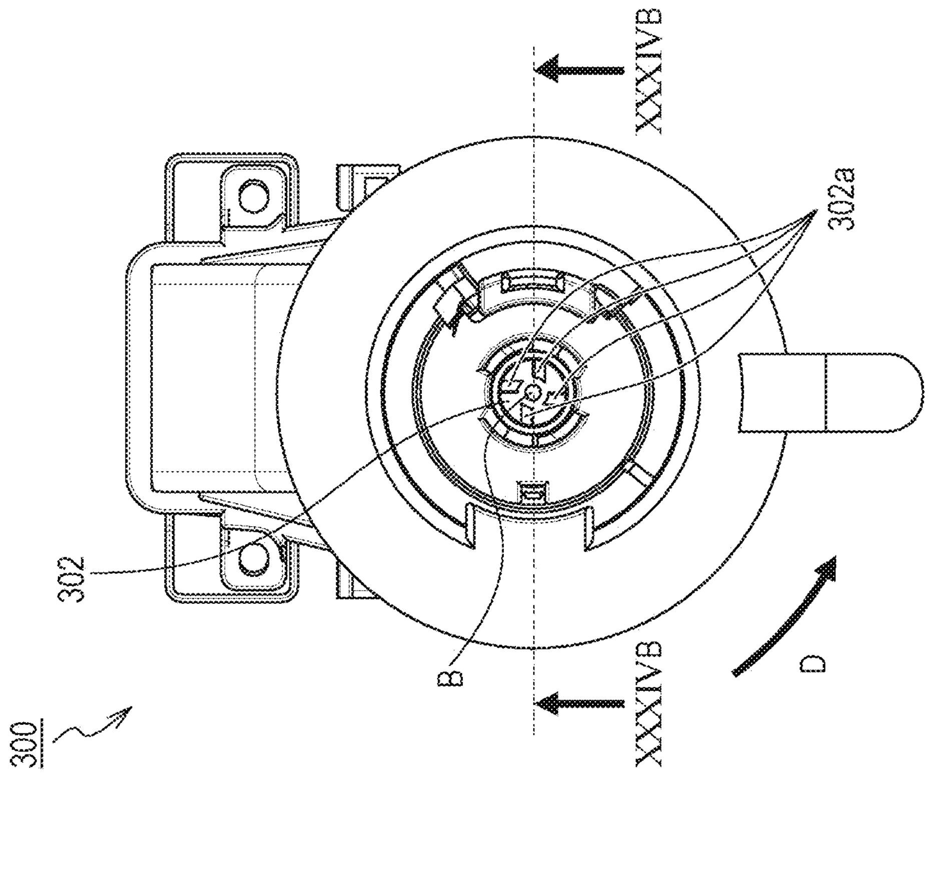

First, the configuration of an installation portion 300 in the present embodiment will be described using FIGS. 33 to 34. FIG. 33 is a perspective view of the installation portion 300. FIG. 34A is a top view of the installation portion. FIG. 34B is a section taken along line XXXIVB-XXXIVB in FIG. 34A.

As FIG. 33 and FIG. 34A illustrate, a drive transmission member 302 is provided on a leading end portion of a center boss 301*a* of an apparatus-side shutter 301 constituting the installation portion 300. The drive transmission member 302 is provided with four drive transmission claws 302*a*. As FIG. 34B illustrates, a drive shaft 303 is fixed to the drive transmission member 302 and is rotatable about a rotational axis B in the rotational direction D by receiving a driving force from a drive source M (motor).

Figure 35B:
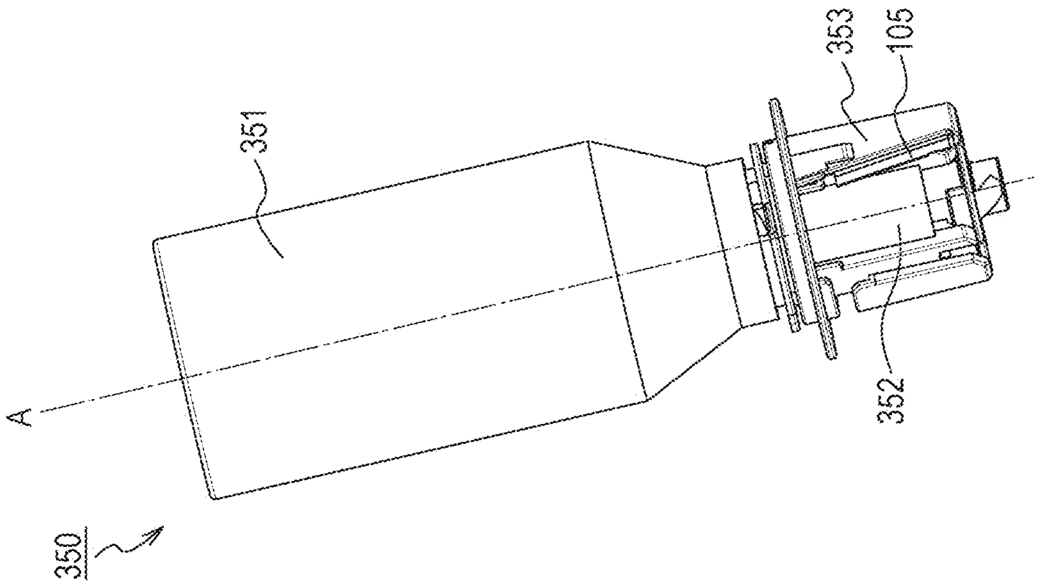
FIGS. 35A and 35B include a front view and a perspective view of a toner pack according to the third embodiment.
Figure 35A:
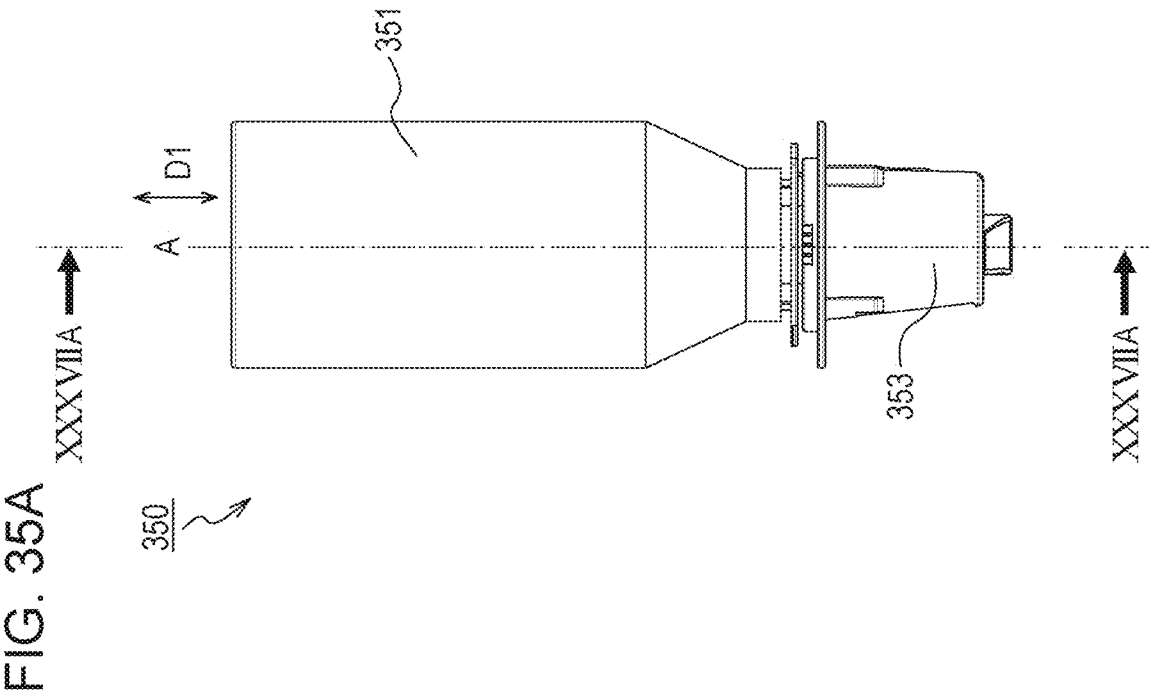
Figure 36A:
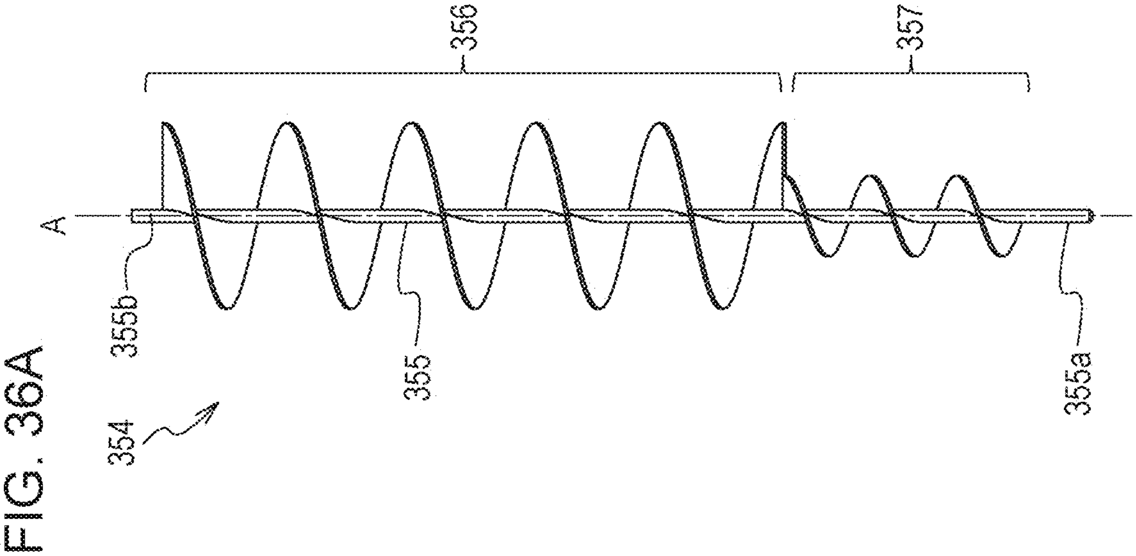
FIGS. 36A and 36B include a front view and a perspective view of a loosening member according to the third embodiment.
Figure 36B:
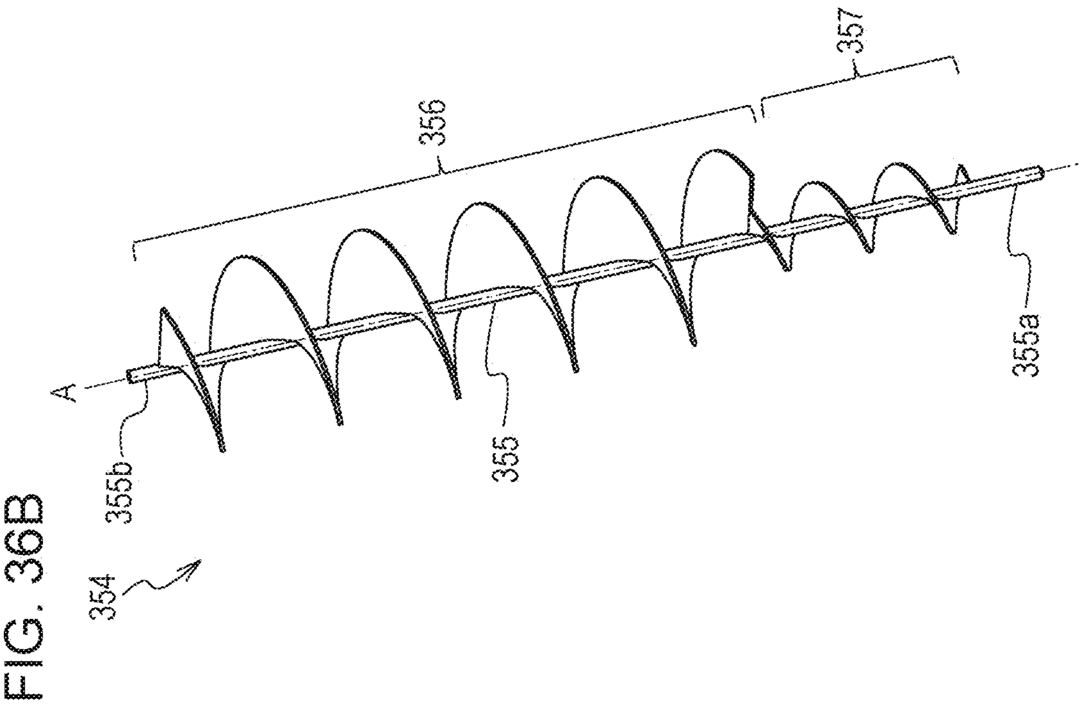
Figure 37B:
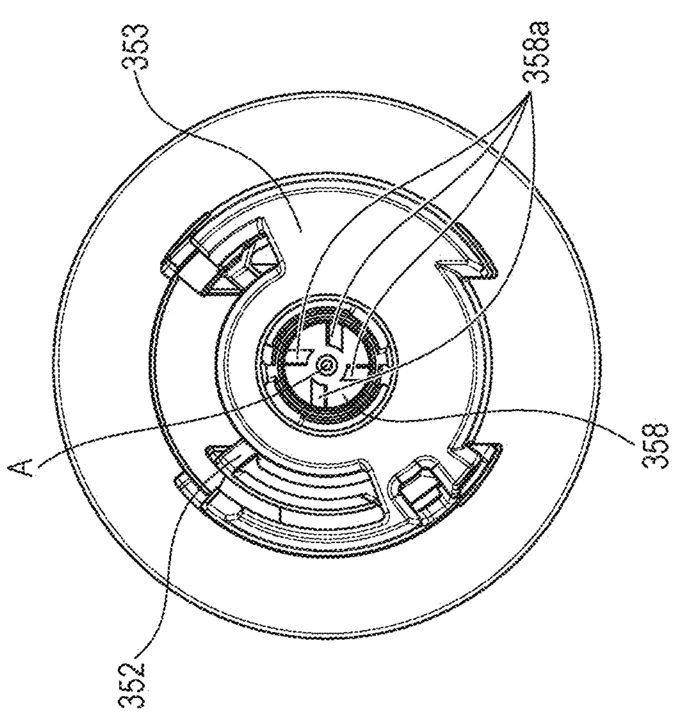
FIGS. 37A and 37B include a sectional view and a bottom view of the toner pack according to the third embodiment.
Figure 37A:
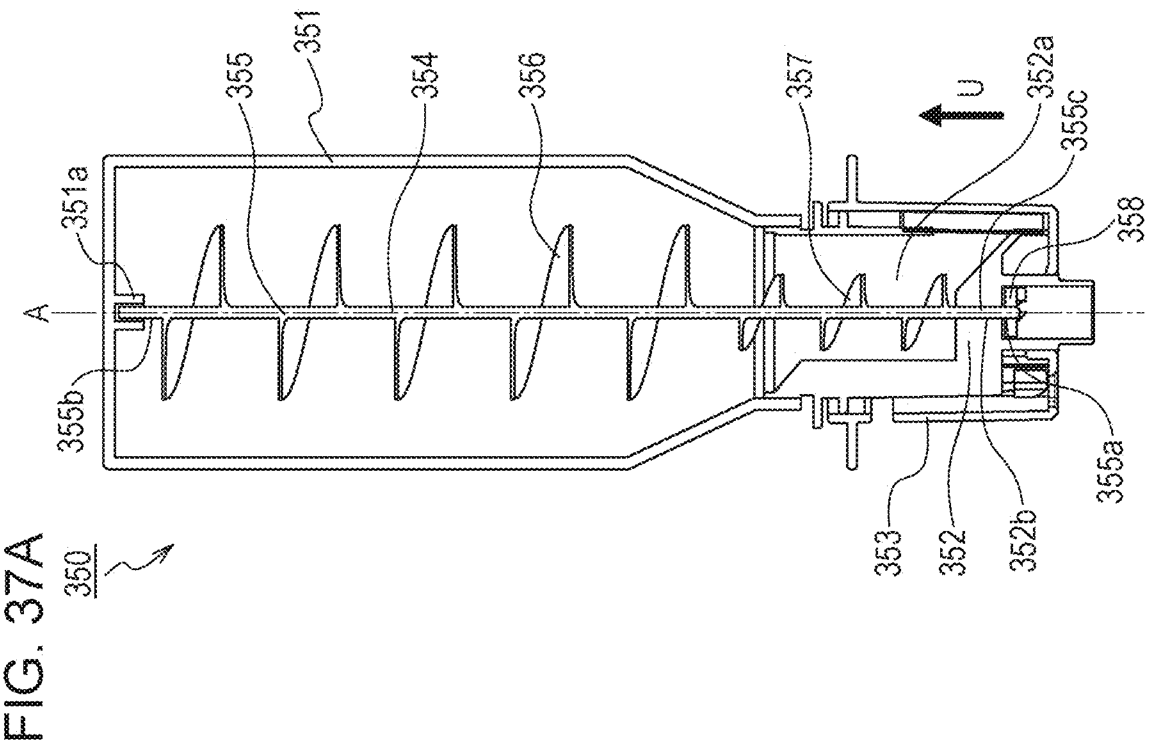

Next, the configuration of a toner pack 350 in the present embodiment will be described using FIGS. 35 to 37. FIG. 35A is a front view of the toner pack 350. FIG. 35B is a perspective view of the toner pack 350. FIG. 36A is a front view of a loosening member 354. FIG. 36B is a perspective view of the loosening member 354. FIG. 37A is a section taken along line XXXVIIA-XXXVIIA in FIG. 35A. The arrow U direction is a direction from a nozzle 352 toward a storage portion 351. FIG. 37B illustrates the configuration in FIG. 37A viewed in the arrow U direction.

As in the first embodiment, the toner pack 350 includes the storage portion 351 storing the toner, the nozzle 352, a pack-side shutter 353, and the loosening member 354. As FIG. 35 illustrates, in the first direction D1, the storage portion 351 is provided on one end side, and the nozzle 352 and the pack-side shutter 353 are provided on the other end side. The storage portion 351 is formed by a resin bottle similar to that in the second embodiment.

As FIG. 36 illustrates, the loosening member 354 includes a shaft portion 355 rotatable about a rotational axis A, a first loosening portion 356 provided on an outer peripheral surface of the shaft portion 355, and a second loosening portion 357 having an outside diameter smaller than the first loosening portion 356 and provided on the outer peripheral surface of the shaft portion 355. The first loosening portion 356 and the second loosening portion 357 are each a blade (blade portion) having a helical shape whose helical axis coincides with the rotational axis. That is, the loosening member 354 is a screw. As FIG. 37A illustrates, the loosening member 354 is disposed inside the storage portion 351. A driven transmission member 358 (driving-force receiving portion) is fixed to a first end portion 355*a* provided at one end of the shaft portion 355. The driven transmission member 358 is a coupling provided with four driven transmission claws 358*a* that are provided on an end surface in the direction of the rotational axis A.

When, with the nozzle 352 being positioned below the storage portion 351, the toner pack 350 is oriented in a predetermined direction such that the rotational axis A is parallel to the gravitational direction, the driven transmission member 358 is fixed to the first end portion 355*a* (lower end portion) that is an end portion of the shaft portion 355 on the lower side. As FIGS. 37A and 37B illustrate, the driven transmission member 358 is exposed outside the toner pack 350 from a bottom surface of the nozzle 352 when the toner pack 350 is oriented in the predetermined direction.

The shaft portion 355 includes a portion (first portion) positioned inside the storage portion 351 and provided with the first loosening portion 356 and a portion (second portion) positioned inside a passage 352*a* and provided with the second loosening portion 357. The first end portion 355*a* that is one end portion of the shaft portion 355 is, as FIG. 38 illustrates, a leading end portion penetrating an inner wall of the passage 352*a* downward.

A second end portion 355*b* that is the other end portion of the shaft portion 355 and a received portion 355*c* are supported by a bearing 351*a* of the storage portion 351 and a bearing 352*b* of the nozzle 352, respectively, so as to be rotatable about the rotational axis A. The bearing 351*a* is provided on a top surface inside the storage portion 351 when the toner pack 350 is oriented in the predetermined direction. The second loosening portion 357 is disposed inside the passage 352*a* of the nozzle 352.

Next, a supply operation of toner will be described using FIGS. 38 to 40. FIG. 38 is a sectional view illustrating the state where the toner pack 350 is mounted on the installation portion 300, the operation lever 108 is rotated in the rotational direction D (refer to FIGS. 22A and 22B), and each of the apparatus-side shutter 301 and the pack-side shutter 353 is rotated from a closing position to an opening position. FIG. 39 is a perspective view illustrating how the drive transmission member 302 attached to the drive shaft 303 and the driven transmission member 358 attached to the loosening member 354 mesh with each other.

Figure 38:
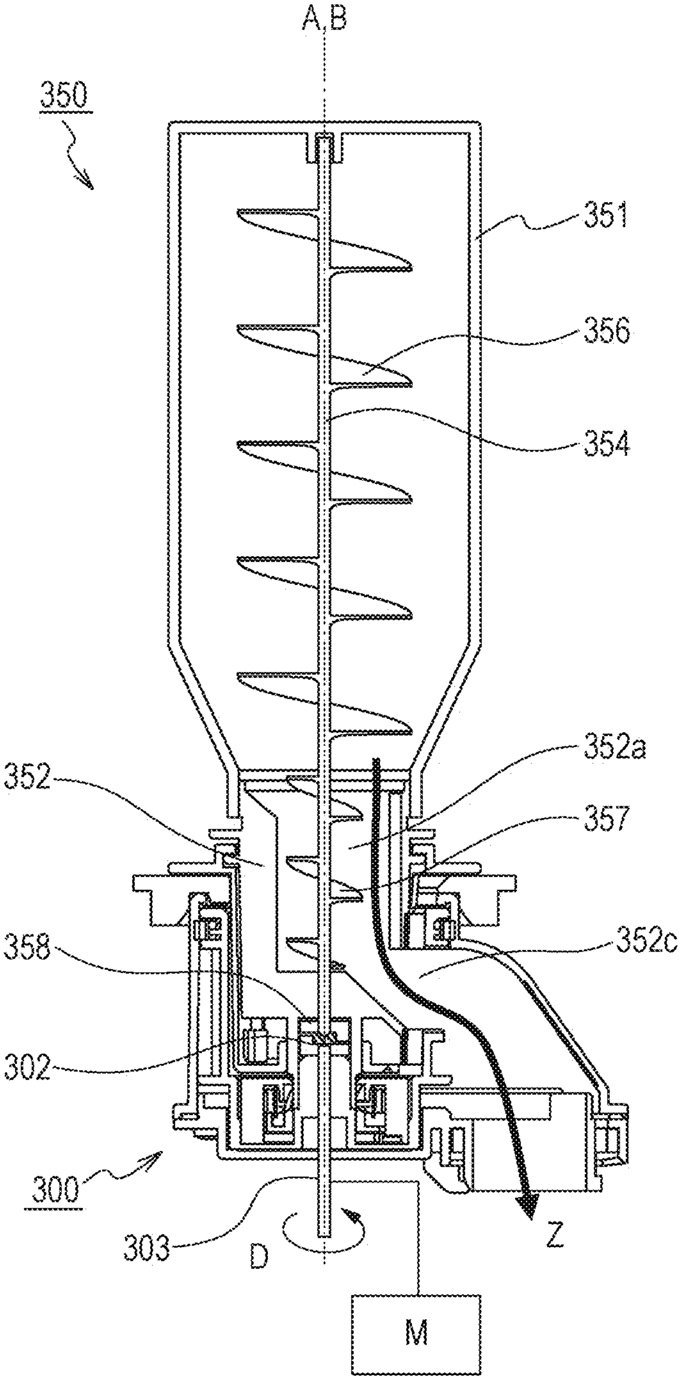
FIG. 38 is a sectional view of the installation portion and the toner pack according to the third embodiment.
Figure 39:
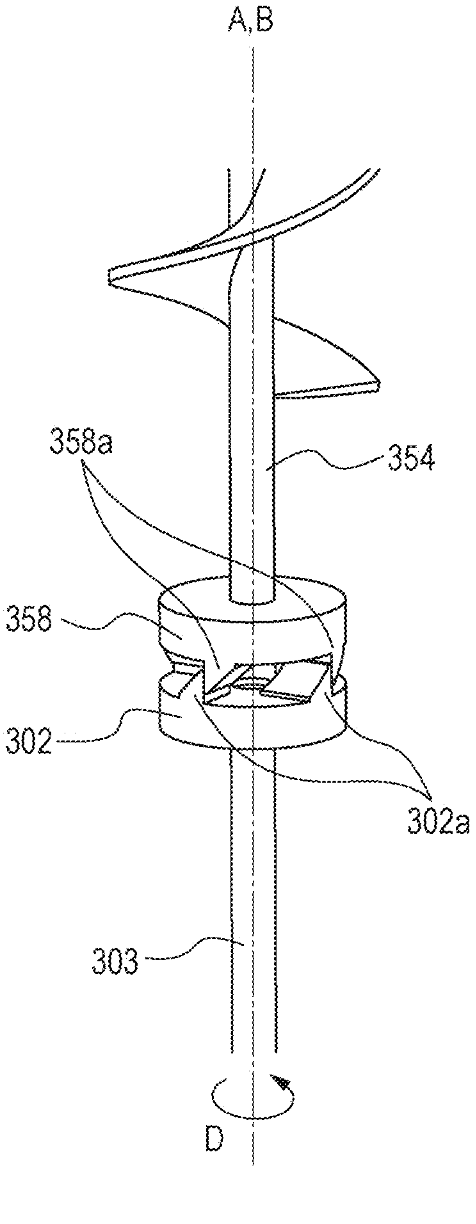
FIG. 39 is an enlarged perspective view of a drive transmission portion and a driven transmission portion according to the third embodiment.
Figure 40:
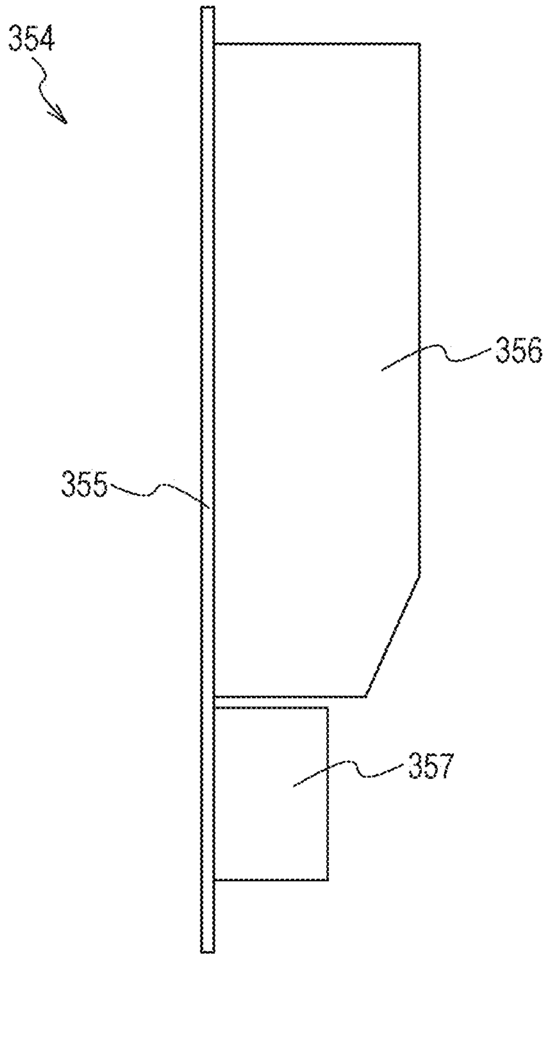
FIG. 40 is a front view of a loosening member according to the third embodiment.

As FIGS. 38 and 39 illustrate, with the toner pack 350 being mounted on the installation portion 300, the drive transmission member 302 attached to the drive shaft 303 and the driven transmission member 358 attached to the loosening member 354 mesh with each other (engage with each other). Due to the contact between the drive transmission claws 302*a* of the drive transmission member 302 and the driven transmission claws 358*a* of the driven transmission member 358, when the drive shaft 303 is rotated in the rotational direction D by the drive source M, the loosening member 354 is also rotated in the rotational direction D. Thus, the toner in the storage portion 351 of the toner pack 350 is loosened by the first loosening portion 356, and the toner in the passage 352*a* of the nozzle 352 is loosened by the second loosening portion 357. The toner in the storage portion 351 is then discharged through a discharging port 352*c* along arrow Z due to the own weight of the toner and the conveyance force of the loosening member 354.

In other words, the loosening member 354 is rotated by receiving a driving force from the image forming apparatus 1, thereby loosening the toner inside the storage portion 351 and the toner inside the passage 352*a* of the nozzle 352. After the toner supply ends, the operation lever 108 is rotated in the rotational direction E by operating the operation portion 108*b*, and the toner pack 350 is then removed from the installation portion 300.

Note that, although the first loosening portion 356 and the second loosening portion 357 of the loosening member 354 are each a screw in the present embodiment, this is not the only option. For example, as FIG. 40 illustrates, a flexible sheet of, for example, PET or PC may be possible. The free lengths of the first loosening portion 356 and the second loosening portion 357 are made larger than the inside diameter of the storage portion 351, and the first loosening portion 356 and the second loosening portion 357 thereby slide with the inner wall of the storage portion 351; thus, the toner in the entire storage portion 351 can be loosened efficiently. In addition, although the storage portion 351 is a resin bottle in the present embodiment, this is not the only option. A pouch formed by a sheet such as a flexible polypropylene sheet being subjected to pouch processing may be possible. In addition, the loosening member 354 is not necessarily a screw as long as the loosening member 354 can loosen the toner in the storage portion 351 by moving.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-106710, filed Jun. 29, 2023, which is hereby incorporated by reference herein in its entirety.

What is claimed is:

1. A toner container comprising:

a storage portion configured to store toner;

a nozzle portion having a discharging port configured to discharge, outside the toner container, toner stored in the storage portion, the nozzle portion being fixed to the storage portion such that the nozzle portion and the storage portion are aligned in a first direction; and a loosening member configured to loose toner, the loosening member including at least a portion provided in the storage portion, wherein the loosening member is swingable relative to the storage portion about a swing axis extending in a second direction crossing the first direction.

2. The toner container according to claim 1, wherein the loosening member includes:

a base portion whose longitudinal direction coincides with the first direction, the base portion including a first end portion that is one end portion in the longitudinal direction and a second end portion that is the other end portion in the longitudinal direction; and an elastic portion elastically displaceable relative to the base portion, the elastic portion being supported by the base portion so as to be positioned on an outer side relative to the base portion in a direction crossing the first direction.

3. The toner container according to claim 2, wherein the second end portion is provided with a supported portion supported by the nozzle portion such that the loosening member is swingable relative to the nozzle portion about the second direction.

4. The toner container according to claim 3, wherein the nozzle portion includes a passage allowing toner to pass through toward the discharging port, and wherein a leading end portion provided in the second end portion and provided at a position further apart from the first end portion than the supported portion is positioned in the passage.

5. The toner container according to claim 4, wherein the discharging port is provided in a side surface, of the nozzle portion, extending in the first direction, and wherein the leading end portion extends in a direction where a distance from the discharging port in a direction crossing the first direction decreases as a distance from the discharging port in the first direction decreases.

6. The toner container according to claim 4, wherein the leading end portion is provided with a plurality of protrusions protruding in a direction crossing a direction where the leading end portion extends toward the discharging port.

7. The toner container according to claim 2, wherein the first end portion of the base portion is a free end in the storage portion.

8. The toner container according to claim 2, wherein the elastic portion is a wire material extending in the first direction while turning around the base portion, and wherein a third end portion and a fourth end portion that are one end portion and the other end portion of the wire material, respectively, are fixed to the first end portion and the second end portion of the base portion, respectively.

9. The toner container according to claim 8, wherein the storage portion includes a region whose width in a direction crossing the first direction increases as a distance from the nozzle portion in the first direction increases, and wherein the wire material includes, in the region, a portion whose radius of turning around the base portion increases as the distance from the nozzle portion in the first direction increases.

10. The toner container according to claim 2, wherein the first end portion of the base portion is a free end extending in a direction crossing the first direction.

11. The toner container according to claim 2, wherein the elastic portion includes a plurality of protruding portions protruding from the base portion in a direction crossing the first direction and aligned in the first direction.

12. The toner container according to claim 2, wherein the elastic portion includes a first protruding portion protruding from the base portion in a direction crossing the first direction and a second protruding portion protruding in a direction crossing the first direction and the direction where the first protruding portion protrudes.

13. The toner container according to claim 2, wherein the storage portion includes a region whose width in a third direction crossing the first direction increases as a distance from the nozzle portion in the first direction increases, and wherein the elastic portion includes, in the region, a portion whose width in the third direction increases as the distance from the nozzle portion in the first direction increases.

14. The toner container according to claim 1, wherein the nozzle portion includes a passage allowing toner to pass through toward the discharging port, and wherein an end portion of the loosening member closer to the nozzle portion is positioned in the passage of the nozzle portion.

15. The toner container according to claim 1, wherein the loosening member does not swing about an imaginary line extending in a third direction crossing the first direction and the second direction.

16. A toner container comprising:

a storage portion configured to store toner;

a nozzle portion having a discharging port configured to discharge, outside the toner container, toner stored in the storage portion, the nozzle portion being fixed to the storage portion such that the nozzle portion and the storage portion are aligned in a first direction; and a stirring member configured to stir toner in the storage portion, wherein the stirring member includes:

a shaft portion supported by the nozzle portion so as to be rotatable about a rotational axis relative to the nozzle portion, the shaft portion being provided such that the rotational axis is oriented in the first direction;

a blade portion provided on the shaft portion so as to rotate with the shaft portion; and a driving-force receiving portion configured to receive, from outside the toner container, a driving force for rotating the driving-force receiving portion, and wherein, when, with the nozzle portion being positioned below the storage portion, the toner container is oriented in a predetermined direction such that the rotational axis is parallel to a gravitational direction, the driving-force receiving portion is provided on a lower end portion that is an end portion of the shaft portion on a lower side.

17. The toner container according to claim 16, wherein the driving-force receiving portion is a coupling.

18. The toner container according to claim 17, wherein, when the toner container is oriented in the predetermined direction, the driving-force receiving portion is exposed outside the toner container from a bottom surface of the nozzle portion.

19. The toner container according to claim 17, wherein, when the toner container is oriented in the predetermined direction, the discharging port is provided in a side surface, of the nozzle portion, extending along the rotational axis, and the nozzle portion has a receiving inlet facing upward so as to receive toner from the storage portion and provided above the discharging port and includes a passage allowing toner to pass through from the receiving inlet to the discharging port, wherein the shaft portion includes a first portion positioned in the storage portion and a second portion positioned in the passage, and wherein, when the toner container is oriented in the predetermined direction, the lower end portion is a portion, of the shaft portion, penetrating the passage downward.

20. The toner container according to claim 19, wherein the blade portion is provided on each of the first portion and the second portion of the shaft portion, and wherein the blade portion of the second portion has a width smaller than the blade portion of the first portion in a direction orthogonal to the rotational axis.

21. The toner container according to claim 19, wherein the blade portion has a helical shape whose helical axis coincides with the rotational axis of the shaft portion, and the blade portion is provided on each of the first portion and the second portion of the shaft portion, and wherein the blade portion of the second portion has an outside diameter smaller than the blade portion of the first portion.

22. The toner container according to claim 16, wherein the driving-force receiving portion is positioned below the discharging port.

23. The toner container according to claim 16, wherein the blade portion has a helical shape whose helical axis coincides with the rotational axis of the shaft portion.

24. A toner container comprising:

a storage portion configured to store toner;

a nozzle portion having a discharging port configured to discharge, outside the toner container, toner stored in the storage portion, the nozzle portion being fixed to the storage portion such that the nozzle portion and the storage portion are aligned in a first direction;

a shutter configured to rotate about a rotational axis extending in the first direction, between a closing position where the shutter closes the discharging port and an opening position where the shutter opens the discharging port; and a loosening member including at least a portion provided in the storage portion, the loosening member being configured to loose toner, the loosening member including a shaft portion centered around the rotational axis and a loosening portion provided on an outer peripheral surface of the shaft portion, the loosening member being configured to be rotated by rotation of the shutter.

25. A toner container comprising:

a storage portion configured to store toner;

a nozzle portion having a discharging port configured to discharge, outside the toner container, toner stored in the storage portion, the nozzle portion being fixed to the storage portion such that the nozzle portion and the storage portion are aligned in a first direction; and a loosening member configured to loose toner, the loosening member including at least a portion provided in the storage portion, wherein the loosening member includes:

a base portion whose longitudinal direction coincides with the first direction, the base portion including a first end portion that is one end portion in the longitudinal direction and a second end portion that is the other end portion in the longitudinal direction; and an elastic portion elastically displaceable relative to the base portion, the elastic portion being supported by the base portion so as to be positioned on an outer side relative to the base portion in a direction crossing the first direction.

26. The toner container according to claim 25, wherein the elastic portion is a wire material extending in the first direction while turning around the base portion, and wherein a third end portion and a fourth end portion that are one end portion and the other end portion of the wire material, respectively, are fixed to the first end portion and the second end portion of the base portion, respectively.

* * * * *